(12) United States Patent
Yoda et al.

(10) Patent No.: US 6,305,072 B1
(45) Date of Patent: Oct. 23, 2001

(54) METHOD FOR MANUFACTURING THIN FILM MAGNETIC HEAD

(75) Inventors: Hiroaki Yoda, Kawasaki; Susumu Hashimoto, Ebina; Michiko Hara; Masashi Sahashi, both of Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/979,965

(22) Filed: Nov. 26, 1997

(30) Foreign Application Priority Data

Nov. 28, 1996 (JP) .................................................. 8-318225
Mar. 14, 1997 (JP) .................................................. 9-061479

(51) Int. Cl.⁷ ........................................................ G11B 5/42
(52) U.S. Cl. .................................. 29/603.14; 29/603.15; 427/130; 427/131
(58) Field of Search .......................... 29/603.14, 603.15; 427/130–132

(56) References Cited

U.S. PATENT DOCUMENTS

| | | | | |
|---|---|---|---|---|
| 4,947,541 | * | 8/1990 | Toyoda et al. | 29/603.14 |
| 5,633,771 | | 5/1997 | Yoda et al. . | |
| 5,802,700 | * | 9/1998 | Yoda et al. | 29/603.14 |

FOREIGN PATENT DOCUMENTS

| | | |
|---|---|---|
| 63-173213 | 7/1988 | (JP) . |
| 4-11311 | 1/1992 | (JP) . |
| 6-177161 | 6/1994 | (JP) . |

* cited by examiner

*Primary Examiner*—Carl E. Hall
(74) *Attorney, Agent, or Firm*—Finnegan, Henderson, Farabow, Garrett & Dunner, L.L.P.

(57) ABSTRACT

When manufacturing a thin film magnetic head in which an upper magnetic pole is formed on a lower magnetic pole through a magnetic gap, firstly, at least on the lower magnetic pole, a convex portion possessing the width equivalent to a track width is formed. The convex portion forms a lower magnetic pole tip. Conforming to a contour of the convex shape of the lower magnetic pole, a non-magnetic material layer is formed. A flattening layer is formed on the non-magnetic material layer. The non-magnetic layer is etched with the flattening layer, for example, as a mask. In the non-magnetic material layer, a concave portion self-aligned to the lower portion magnetic pole top (convex portion) is formed. Inside the concave portion, a magnetic layer (upper magnetic pole tip) destined to be a part of the upper magnetic pole is formed. As to the lower magnetic pole tip and the upper magnetic pole tip, the widths of surfaces opposite to the magnetic gap are almost equal, and the central positions thereof almost overlap each other. Thus, a narrow track head structure with high accuracy can be obtained.

41 Claims, 37 Drawing Sheets

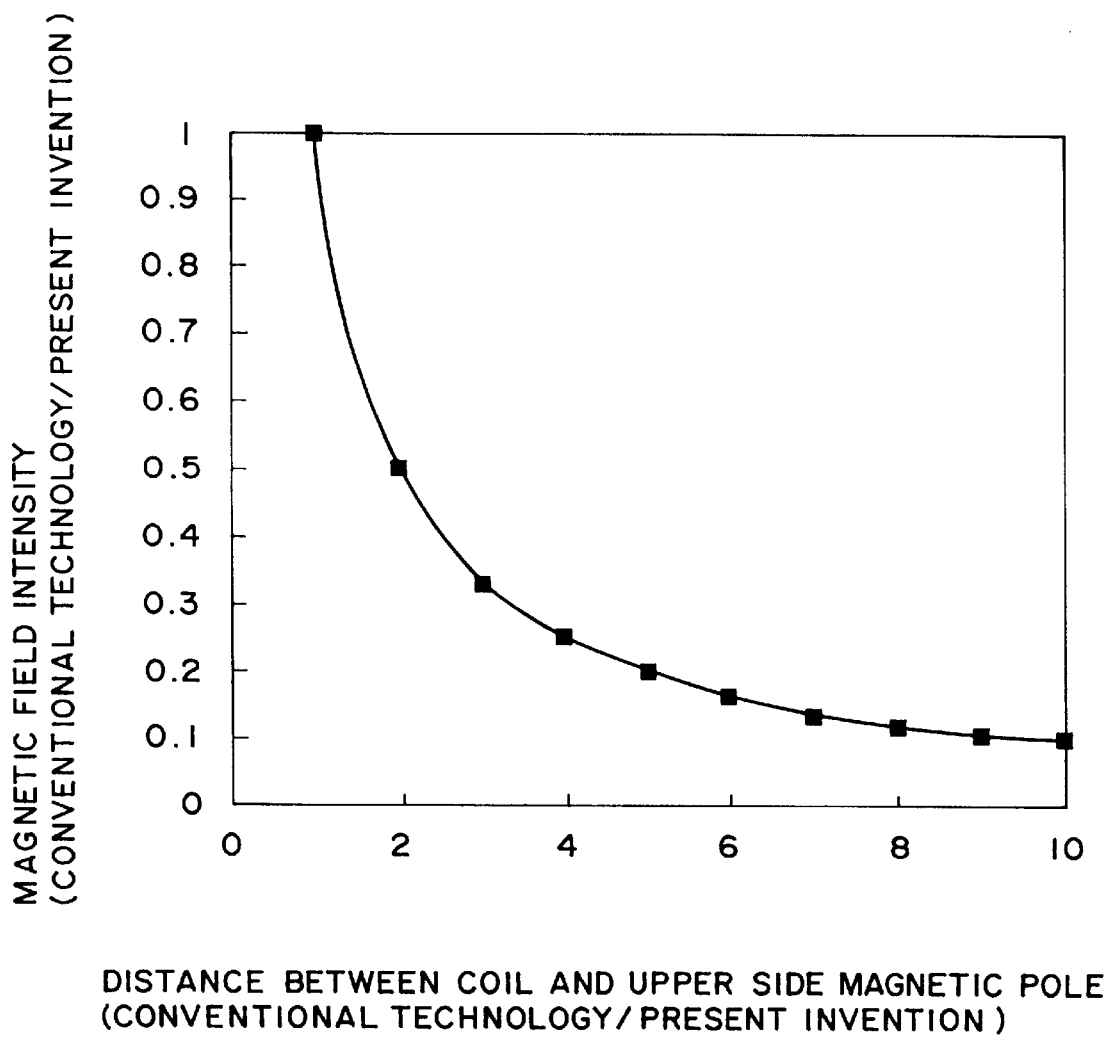

METHOD FOR MANUFACTURING THIN FILM MAGNETIC HEAD

BACKGROUND OF THE INVENTION

1. Field of the Invention

The invention relates to a manufacturing method of a thin film magnetic head, a manufacturing method of a magnetic recording/reproducing combination head using a magneto-resistance effect type reproducing head and an induction type recording head, a thin film magnetic head and a magnetic recording/reproducing combination head.

2. Description of the Related Art

Responding to recent demand for high densifying of magnetic recording, a high recording density such as 1 Gb/inch$^2$ is in use in a HDD system. Accompanying such a trend toward the high densification of recording density, a technology capable of giving a narrower track width is indispensable.

For example, in the case of a HDD system possessing a recording density of such as 200 Mb/inch$^2$, a track width is around 7 μm. Instead, for a HDD system possessing a recording density of 1 Gb/inch$^2$, a required track width is around 2 μm. To respond a demand for a further higher recording density, a technology capable of giving a narrower track width and higher accuracy is required. In the future, to realize such a high recording density as around 10 Gb/inch$^2$, a system having a track width narrower than 1 μm is predicted to be demanded.

The structure of a conventional thin film magnetic head which track width is determined by an upper magnetic pole alone, in order to attain above described narrow track width and a high densification of a line recording density, there are problems such as bending at edges of a recording bit line and reproducing riding due to the leakage of magnetic field from sides of a recording track. Thus, the width of the surface opposite to a magnetic gap of a lower portion magnetic pole is necessitated to have the same width as that of the upper magnetic pole.

As methods for giving the same width to both of surfaces facing the magnetic gap between the lower portion magnetic pole and upper portion magnetic pole, following methods can be cited. (1) After transforming beforehand a tip portion of the lower magnetic pole into a convex shape, an upper magnetic pole is mechanically aligned thereon, (2) After forming an upper magnetic pole into a predetermined shape, a lower magnetic pole is milled with an upper magnetic pole as a mask, (3) A lower magnetic pole and an upper magnetic pole are simultaneously processed from an air bearing surface side with such as a FIB (Focused Ion Beam) method.

However, among the above described processing methods, according to the method (1), since a mechanical alignment accuracy due to a stepper is in a range of ±0.1 μm, it is difficult to process a narrow track having a width of 1 μm or less with high accuracy. According to the method (2), due to adhesion during milling operation, the track width varies, thus the track width can not be attained with a high accuracy. Further, magnetic short circuit tends to occur between the lower magnetic pole and the upper magnetic pole. According to the method (3), even though a certain degree of the accuracy of the track width can be secured, since each magnetic head is required to be processed one by one and a throughput of the FIB itself is very low, there is a problem when mass-production is required.

A dimensional alignment accuracy between the protruded portions in a butt structure is a universal concerns in processing of various electronic parts not limiting to a magnetic pole structure of a thin film magnetic head. For example, in a case of a semiconductor element, due to finer patterning of a wiring width, there is a growing difficulty in securing the dimensional alignment accuracy when a via hole is aligned on a wiring. Since a via hole is, according to a conventional method, mechanically aligned with an alignment accuracy of around ±0.1 μm, precise alignment on the wiring is becoming more and more difficult. The situation is same in a liquid crystal element.

Besides, to cope with the demand for high densification of the line recording density that is described above, a magnetic head (hereinafter referred to as MR head) which makes use of a so-called magneto-resistance effect (MR) is expected as a promising reproducing head, the magneto-resistance effect meaning an electric resistance variation responding to an external magnetic field in a certain type of magnetic thin film or magnetic multi-layer thin film. When a MR head is used as a reproducing head, by forming thereon a recording head consisting of an induction type thin film magnetic head, a magnetic recording/reproducing combination head has been tried to be developed. However, in the magnetic recording/reproducing combination head which integrated a MR head and an induction type magnetic head, due to narrowing of the track width, discrepancy between a reproducing track and a recording track tends to occur.

Further, in a conventional thin film magnetic head, to shield electrically between a magnetic pole and a coil, the coil is covered with an organic insulating material such as resist. Therefore, a distance between a magnetic pole tip portion of an upper portion magnetic pole and a magnetic pole body and a coil can not be made so close. In such a structure, to induce a magnetic field necessary for recording operation on an upper portion magnetic pole, it is required to input a large electric current into the coil. The large electric current can be a cause of disconnection. In order to input large electric current into the coil while preventing the coil from the disconnection, a larger diameter of the coil is required.

In a structure in which a coil is covered with an organic insulating material such as resist, reflecting a rugged shape of the coil, a surface of a substrate on which an upper portion magnetic pole is formed tends to have a rugged shape. An upper portion magnetic pole formed on the rugged shape portion, since a portion reflecting the rugged shape of the substrate works as a pinning site to a domain wall, it is difficult to isolate a magnetic domain. A magnetic pole having multiple domain walls causes to deteriorate magnetic head characteristic, in particular a high frequency response characteristic. In addition, since the organic insulating material such as the resist is less resistant to heat applied for annealing the recording magnetic pole material during head processing stage and heat generated when the electric current is inputted into the coil, reliability of a magnetic head is deteriorated accordingly.

As described above, in a conventional manufacturing method of a thin film magnetic head, a narrow track magnetic head structure, in which width of respective surfaces of the lower portion magnetic pole and the upper portion magnetic pole facing a magnetic gap is same, can not be manufactured with high accuracy while fully satisfying mass productivity. Alignment accuracy in a butt structure between protruded portions is a universal concerns with various types of electronic parts without restricting to a magnetic pole structure of a thin film magnetic head. In addition, in a magnetic recording/reproducing combination head which makes use of a MR head, discrepancy between a reproducing track and a recording track is a growing problem.

SUMMARY OF THE INVENTION

Therefore, the first object of the present invention is to provide a manufacturing method for manufacturing a thin film magnetic head which enables to manufacture a narrow track head structure, while satisfying mass-productivity, with high accuracy. In the magnetic head structure, widths of surfaces of a lower magnetic pole and an upper magnetic pole facing a magnetic gap at an air bearing surface are nearly same and central positions of the widths almost overlap. The second object of the present invention is to provide a manufacturing method for manufacturing a magnetic recording/reproducing combination head which eliminated track discrepancy between a reproducing track and a recording track while enabling to manufacture such a thin film magnetic head with reproducibility. The third object of the present invention is to provide a thin film magnetic head, in which magnetic recording performance of a narrow track head structure is improved, and a magnetic recording/reproducing combination head. The fourth object of the present invention is to provide a manufacturing method of an electronic device, the method enabling a high dimensional alignment accuracy between fine constitutional elements.

A manufacturing method of a thin film magnetic head of the invention, in a manufacturing method of a magnetic head possessing a lower magnetic pole and an upper magnetic pole formed on the lower portion magnetic pole through a magnetic gap, comprises the steps of; at least as a part of the lower portion magnetic pole, forming the first convex portion corresponding to a recording track; while conforming to a contour of the first convex portion, on the lower magnetic pole, forming a non-magnetic material layer possessing the second convex portion conformed to the first convex portion; forming a flattening layer on the non-magnetic material layer; by etching the non-magnetic material layer by making use of the flattening layer, forming a concave portion aligned to the first convex portion; and at least inside a concave portion of the non-magnetic material layer, forming the upper magnetic pole.

Another manufacturing method of a thin film magnetic head of the present invention is a manufacturing method of a magnetic head possessing a coil positioned between a lower magnetic pole and an upper magnetic pole, comprising the steps of; forming a coil substrate possessing a plurality of convex portion; forming the first insulating layer on the coil substrate along a contour of the convex portion; forming a flattening layer on the first insulating layer; forming a concave portion aligned to the convex portion by etching the first insulating layer by making use of the flattening layer; forming the coil inside the concave portion; forming the second insulating layer covering the coil; and forming an upper magnetic pole on the second insulating layer.

A manufacturing method of a magnetic recording/reproducing combination head of the present invention is a manufacturing method of a magnetic head including a reproducing head possessing a magneto-resistance effect element portion interposed between a pair of upper and lower magnetic shield layer through a reproducing magnetic gap and a recording head possessing a pair of upper and lower magnetic pole disposed through a recording magnetic gap, the manufacturing method comprises the steps of; on an upper side reproducing gap, while conforming to the first concave portion defining a position of a reproducing track of the magneto-resistance effect element portion, forming a lower magnetic pole concurrently serving at least as an upper side magnetic shield layer; on the lower magnetic pole, forming the first flattening layer; by etching the lower magnetic pole by making use of the first flattening layer, forming a convex portion aligned to the first concave portion.

The manufacturing method of a magnetic recording/reproducing combination head of the present invention further comprises the steps of; while conforming to a contour of the convex portion, on the lower magnetic pole, forming a non-magnetic material layer; on the non-magnetic material layer, forming the second flattening layer; by etching the non-magnetic material layer by making use of the second flattening layer, forming the second concave portion aligned dimensionally to the convex portion; and, at least inside the second concave portion of the non-magnetic material layer, forming the upper portion magnetic pole.

In a manufacturing method of a thin film magnetic head of the present invention, after forming a non-magnetic material layer along a contour of a convex portion possessing a width corresponding to a track width, thereon a layer possessing a surface flattening effect (flattening layer) is formed. A flattening layer is thin immediately above the convex portion, and is thick other than that portion. Since the thick portion of the flattening layer is formed according to a shape of the convex portion, with for example it as a substantial mask, the non-magnetic material layer is etched. On an upper portion of the convex portion serving as a lower magnetic pole tip portion, a concave portion aligned by self-alignment is formed with high accuracy.

By forming a soft magnetic layer destined to form an upper magnetic pole tip portion inside a concave portion, a narrow track head structure can be manufactured with high accuracy in which widths of surfaces of a lower magnetic pole tip portion and an upper portion magnetic pole tip portion, both of which face a magnetic gap, at an air bearing surface are almost same and central positions of the widths nearly overlap. Since the present manufacturing processes themselves correspond to a conventional etching process and a film forming process, mass-productivity can be fully satisfied.

Alignment of a concave portion to a convex portion through self-alignment can be also applied for a process for forming a coil. In a manufacturing method of a thin film magnetic head of the present invention, concave portions destined to form coils are defined by a plurality of convex portion (coil substrate) disposed on a coil substrate with respect to a position to be formed. Since the convex portions on the coil substrate can be thin, they can be formed with a thin resist mask. Thus, a fine pattern can be formed with a narrow pitch.

In a manufacturing method of a magnetic recording/reproducing combination head of the present invention, a convex portion (lower magnetic pole tip portion) corresponding to a track width also can be aligned with high accuracy through self-alignment to the first concave portion defining a reproducing track width. Therefore, while satisfying a good narrow track head structure, further, discrepancy between a reproducing track and a recording track can be prevented.

A self-alignment process for aligning a concave portion against a convex portion which process features a manufacturing method of the present invention can be applied to a manufacturing method of other electronic devices other than a magnetic head.

That is, a manufacturing method of the first electronic device of the present invention comprises the steps of;

forming a convex portion destined to form at least a part of the first functional layer; forming a non-magnetic material layer along a contour of the convex portion; forming a flattening layer on the non-magnetic material layer; forming a concave portion aligned to the convex portion by etching the non-magnetic material layer by making use of the flattening layer; and forming the second functional layer inside a concave portion of the non-magnetic material layer.

A manufacturing method of the second electronic device of the present invention comprises the steps of; forming a convex portion destined to form at least a part of the first functional layer; forming a non-magnetic material layer along a contour of the convex portion; forming the second functional layer on the non-magnetic material layer; forming a flattening layer on the second functional layer; and processing into a shape by corresponding the second functional device to the first functional device by etching the second functional layer while making use of the flattening layer.

Further, in the manufacturing method of an electronic device of the present invention, against a concave portion disposed on the third functional layer, a convex portion of the first functional layer can be formed self-aligned. Against such a convex portion of the first functional layer, by forming the second functional layer in a self-aligned manner, from the third functional layer to the second functional layer can be formed self-aligned.

Further, the first magnetic head of the present invention comprises; a magnetic gap; a lower magnetic pole disposed to make a contact with the magnetic gap and possessing a magnetic pole tip forming a convex shape toward the magnetic gap; and an upper magnetic pole disposed to oppose the lower portion magnetic pole tip through the magnetic gap and to contact the magnetic gap and possessing the magnetic pole tip forming a convex shape toward the magnetic gap, a width of an air bearing surface of at least a part of the magnetic pole tip of the upper magnetic pole being converged toward the magnetic gap; wherein a surface of the lower magnetic top contacting the magnetic gap and a surface of the upper magnetic tip contacting the magnetic gap have similar surface shapes.

The second magnetic head of the present invention comprises; a magnetic gap; a lower magnetic pole disposed to contact the magnetic gap and possessing a magnetic pole tip forming a convex shape toward the magnetic gap; and an upper magnetic pole disposed to oppose to the lower magnetic pole tip through the magnetic gap and to contact the magnetic gap and possessing a magnetic pole top forming a convex shape toward the magnetic gap; wherein the width of an air bearing surface of at least a part of the magnetic pole tip is converged toward the magnetic gap and the magnetic pole tip possesses a central portion and edge portions adjoining the central portion in a track direction, the edge portions being protruded to the lower magnetic pole side rather than the central portions.

The third magnetic head of the present invention comprises; a magnetic gap; a lower magnetic pole positioned to contact the magnetic gap and possessing a magnetic pole tip formed in a convex shape toward the magnetic gap, the width of an air bearing surface of the magnetic pole tip being converged toward the magnetic gap; an upper magnetic pole positioned to oppose the lower magnetic pole top through the magnetic gap and to contact the magnetic gap and possessing a magnetic pole tip forming a convex shape toward the magnetic gap, the width of an air bearing surface of at least a part of the magnetic pole tip being converged toward the magnetic gap; and a soft magnetic layer covering both side surfaces of the lower magnetic pole tip and connected magnetically to the upper magnetic pole tip.

In the first, the second, and the third magnetic head of the present invention, it is preferable that the width of air bearing surface of the lower magnetic pole tip converges toward the magnetic gap.

The fourth magnetic head of the present invention comprises; a lower magnetic pole; an upper magnetic pole formed through a magnetic gap at least an air bearing surface side; a coil positioned between the lower magnetic gap and the upper magnetic gap on a rear side than the air bearing surface; and a coil substrate possessing a plurality of convex portion aligned to the coil forming position.

In a magnetic head of the present invention, since the width of at least a lower magnetic gap at an air bearing surface is made to converge toward a magnetic gap, signal magnetic field to a medium can be supplied effectively. For example, if the width is broadened toward a magnetic gap after once being converged, since magnetic flux reaching the magnetic gap is restricted by the width of the converged part, magnetic field can not be effectively supplied to a medium.

Further, in the first magnetic head of the present invention, plane shapes of surfaces of a lower magnetic pole tip and an upper magnetic pole tip which contact recording magnetic gap are almost similar. Here, the similarity between the lower magnetic pole tip and the upper magnetic pole tip means that, with an equal ratio, the magnetic pole tip is scaled up or scaled down. Therefore, when a magnetic head is formed by polishing in a height direction, even if the height deviates a little, a difference between respective widths of the lower magnetic pole and upper magnetic pole become equal. Therefore, the sidewriting can be made stable. Thus, magnetic heads can be manufactured with even performance and with reproducibility.

In the second and third magnetic head of the present invention, a protruded portion for preventing sidewrite and a soft magnetic layer can be produced with high accuracy and reproducibility. Therefore, without deteriorating recording performance, leakage of magnetic flux on both sides of a track which causes sidewrite during recording operation can be suppressed.

In the fourth magnetic head of the present invention, a coil possessing a high aspect ratio can be formed with a narrow pitch and, the surface flatness of a substrate surface of an upper magnetic pole can be enhanced sufficiently. By flattening the substrate surface of the upper magnetic pole, pinning site of domain wall can be reduced. During head operation, isolation into a single domain of a magnetic film of an upper magnetic pole can be easily done. Therefore, recording noise due to a magnetic wall shift can be reduced drastically.

BRIEF DESCRIPTION OF THE DRAWINGS

FIG. 34 is a diagram showing relationship between a coilupper magnetic pole distance and magnetic field strength of the thin film magnetic head in accordance with the embodiment of the present invention comparing with that of the conventional thin film magnetic head.

DESCRIPTION OF THE PREFERRED EMBODIMENTS

Embodiments of the invention will be described with reference to the accompanying drawings.

Figure 1:
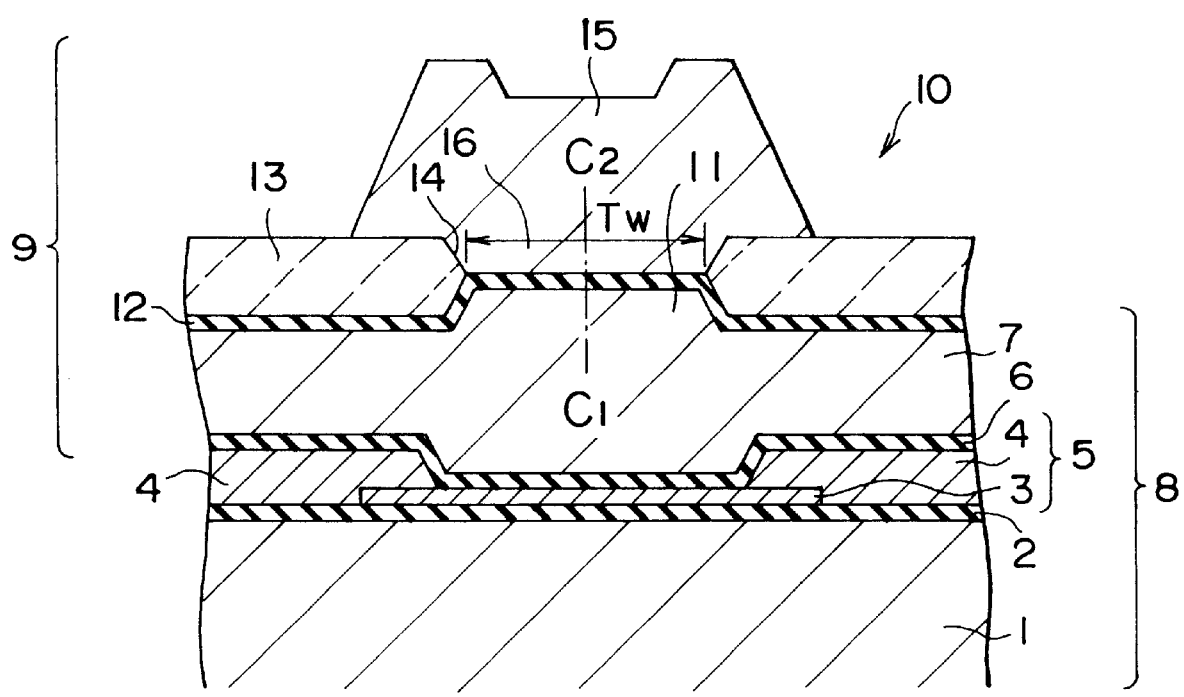
FIG. 1 is a cross sectional view seen from an air bearing surface showing a construction of a magnetic recording/reproducing combination head produced according to the first embodiment of the present invention.

FIG. 1 is a sectional view seen from an air bearing surface (ABS) showing a structure of a magnetic recording/reproducing combination head manufactured according to a manufacturing method of one embodiment of the present invention. In the figure, numeral 1 denotes a lower side magnetic shield layer formed on a not shown substrate such as an $Al_2O_3$.TiC substrate with an $Al_2O_3$ insulation layer. The lower side magnetic shield layer 1 is composed of a crystalline soft magnetic material such as NiFe alloy or FeAlSi alloy, or an amorphous soft magnetic material such as CoZrNb alloy.

On the lower side magnetic shield layer 1, a magneto-resistance effect film (MR film) 3 is formed through a lower side reproducing magnetic gap 2 consisting of a non-magnetic insulating material such as $AlO_x$ (for example $Al_2O_3$). As a MR film 3, an anisotropic magneto-resistance effect film such as $Ni_{80}Fe_{20}$, a spin valve film composed of a laminated film of such as $Co_{90}Fe_{10}/Cu/Co_{90}Fe_{10}/IrMn$, a giant magneto-resistance effect film such as an artificial lattice film.

A MR film 3 is patterned according to a predetermined shape. At both edges of the MR film 3, a pair of reproducing electrode 4, 4' consisting of Cu or the like are formed to be connected. An MR element portion 5 is formed thereby.

According to a requirement, the MR element portion 5 can be provided with a hard magnetic bias film or an antiferromagnetic film which inputs a bias magnetic field into the MR film 3. In the MR element portion 5 of the embodiment, a reproducing track width is determined by a spacing between a pair of reproducing electrode 4, 4.

On the MR element portion 5, an upper side reproducing magnetic gap 6 is formed of a non-magnetic insulating material such as $AlO_x$. Still thereon, an upper side magnetic shield layer 7 is formed of a soft magnetic material same as that of the lower side magnetic shield layer 1. Therewith, a shield type MR head 8 which functions as a reproducing head is constituted.

On the reproducing magnetic head consisting of the shield type MR magnetic head 8, a recording head is formed of an induction type thin film magnetic head 9. Therewith, a magnetic recording/reproducing combination head 10 is constituted. A lower portion magnetic pole of the induction type thin film magnetic head 9 is composed of the soft magnetic layer which constitutes an upper side magnetic shield layer 7 of the shield type MR head 8. That is, the upper side magnetic shield layer 7 also serves as a lower portion magnetic pole of the recording magnetic head.

On the lower magnetic pole (hereinafter referred to as lower magnetic pole) 7 which concurrently serves as the upper side magnetic shield layer, a recording magnetic gap 12 consisting of a non-magnetic material such as $AlO_x$, Si, $SiN_x$ is formed. The lower magnetic pole 7 has a convex portion as a magnetic pole tip (gap opposing portion) 11. As to the lower magnetic pole tip 11 having a convex shape, the width of an upper surface which contacts the recording magnetic gap 12 is equivalent with a recording track width $T_w$. In the lower magnetic pole tip 11, a width of the air bearing surface is converged toward the recording magnetic gap 12. That is, the lower magnetic pole tip 11 is formed in a convex shape toward the recording magnetic gap 12, and the convex portion is formed to have a taper which is converged toward the recording magnetic gap 12.

The recording magnetic gap 12 is formed along a contour of the lower magnetic pole 7 which has the convex shape magnetic pole tip 11. Further, the recording magnetic gap 12 can be formed only on the lower magnetic pole tip 11. On the recording magnetic gap 12, non-magnetic material layers 13 are formed in such a manner that hold the convex shape lower magnetic pole tip (convex portion) 11 including the recording magnetic gap 12 therebetween from a track width direction and consisted of, for example, $SiO_x$ or the like, which is different from the material of the recording magnetic gap 12.

The non-magnetic material layer 13 has a concave portion 14 aligned dimensionally to the convex portion 11. As will be described afterward, alignment of the concave portion 14 to the convex portion 11 is based on self-alignment making use of a flattening layer (for example, a flattening resin). The shape of the concave portion 14 has a shape in which a width of the air bearing surface converges toward the recording magnetic gap 12.

Inside the concave portion 14 aligned dimensionally to the upper magnetic pole tip 11 which has a convex shape, the magnetic material which constitutes a magnetic pole tip 16 (a portion opposite to the gap) of an upper magnetic pole 15 is embedded. As a constituent material of the upper magnetic pole 15, a soft magnetic material same as that of the lower magnetic shield layer 1 can be used. The upper magnetic pole tip 16 formed embedding inside the concave portion 14 is formed in a convex shape toward the recording magnetic gap 12 and has tapered portions which converge toward the recording magnetic gap 12 according to the shape of the concave portion 14.

That is, the lower magnetic pole tip 11 and the upper magnetic pole tip 16 form a butt structure in which the convex portions of the both portions butt each other through the recording magnetic gap 12 and converge toward the recording magnetic gap 12. Further, since the convex portion 11 and the concave portion 14 are aligned dimensionally, the lower magnetic pole tip 11 and the upper magnetic pole tip 16 can be formed to align dimensionally with high precision in such a manner that respective center position $C_1$ and $C_2$ overlap through the recording magnetic gap 12. In addition, the widths of the surfaces contacting the recording magnetic gap 12 of the magnetic pole tips 11 and 16 can be made equal.

Further, a contour shape of the convex portion which serves as the lower magnetic pole tip 11 and a contour shape of the concave portion 14 destined to be provided with the upper magnetic pole tip 16 can not be necessarily formed in a straight line depending on the contour of the photo-resist (shape of a reticle for exposure use, primarily), the etching condition, and the etching precision, instead form a little bit deformed shape. However, since the concave portion 14 is dimensionally aligned to the convex portion 11 based on the self-alignment, in other words, since the concave portion 14 has a shape obtained by transcribing the shape of the convex portion 11, their plane shapes are made similar.

Figure 2A:
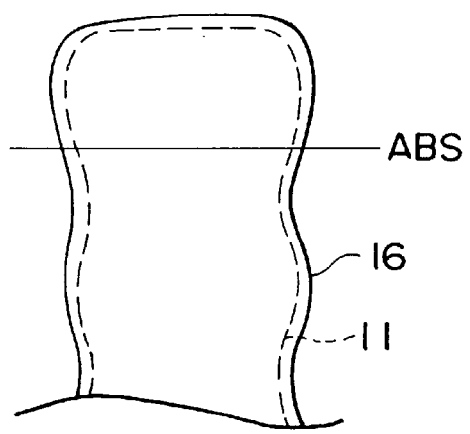
FIG. 2A is a plan view showing a plane shape of a lower magnetic pole tip surface and an upper magnetic pole bottom surface of the magnetic recording/reproducing combination head shown in FIG. 1.
Figure 2B:
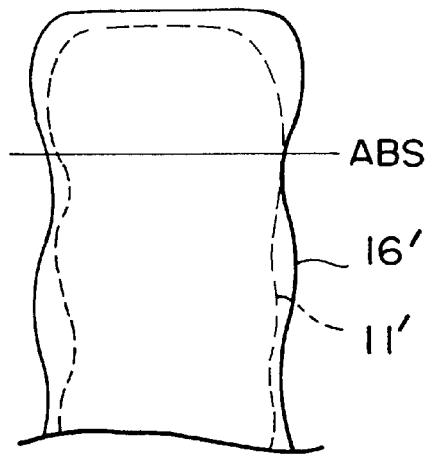
FIG. 2B is a plan view showing a plane shape of a lower magnetic pole tip surface and an upper magnetic pole bottom surface of a conventional magnetic recording/reproducing combination head.

That is, the plane shape of a surface of the lower magnetic pole tip 11 contacting the recording magnetic gap 12 and the plane shape of a surface of the upper magnetic pole tip 16 contacting the recording magnetic gap 12 are, as shown in FIG. 2A, nearly similar. When the lower magnetic pole tip and the upper magnetic pole tip are formed through a conventional alignment process, their shapes are formed with the total accuracy accumulated during various processes (reticle accuracy, photo-resist pattern accuracy, etching accuracy) of the respective magnetic pole tips. Therefore, as shown in FIG. 2B, a lower magnetic pole tip 11' and an upper magnetic pole tip 16' have different plane shapes respectively.

Figure 3:
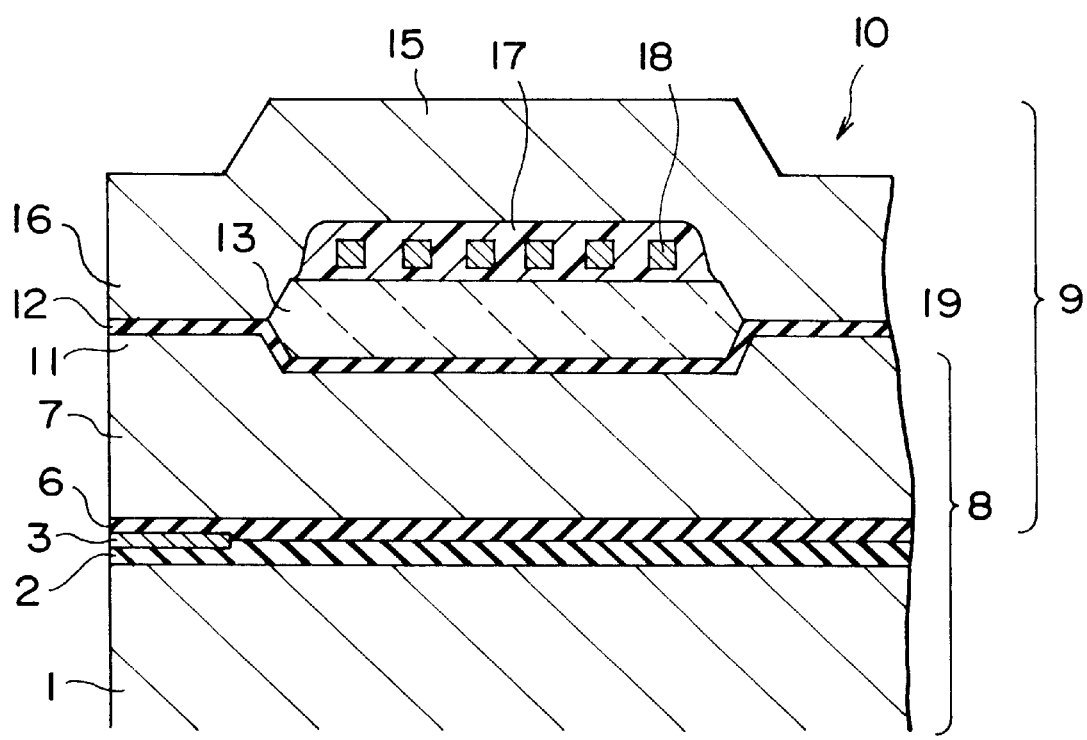
FIG. 3 is a cross sectional view seen from perpendicular direction to the air bearing surface of the magnetic recording/reproducing combination head shown in FIG. 1.

Behind an upper magnetic pole 15 including the magnetic pole tip 16 formed embedding in the concave portion 14, as shown in FIG. 3, on a non-magnetic material layer 13, a coil 18 is formed embedded in an insulating layer 17 of such as polyimide. The coil 18 is formed of such as Cu. With above described respective constituent elements, a magnetic recording/reproducing combination head 10 is formed.

Figure 4:
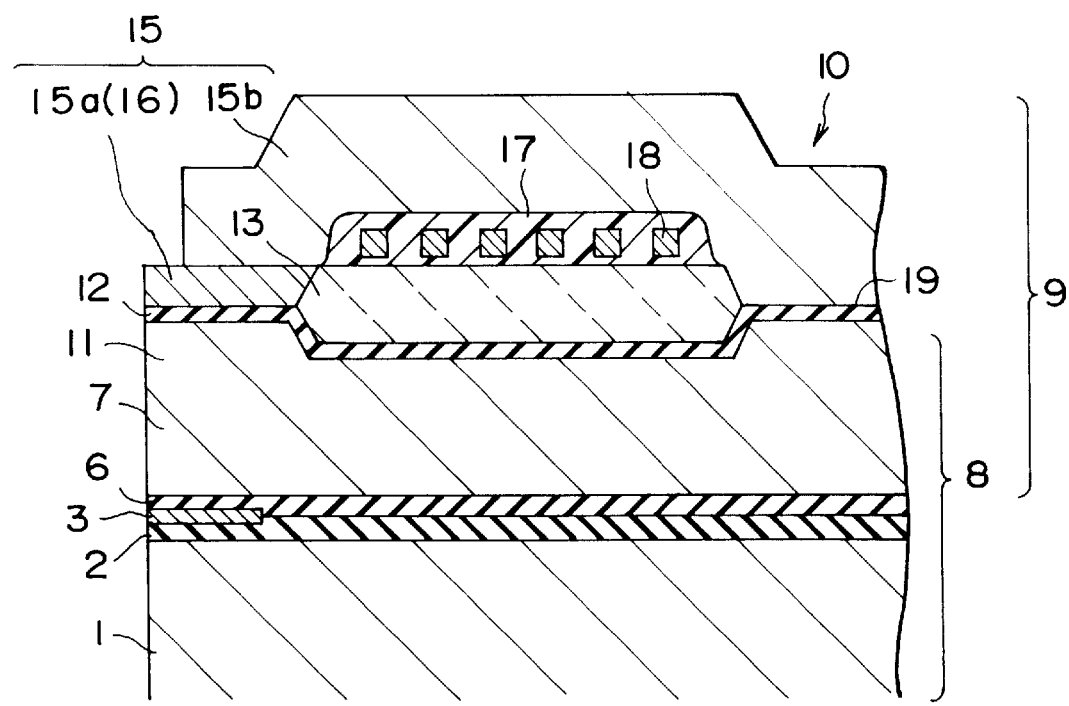
FIG. 4 is a cross sectional view showing an example of modification of the magnetic recording/reproducing combination head shown in FIG. 3.

Further, FIG. 3 shows a head structure obtained by collectively forming films for the upper magnetic pole 15. The upper magnetic pole 15 can, as shown in FIG. 4, be a separate type magnetic pole which is constituted of a magnetic pole top half body 15a (16) formed embedded inside the concave portion 14 formed of the non-magnetic material layer 13 and a magnetic pole rear portion half body 15b extending to a back gap 19 surface contacting with the magnetic pole tip half body 15a. FIG. 4 shows a state of the magnetic pole rear portion half body 15b recessed from the air bearing surface (ABS). The edge portion of the magnetic pole rear portion half body 15b can be disposed on the air bearing surface. The separation type magnetic pole can be applied to the other embodiment.

Now, a manufacturing process of the above described magnetic recording/reproducing combination head 10 will be explained.

Firstly, a shield type MR head 8 is formed on a not shown $Al_2O_3$·TiC substrate with an $Al_2O_3$ insulating layer. This shield type MR head 8 is manufactured according to a generally-used manufacturing method for manufacturing a shield type MR head. As will be described in detail afterward, an alignment accuracy between a reproducing track and a recording track can be further improved by self-aligning the convex portion 11 to the position of the reproducing track of the MR element portion 5. Further, also concerning patterning of a MR film 3, a self-aligning process can be applied as will be described afterward.

Next, on a reproducing magnetic head consisting of a shield type MR head 8, a recording head consisting of an induction type thin film magnetic head 9 is formed. A manufacturing process of the induction type thin film magnetic head 9 will be explained with reference to FIGS. 5A to 5C.

Figure 5A:
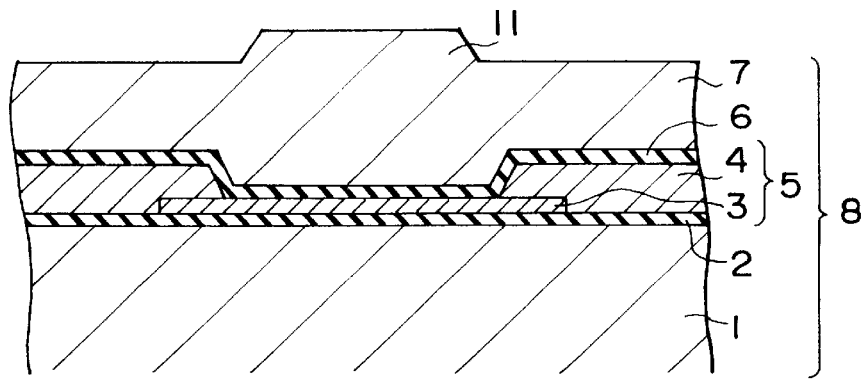
FIG. 5A, FIG. 5B and FIG. 5C show the essential steps of a manufacturing method of the magnetic recording/reproducing combination head of the present invention according to the first embodiment.

Firstly, an upper surface of the lower magnetic pole 7 which concurrently serves as an upper side magnetic shield layer of the shield type MR head 8 is flattened by a method such as an etchback or a polishing method. After this, as shown in FIG. 5A, the convex portion 11 which serves as the magnetic pole tip (a portion facing the gap) of the lower magnetic pole 7 is formed. The convex portion 11 is formed in such a manner that a width of the upper surface corresponds to a width of the recording track. For a process for forming the convex portion 11, a conventional PEP (Photo Engravement Process) technique can be applied.

That is, a height of the convex portion 11 which serves as the magnetic pole tip of the lower portion magnetic pole 7 is around from 0.3 to 0.5 μm. When the convex portion 11 has the height of this degree, it can be processed with a thin resist having a thickness of around from 0.5 to 1.0 μm. The thinner the thickness of the resist is, the more accurate become the width and position which the PEP technique can provide. The convex portion 11 of around from 0.3 to 0.5 μm height can be also processed by such as an i-line stepper with accuracy even when the width is around 0.5 μm or less. Therefore, the magnetic pole tip (convex portion) 11 of the lower magnetic pole 7 corresponding to the recording track width can be formed narrow enough and with accuracy, and aligned to the reproducing track of the MR element portion 5 with high accuracy.

Next, on the lower portion magnetic pole 7 which has the convex portion 11, a recording magnetic gap 12 consisting of, for example, $SiO_x$, Si, $AlO_x$ film of a thickness of about 0.2 μm is formed. The recording magnetic gap 12 having such a thickness can be formed along a contour of the convex portion 11 with a conventional sputtering method and the like.

Figure 6A:
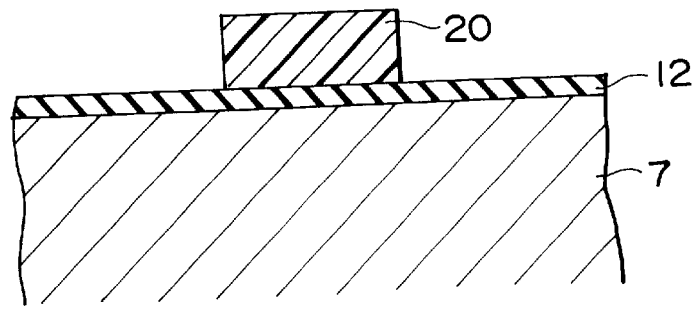
FIG. 6A and FIG. 6B show other manufacturing steps of a lower magnetic pole top surface of the magnetic recording/reproducing combination head of the present invention shown in FIG. 1.
Figure 6B:
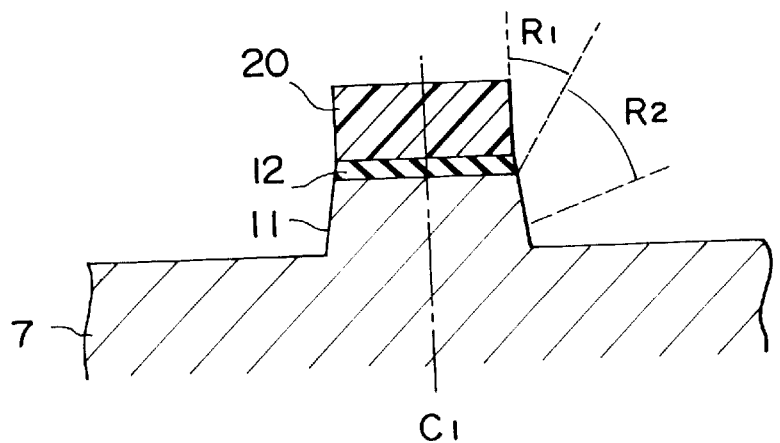

Further, after forming beforehand the recording magnetic gap 12 on the lower magnetic pole 7, by applying the PEP method on a laminate formed thereof, the convex portion can be formed. In this case, as shown in FIG. 6A, the recording magnetic gap 12 is formed on the lower magnetic pole 7. After this, resist 20 is formed on the recording magnetic gap 12, and the resist 20 is patterned according to a desired convex shape. By employing the resist 20 as a mask, the recording magnetic gap 12 and the lower magnetic pole 7 are dry etched using such as the RIE (Reactive Ion Etching) or an ion-milling method. As shown in FIG. 6B, with the dry etching process, the lower portion magnetic pole 7 possessing the convex portion 11 can be obtained. The recording magnetic gap 12 is disposed only on the convex portion 11.

Figure 7:
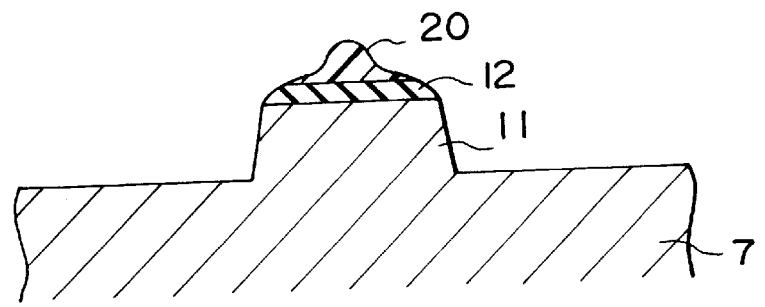
FIG. 7 is a cross sectional view showing a shape when mask function deteriorates during a processing step for processing a lower magnetic pole tip surface.

In this case, as a constituent material of the recording magnetic gap 12, $AlO_x$ is generally used. When the dry etching is applied to the recording magnetic gap 12 consisting of $AlO_x$, damage of the mask consisting of the resist 20 can be a problem. In concrete, since difference of etching rate between the recording magnetic gap 12 consisting of $AlO_x$ and the lower magnetic pole 7 consisting of NiFe alloy, FeAlSi alloy and the like is large, the resist 20 serving as the mask is etched largely during etching operation of the recording magnetic gap 12. Therefore, when the lower magnetic pole 7 is etched into a convex shape, the resist 20 does not function as the mask. The FIG. 7 shows the convex portion 11 after being damaged.

As to the problem of this kind, a non-magnetic material having a nearly equal etching rate with that of the NiFe alloy or the FeAlSi alloy can be effectively applied as a constituent material of the recording magnetic gap 12. $SiO_x$, Si, SiC, Ti, V, W can be cited for a constituent material of the recording magnetic gap 12. These materials have a milling rate of 0.2 nm/sec and more. In particular, a non-magnetic insulating material having the etching rate nearly equal to that of the lower magnetic pole 7 can be employed preferably.

For example, by employing NiFe alloy for the lower magnetic pole 7 and $SiO_x$ for the recording magnetic gap 12, even when they are ion-milled simultaneously, a convex portion 11 having a good shape can be obtained. In this case, for an angle of the ion-milling, it is preferable to designate respectively appropriate angles for the recording magnetic gap 12 and the lower magnetic pole 7. As shown in FIG. 6B, the ion-milling operation of the recording magnetic gap 12 is preferable to be executed under a condition in which an ion beam is bombarded with an angle $R_1$ of 0 to 40° relative to a center line $C_1$. As to the ion-milling operation of the lower magnetic pole 7, it is preferable to be executed under a condition in which ion beam is irradiated with an angle $R_2$ of 60 to 80° relative to the center line $C_1$.

In addition, when $SiO_x$ or the like is applied to the recording magnetic gap 12, to improve alignment distribution within a wafer, it is preferable to form a film of $SiO_x$ with an RF diode sputtering method. In a method such as RF magnetron sputtering or a reactive DC magnetron sputtering, it is effective to move a substrate relative to a target to average out the influence of erosion.

In a process described above, the non-magnetic material layer 13 consisting of such as $SiO_x$ or the like is formed on the recording magnetic gap 12 disposed on at least the convex portion 11 of the lower magnetic pole 7. When $SiO_x$ is employed for the recording magnetic gap 12, $SiN_x$ can be used for the non-magnetic material layer 13. Since the non-magnetic material layer 13 is designated to be a flattening portion of the surrounding area of the first convex portion 11 and a second convex portion 13a which is conformed to the first convex portion 11 and to be provided with the concave portion 14, it is preferable to be formed with a thickness of about 1.5 µm.

Figure 5B:
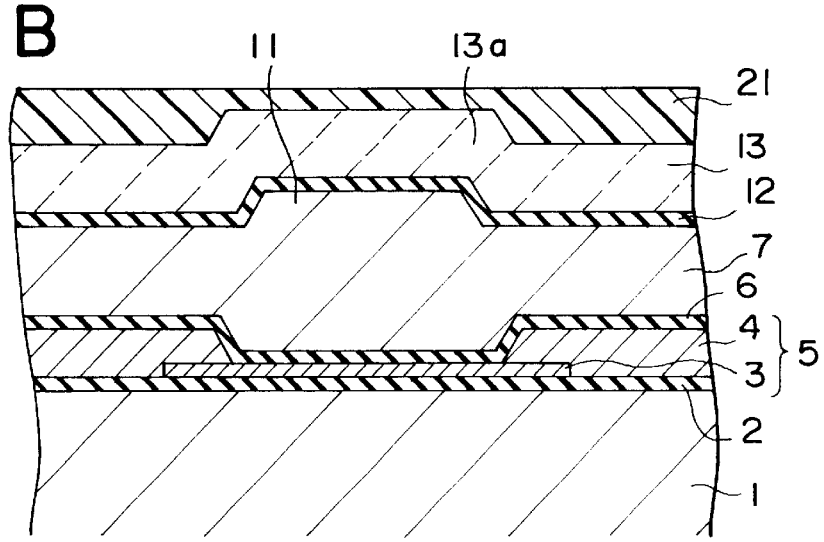

To form the non-magnetic material layer 13, it is preferable to apply a method for forming a film such as a TEOS-CVD method or a collimation sputtering method, which has a high shape adaptability, in order to for the non-magnetic material layer 13 to be formed along a shape of the convex portion 11 with an almost even thickness. Thus, as shown in FIG. 5B, the second convex portion 13a which is obtained by transcribing a shape of the convex portion 11 can be formed.

However, the width or taper shape of the convex portion 13a of the non-magnetic material layer 13 can be controlled appropriately. By applying a bias voltage to a substrate or the like, the width or taper shape of the convex portion 13a can be controlled. The width of the convex portion 13a can be controlled larger or smaller than the shape of the convex portion 11 of the lower portion magnetic pole 7.

Figure 8:
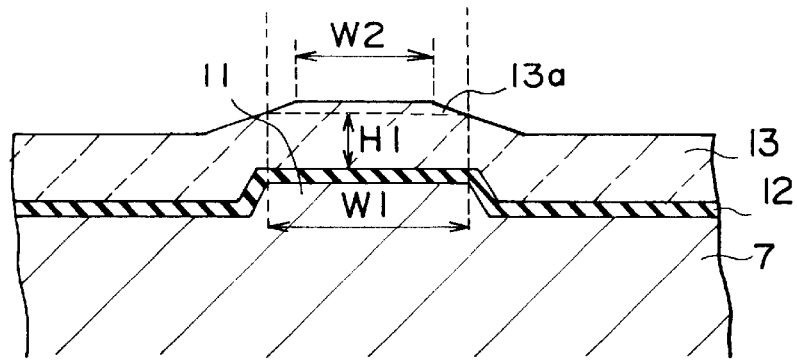
FIG. 8 is a diagram for explaining essential details of the manufacturing method of a recording head shown in FIG. 5.

Further, if a difference of the width between the upper surface width ($W_1$) of the lower magnetic pole tip 11 (convex portion) contacting the recording magnetic gap 12 and the lower surface width ($W_3$) of the upper magnetic pole tip 16 disposed embedding inside the concave portion 14 becomes larger, the sidewriting increases. Therefore, $W_1$ and $W_3$ are desirable to be set equal as much as possible. In order to realize the above described condition, as shown in FIG. 8, it is preferable to form the non-magnetic material layer 13 in such a manner that the upper surface width $W_2$ of the second convex portion 13a of the non-magnetic material layer 13 satisfies a relation, $W_1 \geq W_2$ relative to the upper surface width $W_1$ of the convex portion 11.

Figure 9:
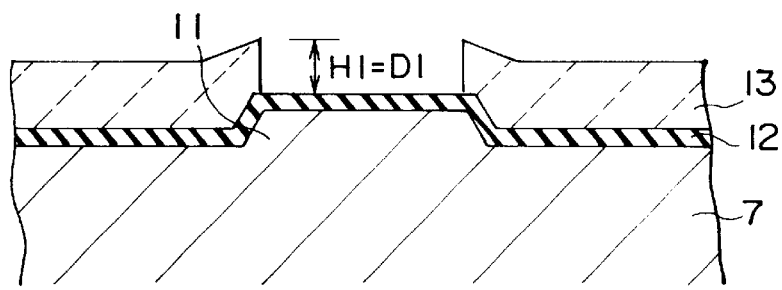
FIG. 9 is a diagram for explaining a state of the later processing step of the manufacturing method of the recording head shown in FIG. 8.
Figure 10:
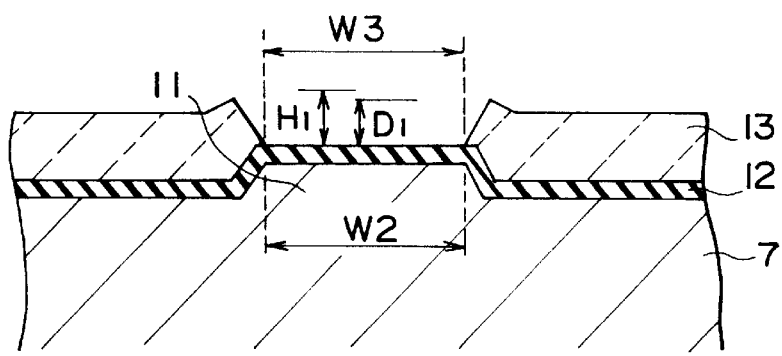
FIG. 10 is a cross sectional view showing the essential parts of the other manufacturing steps of the magnetic recording/reproducing combination head shown in FIG. 1.

If $H_1$ is the height from the upper surface of the recording magnetic gap 12 at the time when the width $W_2$ and width $W_1$ become equal, as shown in FIG. 9 for above described non-magnetic material layer 13, a depth $D_1$ of the concave portion 14 in which the upper magnetic pole tip 16 is embedded can be made equal with $H_1$. Otherwise, as shown in FIG. 10, by making smaller $D_1$ than $H_1$, $W_1$ can be made equal with $W_3$. With either methods described above, protrusion remains at the edge portion of the concave portion 14 side of the non-magnetic material layer 13 during the etching process.

In this case, the non-magnetic material layer 13 can be formed with any film forming method such as a sputtering method or a CVD method. When the sputtering method is employed, generally speaking, if an input power to the target is constant, as a substrate bias power is increased, $W_2$ becomes smaller. For example, when the sputtering gas pressure is 0.26 Pa and a target input power is 6.3 W/cm$^2$, and if the substrate bias power is set at 0.08 W/cm$^2$ or more, a non-magnetic material layer 13 satisfying the relation of $W1 \geq W2$ can be obtained.

Next, as shown in FIG. 5B, a flattening layer 21 is formed on the non-magnetic material layer 13 which has a second convex portion 13a conformed to the first convex portion 11. A flattening resin can be used for the flattening layer 21. A low-molecular weight resin such as novolak resin can be used for the flattening resin. Since the low-molecular weight resin can be fluidized by heating at, for example, 473 K, heat treatment after coating can flatten its surface.

The terms "flattening layer" and "flattening resin" are also referred to in the art as "planarization layer" and "planarization resin", respectfully.

In this case, the flattening layer 21 is thin immediate above the second convex portion 13a and thick on the surrounding area which surrounds laterally the second convex portion 13a. For example, by etching under a condition where the non-magnetic material layer 13 is etched with a larger etching rate than the flattening resin, the thicker portion surrounding the convex portion 11 of the flattening layer 21 can be made to serve as a substantial mask 21a. The substantial mask 21a laterally surrounds the second convex portion 13a. Etching operation can be executed by RIE method with such as a fluorine based reactive gas.

Figure 5C:
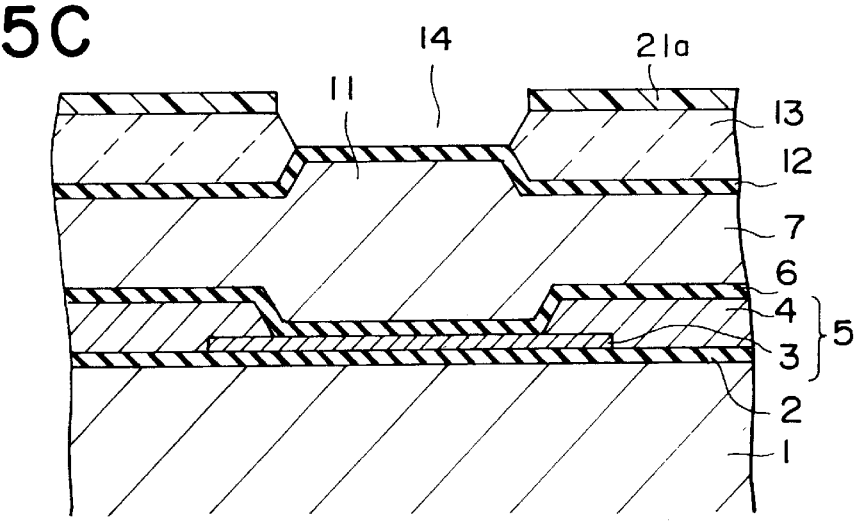

Therefore, as shown in FIG. 5C, by etching to remove selectively the second convex portion of the non-magnetic material layer 13a above the first convex portion 11, the concave portion 14 can be formed. In this case, by employing a reactive gas which has selectivity for $SiO_x$ or the like forming the non-magnetic material layer 13 and a small etching rate to the recording magnetic gap 12 consisting of such as AlO$_x$, Si, SiN$_x$, or the like, the recording magnetic gap 12 functions as an etching stopper layer. Therefore, even if being overetched a little bit, a narrow gap structure can be formed with high precision. Further, when the recording magnetic gap 12 is composed of SiO$_x$, SiN$_x$ and the like, SiN$_x$ and the like can be applied for the non-magnetic material layer 13.

The concave portion 14 is preferred to have tapered side walls. With such a shape of the concave portion 14, an upper magnetic pole tip 16 can be obtained with a desirable morphology. Further, the tapered shape of the concave portion 14 is also effective for magnetic recording characteristics. To give a tapered shape to the side wall of the concave portion 14, it is preferable to set a selection ratio (etching rate) by RIE between the flattening layer 21 and the non-magnetic material layer 13 at low. Usually, it is set around 3 to 4.

The etching process described above is, based on an effect of the convex shape transcribed on the non-magnetic material layer 13 and the flattening layer 21, executed by using the resin layer (21) in which an area surrounding the convex portion 11 is formed thick as a mask. Thus, without exposing to a conventional alignment process, an concave portion 14 can be obtained by dimensionally aligning to the upper portion of the convex portion 11. That is, the concave portion 14 is aligned to the convex portion 11 by employing self-alignment.

After this, as shown in FIG. 1, by embedding soft magnetic material inside the concave portion, the upper magnetic pole 15 is formed while forming the magnetic pole tip 16. With such a manufacturing process, the magnetic pole tip (convex portion) 11 of the lower magnetic pole 7 and the magnetic pole tip (corresponds to the inside of the concave portion 14) 16 of the upper magnetic pole 15 can be obtained in which center positions $C_1$, $C_2$ are aligned with high precision to overlap each other through the recording magnetic gap 12. The widths of the surfaces of these magnetic pole tops 11, 16, can be made equal, the surfaces being opposite to the recording magnetic gap 12. Further, the plane shapes of the surfaces of the lower portion magnetic pole top 11 and the upper magnetic pole tip 16 can be made almost similar, the both surfaces being in contact with the recording magnetic gap 12.

Various film forming methods for forming a film can be employed for embedding a soft magnetic material inside the concave portion 14. In particular, a film forming method such as a plating method and a method having a high directivity such as a collimation sputtering, a long throw sputtering method can be applied preferably. With the plating method, inside the finely patterned concave portion 14 which corresponds to a narrow track, the soft magnetic material can be embedded favorably. When a film forming method having a high directivity is employed, a soft magnetic material having a relatively high specific resistance such as an amorphous soft magnetic material or a microcrystalline soft magnetic material can be embedded favorably, thus a superior magnetic characteristics at high frequency region can be obtained.

Then, as shown in FIG. 3, on the non-magnetic material layer 13 positioned behind the upper magnetic pole 15, an insulating layer 16 embedded with a coil 17 is formed, then by forming a protective layer consisting of not shown AlO$_x$ or the like, a main portion of a recording/reproducing combination magnetic head 10 can be completed.

Further, in a manufacturing method above described, the recording magnetic gap 12 can be formed with the same manner as the upper magnetic pole 15 after the concave portion 14 is formed on the non-magnetic material layer 13. In addition, application of the flattening layer 21 is not limited to the direct application as a masking material above described. For example, it can be applied in such a manner in that, after a conventional resist is formed on the convex shape non-magnetic material layer 13, the flattening layer 21 is formed, and, by etching back the flattening layer 21, the flattened surface can be transcribed on the resist. In this case, the flattened resist is used as a masking material. A film formed with the sputtering method can be used as a mask instead of the resist. Further, a film flattened by CMP can be used for the flattening layer 21.

In a manufacturing process of a magnetic recording/reproducing combination head 10, in particular, of an induction type thin film magnetic head 9 of the embodiment, based on a convex shape transcribed on the non-magnetic material layer 13 and the flattening layer 21, the concave portion 14 is self-aligned to the convex portion 11. Inside this concave portion 14, the upper magnetic pole tip 16 which opposes to the lower magnetic pole tip 11 through the recording magnetic gap 12 is formed embedding. Thereby, a narrow track magnetic head structure in which the widths of the lower magnetic pole tip 11 and the upper magnetic pole tip 16, both of which are opposite to the recording magnetic gap 12, are almost same, without being influenced by an alignment accuracy due to exposure, can be manufactured with high accuracy. Such an induction type thin film magnetic head 9 can fully respond to a requirement for high densification of the recording density by narrowing the track.

Further, the manufacturing process of the embodiment is corresponding to a conventional etching process and film forming process and, in addition, an alignment process, an exposure and developing process can be eliminated. Therefore, a high performance induction type thin film magnetic head 9, further, a magnetic recording/reproducing combination head 10 making use of the induction type thin film magnetic head 9 as a recording head can be manufactured at low cost. That is, mass-productivity can be fully satisfied.

In an obtained head structure, each width at the air bearing surface of the lower magnetic pole tip 11 and the upper magnetic pole tip 16 is converged toward the recording magnetic gap 12 respectively. Therefore, a magnetic field intensity at the recording magnetic gap 12 can be enhanced. In other words, a superior magnetic field gradient can be obtained, thus, NLTS can be made small. These structure largely contribute to improve the line magnetic recording characteristics when the higher recording density is attained by narrowing the track.

Further, since a plane shape of the concave portion 14 destined to be a forming position of the upper magnetic pole top 16 is formed by transcribing the plane shape of the convex portion 11, each plane shape of the concave portion 14 and the convex portion 11 becomes almost similar. Therefore, as shown in FIG. 2A, both plane shapes of respective surfaces of the lower magnetic pole tip 11 and the upper magnetic pole tip 16 contacting the recording magnetic gap 12 are almost similar each other.

An air bearing surface (ABS) of a magnetic head can be conventionally obtained by polishing along a direction of head height. In a thin film magnetic head 9 of the present embodiment, since the respective plane shapes of the lower magnetic pole tip 11 and the upper magnetic pole tip 16 are almost similar each other, even if the height deviated a little, the difference between the width of the lower magnetic pole 11 and the width of the upper magnetic pole 16 can be made almost same. As a result, even if the height deviated a little, almost same side fringe can be obtained, in addition, the side fringe per se can be made small. Thus, the thin film magnetic heads 9 uniform in their performance can be obtained with good reproducibility. Further, in a conventional thin film magnetic head shown in FIG. 2B, the side fringe becomes large depending on the height, in addition, the side fringe per se tends to become large.

Figure 11:
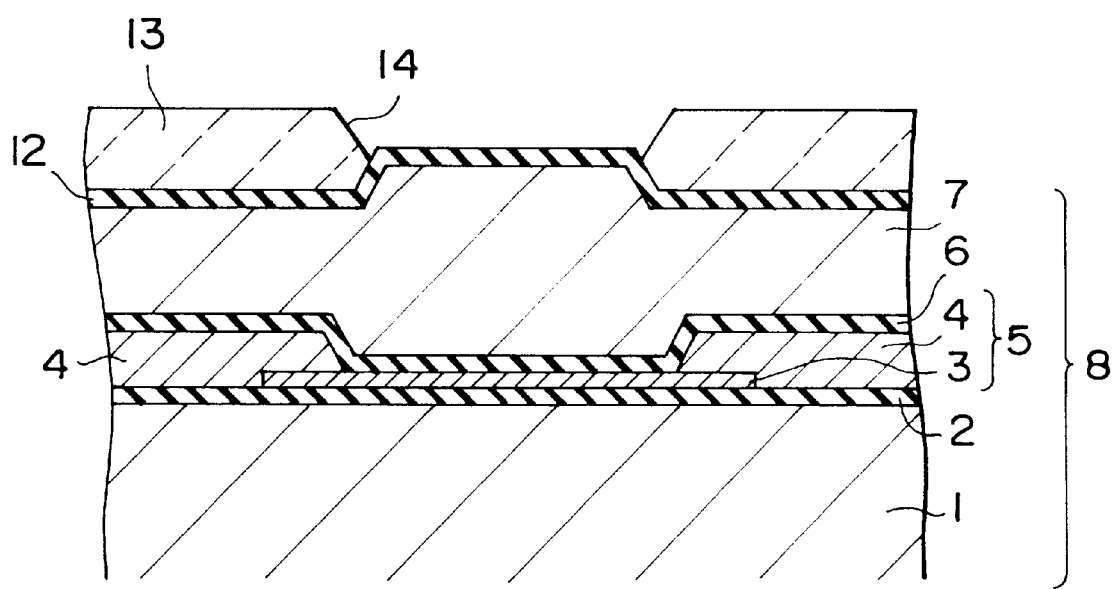
FIG. 11 is a cross sectional view showing manufacturing process of the magnetic recording/reproducing combination head of the second embodiment of the present invention.
Figure 12:
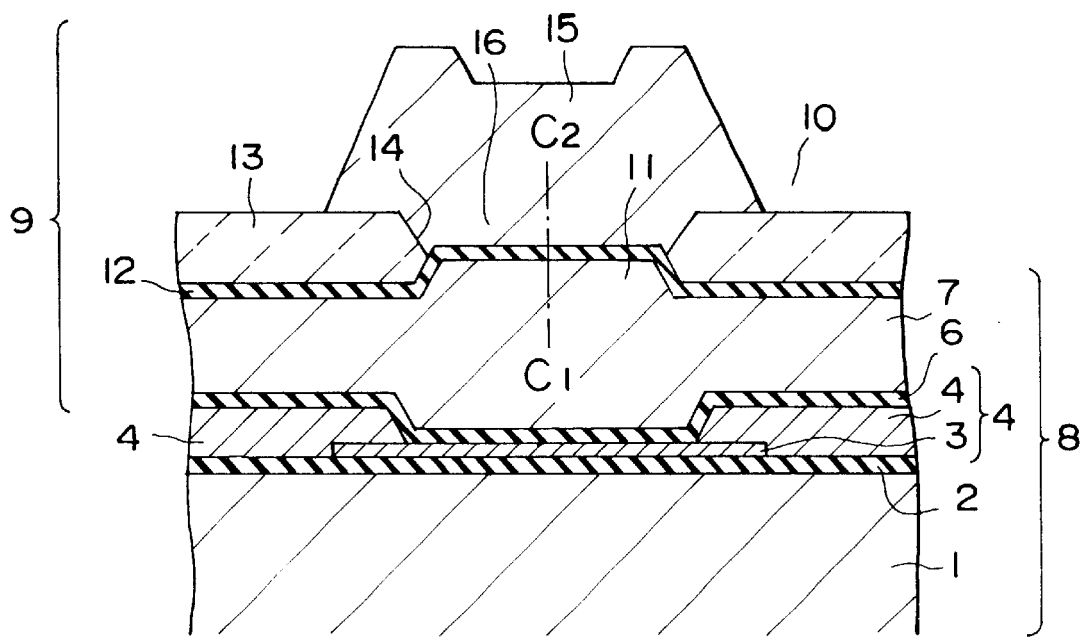
FIG. 12 is a cross sectional view seen from the air bearing surface of a structure of the magnetic recording/reproducing combination head of the second embodiment of the present invention.

The concave portion 14 formed by self-aligning to the convex portion 11, by controlling its forming process (in particular, etching process), as shown in FIG. 11, can be formed broader than the convex portion which serves as the lower magnetic pole tip 11. When the upper magnetic pole tip 16 is formed by embedding a soft magnetic material inside the concave portion 14 having such a shape, as shown in FIG. 12, both edges of the upper portion magnetic pole top 16 on the recording magnetic gap 12 side can form a shape protruding up to the neighboring of side surfaces of the lower magnetic pole tip 11. This situation is shown in enlargement in FIG. 13. When applied the above described process, the protruded portions 16a at both edges of the upper magnetic pole top 16 can be controlled in their respective widths less than around 0.05 $\mu$m.

Figure 13:
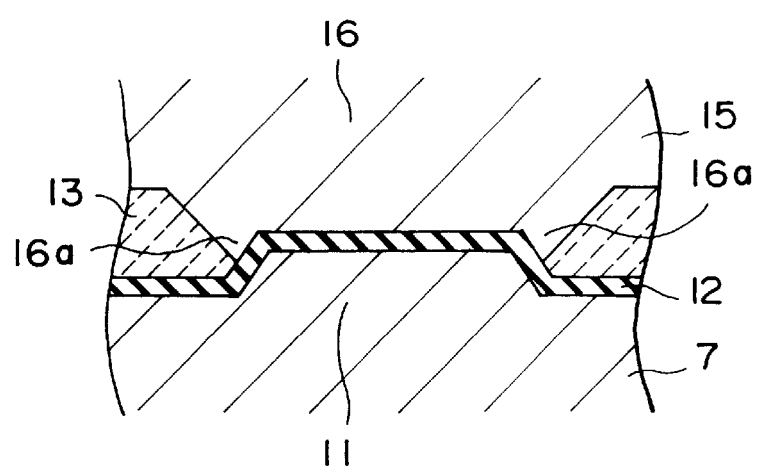
FIG. 13 is a partially enlarged cross sectional view showing a recording track part of the magnetic recording/reproducing combination head shown in FIG. 12.

As shown in FIG. 13, the concave portion 14 possesses a central portion and edge portions adjoining the central portion in a track width direction. The edge portions are protruded toward the lower magnetic pole tip 11 side rather than to the central portion. A magnetic layer embedded inside the edge portions of such concave portion 14 constitutes a protruded portion 16a protruded toward the lower magnetic pole top 11 side. By protruding the both edges of the magnetic pole tip 16 on the recording magnetic gap 12 side up to neighborhood of the side surfaces of the lower magnetic pole tip 11, the magnetic field which leaks to the side surfaces of the magnetic pole top 11, 16 can be suppressed drastically. That is, magnetic flux which leaks to both side surfaces of the track and causes sidewrite during recording can be suppressed. Thereby, the width of the sidewrite can be suppressed from the present around 0.1 to 0.2 $\mu$m to around 0.05 $\mu$m.

Here, if the both edges of the upper magnetic pole tip 16 are protruded through a conventional alignment process, the width of the protruded portion becomes, naturally, more broad. The recording magnetic field per se is decreased thereby, thus the recording characteristics deteriorates. On the contrary, in the present invention, since the protruded portions 16a for preventing the sidewrite are formed based on the self-alignment process of the concave portion 14, the respective widths can be controlled to less than around 0.05 $\mu$m. Therefore, without adversely affecting the recording characteristics, the sidewrite can be prevented.

Figure 14:
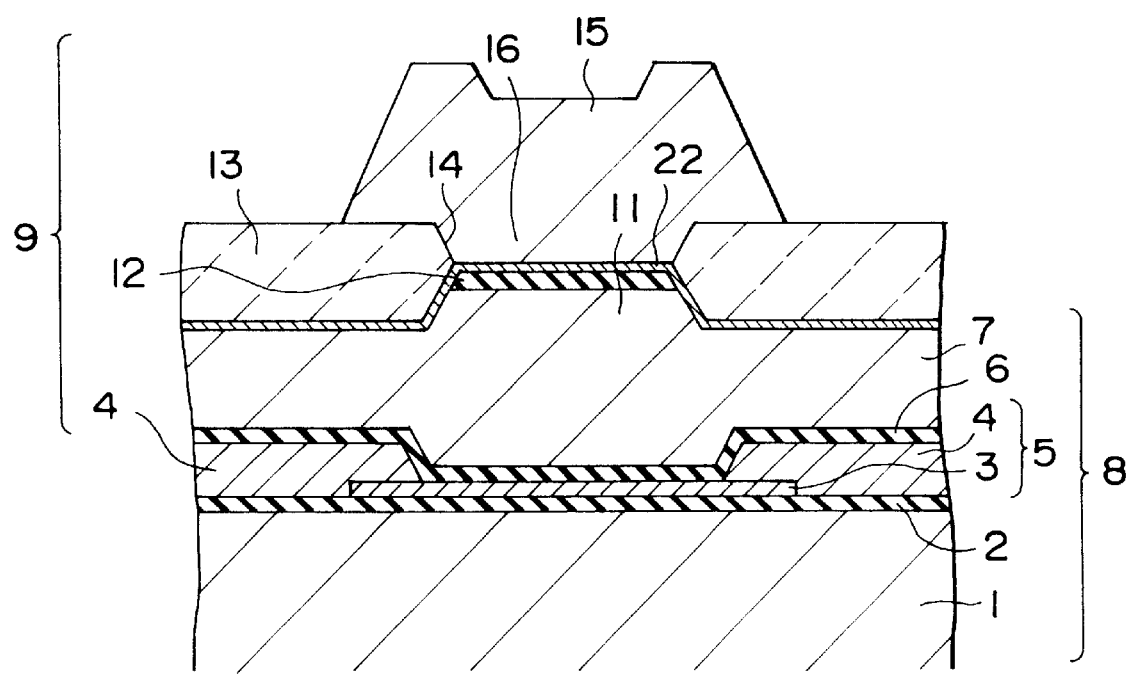
FIG. 14 is a cross sectional view showing a structure of the magnetic recording/reproducing combination head according to the third embodiment of the present invention seen from the air bearing surface.

The sidewrite, as shown in FIG. 14, by forming a soft magnetic material layer 22 of a thickness, for example, of 0.05 $\mu$m in such a manner that cover an upper surface side of the recording magnetic gap 12 and both side surfaces of the lower magnetic pole tip 11, can be prevented more effectively. That is, the magnetic flux which leaks to the both side surfaces of the track during recording operation reaches to the other magnetic pole through the soft magnetic material layer 22. Therefore, the leakage of the magnetic flux to the both side surfaces of the track during recording operation can be reduced as much as possible. Such a head structure can be easily obtained by making use of the self-alignment process of the concave portion 14. A manufacturing process will be explained in the following.

Firstly, an upper portion of the lower magnetic pole 7 is processed into a convex shape including the recording magnetic gap 12. Secondly, on the lower magnetic pole 7 which is disposed with the recording magnetic gap 12 only on the convex portion (magnetic pole top) 11, the soft magnetic layer 22 of a thickness of about 0.05 $\mu$m is formed. After the non-magnetic material layer 13 is formed thereon, the concave portion 14 is formed by making use of a self-alignment process. On this occasion, the soft magnetic layer 22 exists on the bottom portion of the concave portion 14. By embedding the soft magnetic material inside the concave portion 14, the upper magnetic pole 15 is formed while forming the magnetic pole top 16. Therefore, a portion of the soft magnetic layer 22, which contacts the recording magnetic gap 12, becomes a part of the upper magnetic pole tip 16, further, a portion which contacts both surface side of the lower magnetic pole tip 11 forms a preventing layer for preventing the sidewrite.

As described above, in the present invention, a manufacturing process of a shield type MR head 8, which serves as a reproducing head, and a forming process for forming the lower magnetic pole tip (convex portion) 11 can be executed based on the conventional PEP process. Since the height of the convex portion 11 is low, even if the conventional PEP process is employed, the convex portion 11 corresponding to the recording track can be formed with precision relative to the reproducing track. Further, the convex portion 11 can, as identical with the formation process of the concave portion 14 according to the self-alignment, be formed by self-aligning to the concave portion formed through a pair of reproducing electrodes 4, 4. The convex portion 11 can be self-aligned to the concave portion formed of a pair of bias films. Thereby, the accuracy in positioning the reproducing track and the recording track can be much improved.

A manufacturing process of a shield type MR head 8 including a self-alignment process of the convex portion 11, further a manufacturing process of a magnetic recording/reproducing combination head will be explained with reference to FIG. 15A to FIG. 15D, FIG. 16A to FIG. 16E, and FIG. 17.

Firstly, on a not shown $Al_2O_3$·TiC substrate with an $Al_2O_3$ insulating film, a soft magnetic layer serving as the lower magnetic shield layer 1 is formed with the sputtering method or the like. Thereon, a lower reproducing magnetic gap 2 consisting of $AlO_x$ film of a thickness of about 0.1 $\mu$m and a MR film 3 consisting of an anisotropic magneto-resistance effect film or a spin valve film are sequentially formed.

Figure 15A:
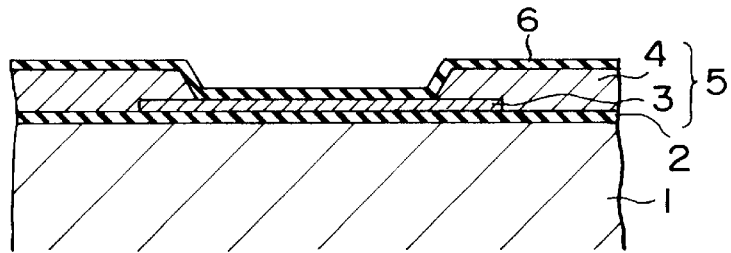
FIG. 15A, FIG. 15B, FIG. 15C and FIG. 15D are diagrams showing the essential manufacturing steps in accordance with the second embodiment of the manufacturing method of the magnetic recording/reproducing combination head of the present invention.

After the MR film 3 is patterned into a predetermined shape, a pair of reproducing electrodes 4, 4 consisting of Cu layer and the like of a thickness of about 0.2 $\mu$m are formed on both edges by, for example, a lift-off method to form a MR element portion 5. Further thereon, an upper reproducing magnetic gap 6 consisting of $AlO_x$ film and the like of a thickness of such as about 0.1 $\mu$m is formed (FIG. 15A). In addition, below a reproducing electrode 4, a bias film can be formed and the height of the concave portion which will be described afterward can be controlled.

Figure 15B:
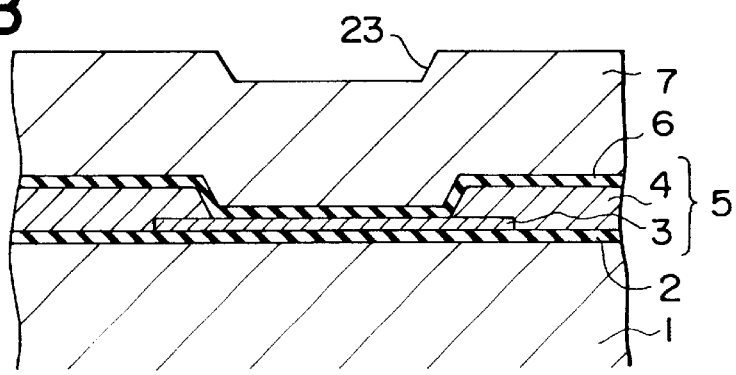

In the MR element portion 5 described above, the reproducing track is restricted by a spacing between a pair of the reproducing electrodes 4, 4. An upper reproducing magnetic gap 6 formed including on these reproducing electrode 4 has a concave shape corresponding to the spacing and the thickness between a pair of reproducing electrodes 4, 4. As shown in FIG. 15B, on the upper side reproducing magnetic gap 6 having a concave shape, a soft magnetic layer serving as an upper side magnetic shield layer 7 is formed.

The upper magnetic shield layer 7 is preferable to be formed, with a film forming method such as a CVD method or a collimation sputtering method which has a high shape adaptability, in such a manner that form a film with an almost uniform thickness along a concave shape of the upper side reproducing magnetic gap 6. Thereby, as shown in FIG. 15B, the upper side magnetic shield layer 7 having a concave portion 23, which is obtained by transcribing the concave shape of the upper side reproducing magnetic gap 6, can be obtained. The thickness of the upper side magnetic shield layer 7 is set that the thickness corresponding to the concave portion 23 has a thickness which includes the convex portion 11 corresponding to the recording track.

Figure 15C:
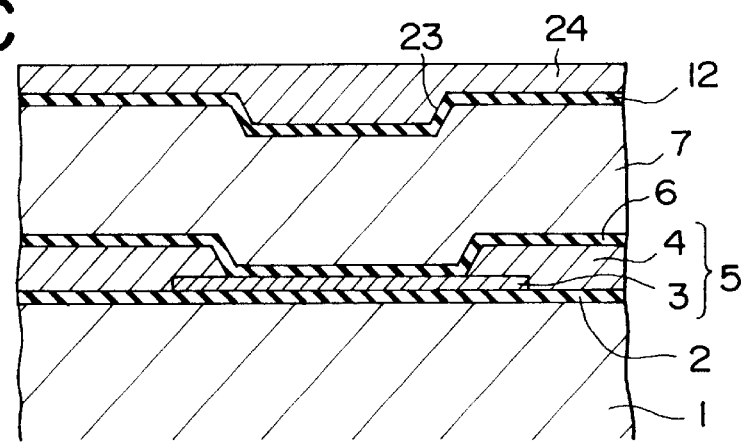

Secondly, on the upper side magnetic shield layer 7 having the concave portion 23, that is, on the lower magnetic pole 7 which concurrently serves as the upper side magnetic shield layer, a recording magnetic gap 12 consisting of $AlO_x$ film and the like of a thickness of about 0.2 $\mu$m is formed. Thereafter, as shown in FIG. 15C, with the identical manufacturing process as that described above, a flattening layer (flattening resin layer) 24 is formed.

Now, the flattening layer 24 is thick immediately above the concave portion 23 which corresponds to the reproducing track and thin on other place surrounding that thick place. With such a flattening layer (resin layer) 24 as a masking material, the lower magnetic pole 7 can be etched with such as a RIE method. The RIE operation is executed under a condition in which the etching rate of the lower magnetic gap 7 is larger than that of the resin layer 24. The thicker portion of the flattening resin layer 24 functions as a substantial mask.

Figure 15D:
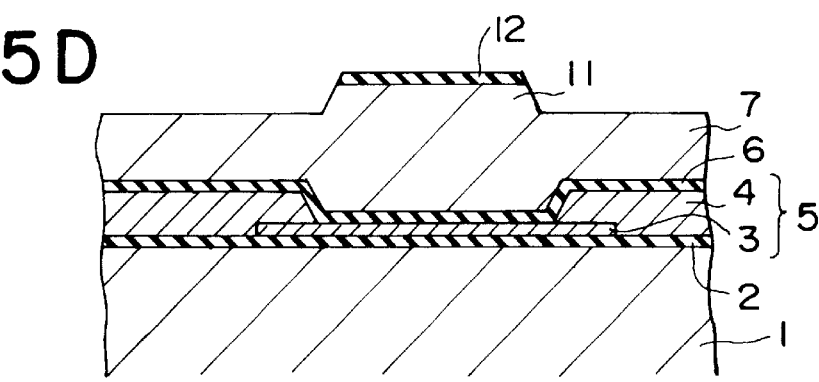

Therefore, as shown in FIG. 15D, the lower magnetic pole 7 surrounding the concave portion 23 corresponding to the reproducing track is selectively eliminated by etching. The convex portion 11 corresponding to the concave portion 23 can be formed thereby. In this case, when a reactive gas, which has selectivity with respect to the lower magnetic pole 7 and the etching speed slow with respect to the recording magnetic gap 12, is employed, the recording magnetic gap 12 functions as an etching stopper layer. Thereby, even if a little bit being overetched, a narrow gap structure can be obtained with high precision.

The above described etching process, based on the concave portion 23 which corresponds to the concave shape of the reproducing track obtained by transcribing on the lower portion magnetic pole 7 and a surface flattening effect, is executed by making use of the flattening resin layer 24 thick on the concave portion 23 as a mask. Therefore, without exposing to the conventional alignment process, the convex portion 11 aligned dimensionally to the concave portion 23 which corresponds to the reproducing track can be obtained. The convex portion 11 is aligned dimensionally to the concave portion 23 based on self-alignment. That is, the concave portion 23 corresponding to the reproducing track and the convex portion 11 corresponding to the recording track can be aligned with high precision based on self-alignment.

Figure 16A:
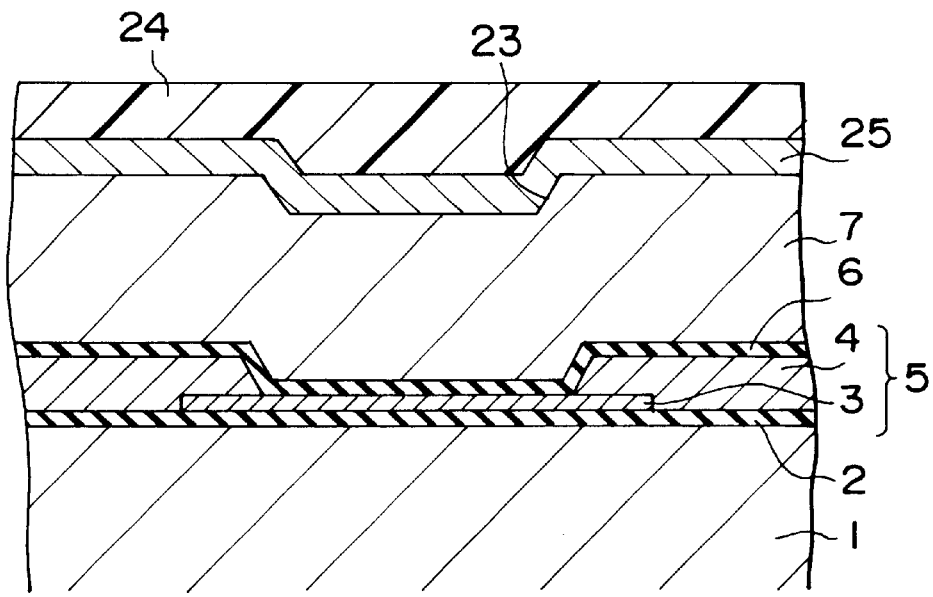
FIG. 16A and FIG. 16B are diagrams showing the essential manufacturing steps of an example of modification of the second embodiment of the manufacturing method of the magnetic recording/reproducing combination head of the present invention.

The convex portion 11 can be formed, for example, in the following manner. As shown in FIG. 16A, on the lower magnetic pole 7 possessing the concave portion 23, a masking material 25 possessing a smaller ion milling rate than that of the lower magnetic pole 7 such as $AlO_x$ is formed. The masking material 25 is formed along a contour of the concave portion 23. Thereon, the flattening layer 24 is formed.

Figure 16B:
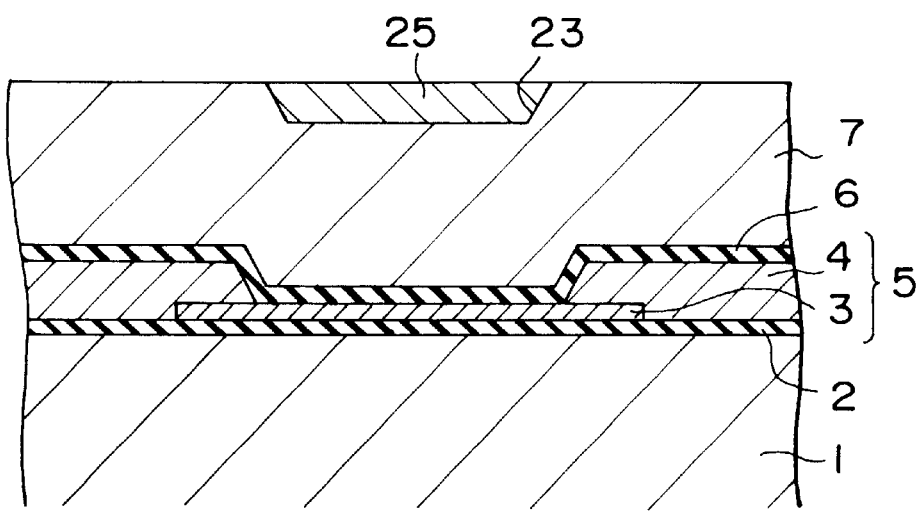

Next, by etching the flattening layer 24 and the masking material 25 with, for example, an ion-milling method, as shown in FIG. 16B, the masking material can be disposed only on the concave portion 23. With the masking material 25 inside the concave portion 23 as a mask, the lower magnetic pole 7 is etched. As identical with FIG. 15D, the convex portion 11 corresponding to the concave portion 23 can be formed on the lower magnetic pole 7.

As alternative methods for forming the convex portion 11, the following methods can be cited. Firstly, on the lower magnetic pole 7 possessing the concave portion 23, a masking material easy in reactive ion-etching such as $SiO_x$ or $AlO_x$ is formed. The masking material is formed along the contour of the concave portion 23. Thereon, the flattening layer is formed. By etching the flattening layer with ion-milling or reactive ion-etching method, the flattening layer is remained only inside the concave portion of the masking material.

Then, with the flattening layer (resin layer) existing only inside the concave portion as a mask, the masking material is reactive ion-etched. In this case, the etching is executed under a condition in which the etching rate of the flattening layer (resin layer) is low and that of the masking material is fast. The shape of the mask material becomes a convex shape corresponding to the shape of the concave portion. With this mask material having the convex shape as a mask, the lower magnetic pole 7 is etched. As identical with FIG. 15D, the convex portion 11 corresponding to the concave portion 23 is formed on the lower magnetic pole 7.

Figure 17:
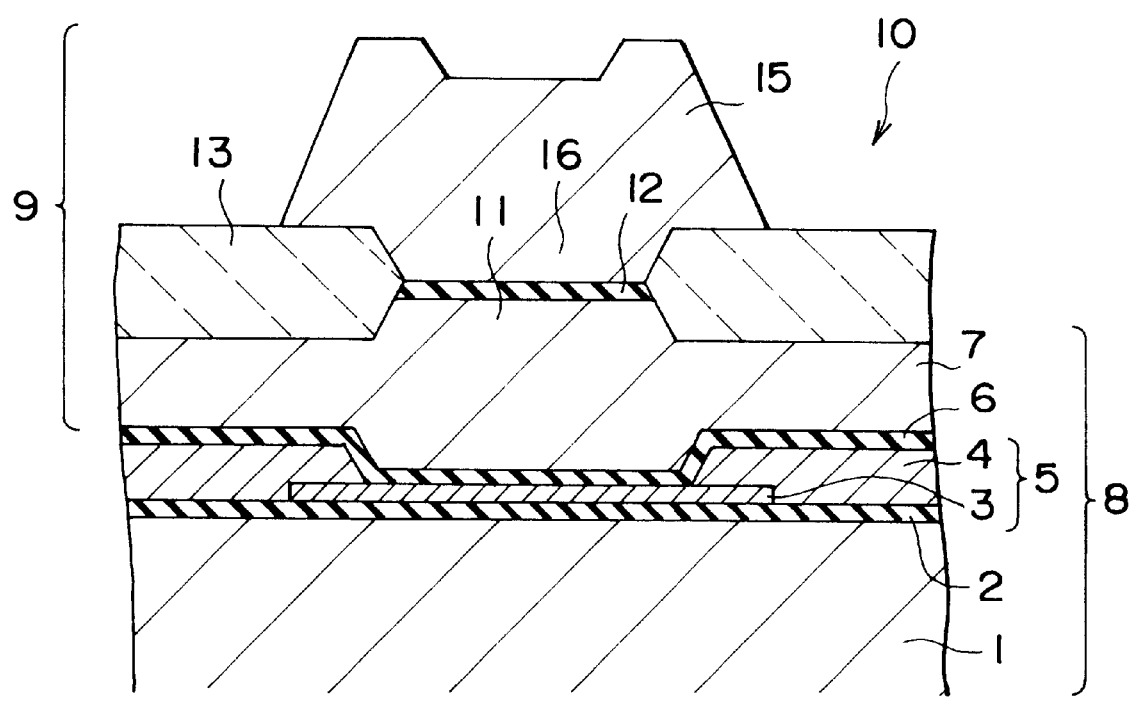
FIG. 17 is a cross sectional view showing a structure of the magnetic recording/reproducing combination head produced according to the second embodiment of the present invention seen from the air bearing surface.

As shown in FIG. 15D, by making use of the lower magnetic pole tip (convex portion) 11 which is provided with a recording magnetic gap 12 on the upper surface, as identical with the manufacturing process shown in FIG. 5A to 5C, respective manufacturing processes such as a process for forming the non-magnetic material layer 13, a process for forming the flattening layer 21, a process for etching which makes use of the flattening layer 21, a process for forming the upper magnetic pole 15, and the like are executed. As shown in FIG. 17, a magnetic recording/reproducing combination head 10 possessing a reproducing head consisting of a shield type MR head 8 and a recording head consisting of an induction type thin film magnetic head 9 can be obtained.

In the manufacturing process above described, the thickness of the mask positioned inside the concave portion 23 of the lower magnetic pole 7 corresponds roughly to the difference in the level caused by the reproducing electrode 4. Therefore, for the height of the convex portion serving as the lower magnetic pole tip 11, the situation is same. If the lower magnetic pole tip 11 is required to be raised, the following manufacturing process can be applied.

Figure 18A:
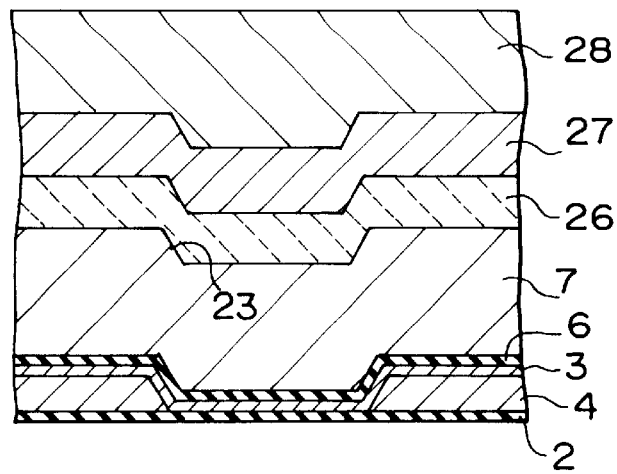
FIG. 18A, FIG. 18B and FIG. 18C are cross sectional views showing an example of modification of the manufacturing method of the magnetic recording/reproducing combination head of the present invention.
Figure 18B:
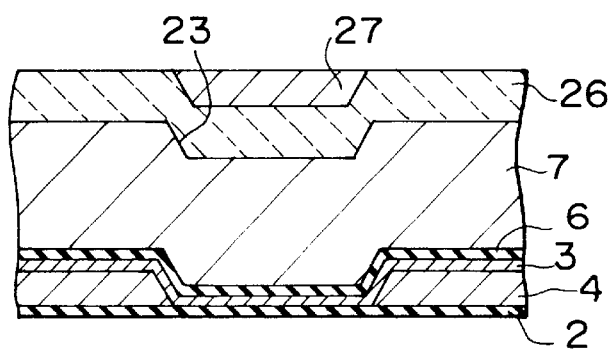
Figure 18C:
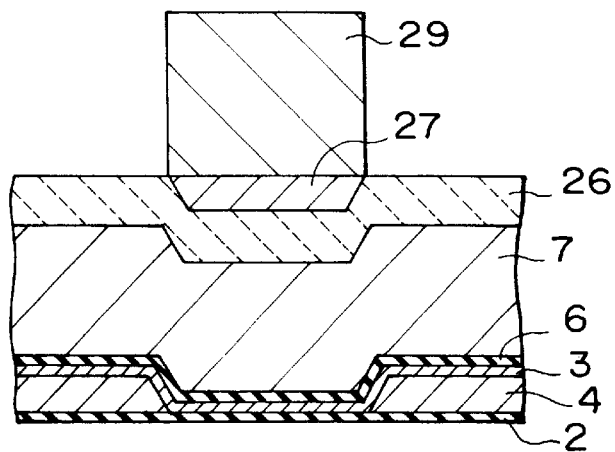

At first, as shown in FIG. 18A, on the lower magnetic pole 7 possessing a concave portion 23, an insulating film such as $SiO_x$ and a metal film 27 are sequentially formed. Thereon, a flattening layer 28 is formed. Then, the flattening layer 28 and a metal layer 27 are etched by, for example, ion-milling method or reactive ion-etching method. As shown in FIG. 18B, the metal film 27 is disposed only inside a concave portion of the insulating film 26 which corresponds to the concave portion 23 of a lower magnetic pole 7. On the remaining metal film 27, as shown in FIG. 18C, a plated film (for example, Cu) 29 is formed with an electroless plating method.

Figure 19A:
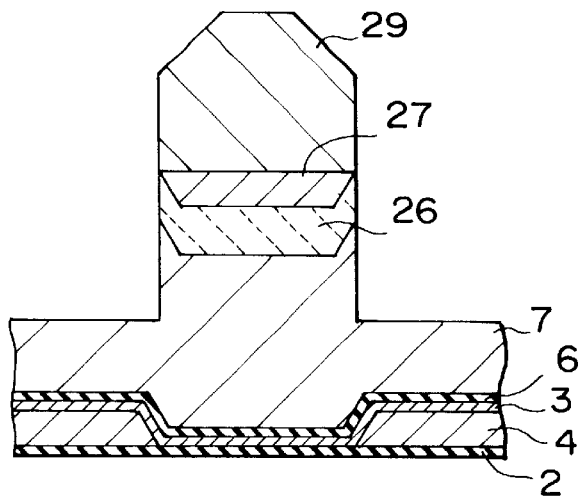
FIG. 19A, FIG. 19B and FIG. 19C are cross sectional views showing the manufacturing steps of the magnetic recording/reproducing combination head following the step shown in FIG. 18C.
Figure 19B:
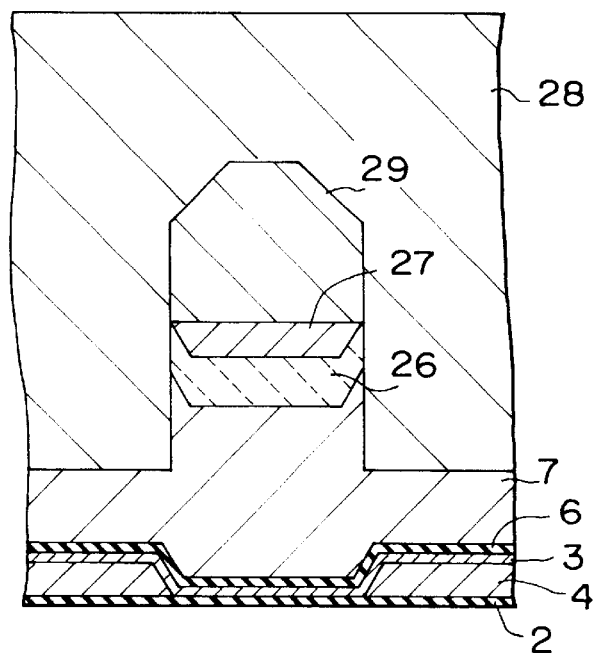
Figure 19C:
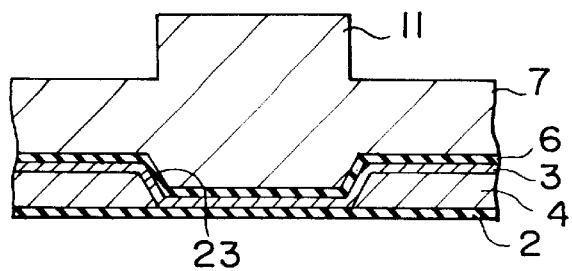

Then, as shown in FIG. 19A, by making use of the plating film 29 as a mask, the insulating film 26 and the lower magnetic pole 27 are etched with the ion-milling method or the reactive ion-etching method. As shown in FIG. 19B, the flattening layer 28 is formed again. Thereafter, the flattening layer 28, the plated film 29, the metal film 27, and the insulating film 26 are etched by, for example, the ion-milling method. As shown in FIG. 19C, a convex portion 11 which corresponds to the concave portion 23 can be formed on the lower magnetic pole 7. The height of the convex portion 11 can be controlled by the height of the plated film which serves as a mask.

Figure 20A:
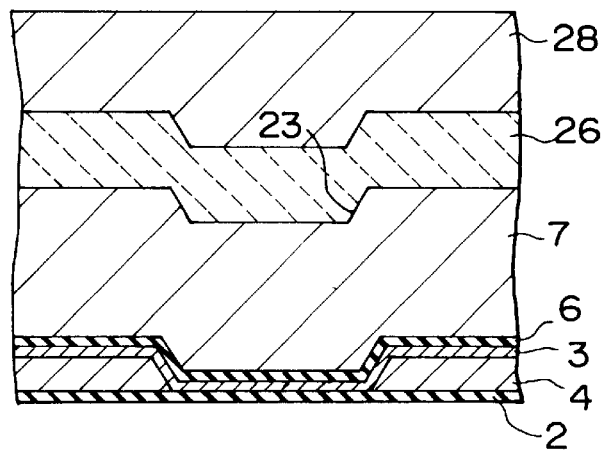
FIG. 20A, FIG. 20B and FIG. 20C are cross sectional views showing another example of modification of the second embodiment of the manufacturing method of the magnetic recording/reproducing combination head of the present invention.
Figure 20B:
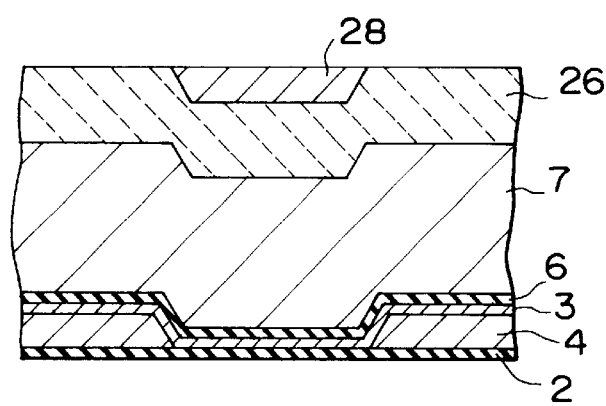
Figure 20C:
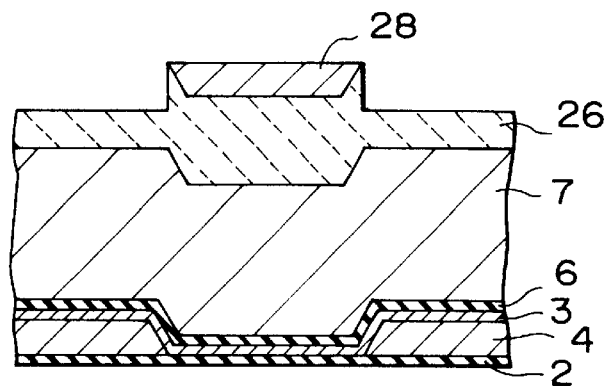

For another alternative method for controlling the height of the convex portion 11, the following method can be cited. Firstly, as shown in FIG. 20A, on the lower magnetic pole 7, an insulating film 26 consisting of such as $SiO_x$ and the like and a flattening layer 28 are sequentially formed. Secondly, the flattening layer 28 is etched with, for example, the ionmilling method. As shown in FIG. 20B, the flattening layer 28 is formed only inside the concave portion of the insulating film 26 which corresponds to the concave portion 23 of the lower magnetic pole 7. The insulating film 26 is etched making use of the flattening layer 28 as a mask. As shown in FIG. 20C, the convex portion is formed on the insulating film 26.

Figure 21A:
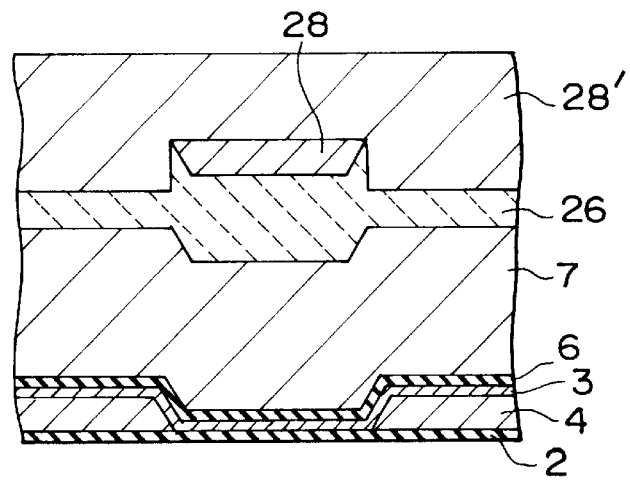
FIG. 21A, FIG. 21B and FIG. 21C are cross sectional views showing the manufacturing method of the magnetic recording/reproducing combination head following the step shown in FIG. 20C.
Figure 21B:
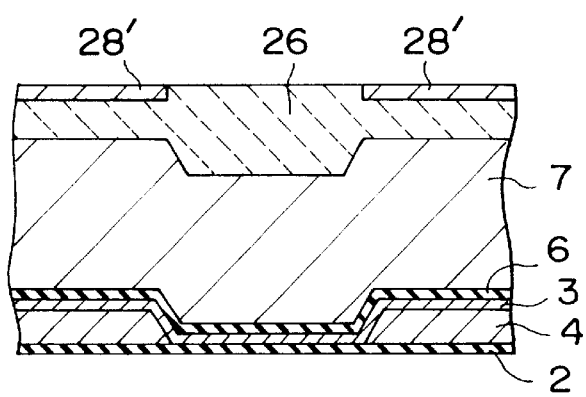
Figure 21C:
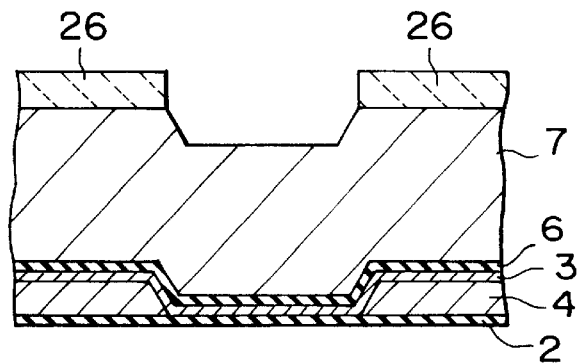

Thirdly, as shown in FIG. 21A, an insulating layer 28' is formed again. As shown in FIG. 21B, the first flattening layer 28 and the second flattening layer 28' and the convex portion of the insulating film 26 are flattened by etching with a method such as the ion-milling method. On the surrounding area of the convex portion of the insulating film 26, the second flattening layer 28' remains. By etching the insulating film 26 with the remained second flattening layer 28' as a mask, as shown in FIG. 21C, the concave portion is formed in the insulating film 26.

Figure 22A:
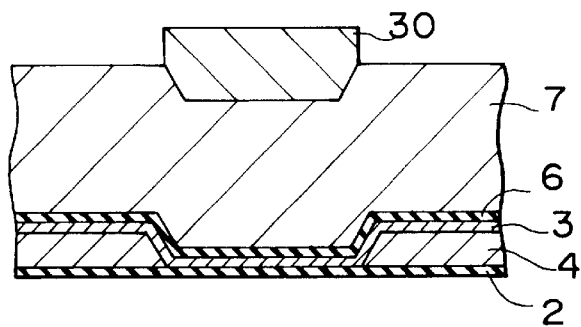
FIG. 22A, FIG. 22B and FIG. 22C are cross sectional views showing the manufacturing method of the magnetic recording/reproducing combination head following the step shown in FIG. 21C.
Figure 22B:
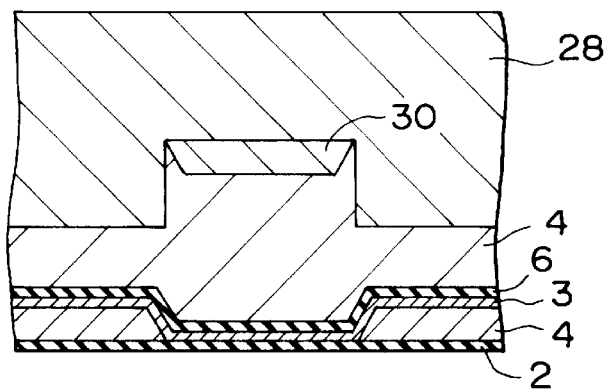
Figure 22C:
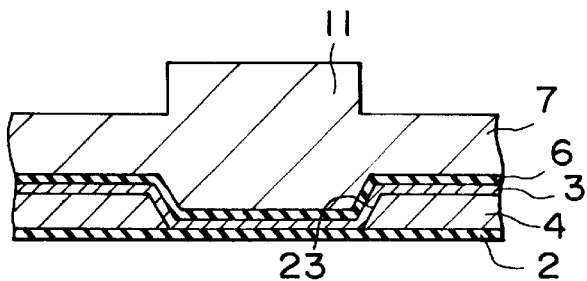

Fourthly, as shown in FIG. 22A, after selectively growing a metal film 30 of such as W and the like inside the concave portion of the insulating film 26 by a CVD method, the insulating film 26 is removed. With the metal film 30 as a mask, the lower magnetic pole 7 is etched by, for example, a reactive ion-etching method. As shown in FIG. 22B, the flattening layer 28 is formed again. Thereafter, the flattening layer 28, the metal film 30 and the lower magnetic pole 7 are etched with such as the ion-milling method. As shown in FIG. 22C, the lower magnetic pole 7 possessing the convex portion 11 corresponding to the concave portion 23 can be obtained. The height of the convex portion 11 can be controlled by the thickness of the metal film 30 serving as a mask.

In the above described manufacturing process of a magnetic recording/reproducing combination head 10, the convex portion 11 corresponding to the recording track is formed by self-aligning to the concave portion 23 which corresponds to the reproducing track. Therefore, the reproducing track and the recording track can be aligned with high precision. Such a magnetic recording/reproducing combination head 10, even when a high recording density is attained through narrowing of the track, can provide a fine reproducing output with reproducibilty. Further, an alignment precision of the recording track part is identical as described earlier.

Further, the manufacturing process of the present embodiment corresponds to the conventional etching and film formation process, in addition, the alignment process with a stepper, exposure and development process are abbreviated. According to the manufacturing process of the magnetic head, a high performance magnetic recording/reproducing combination head can be manufactured at low cost. That is, the massproductivity can be fully satisfied.

Figure 23A:
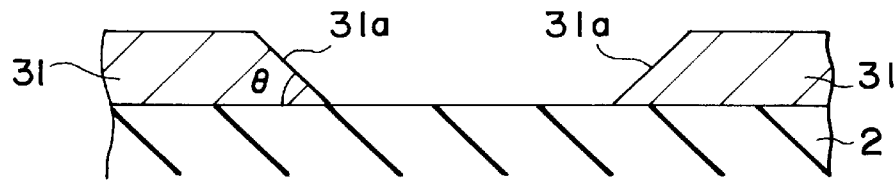
FIG. 23A, FIG. 23B, FIG. 23C, FIG. 23D and FIG. 23E show process diagrams when self-alignment process is applied in a manufacturing steps of a magneto-resistance effect element of the present invention.

In the above described manufacturing process of the magnetic recording/reproducing combination head, as shown in FIGS. 23A to 23E, an MR element portion 5 can be manufactured by a manufacturing process which makes use of a self-alignment process. That is, firstly, on the lower side reproducing magnetic gap 2, a hard magnetic film or an antiferromagnetic film which serves as a bias film 31 can be formed. Secondly, as shown in FIG. 23A, a pair of the bias film 31 are patterned with the ion-milling method so as to make a spacing between the pair of the bias film, for example, to be about 2 pm. When the patterning process is executed, the inner edge portions of a pair of bias film 31 are milled so as to form positive slope surfaces 31a. An angle $\theta$ of the positive slope 31a is set, for example, at 30°.

Figure 23B:
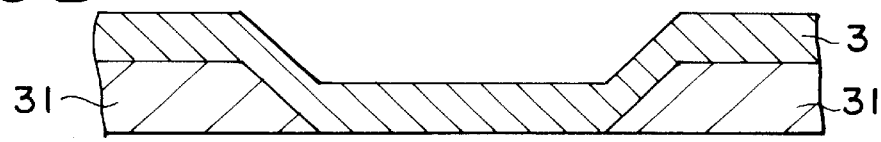

As shown in FIG. 23B, on a pair of patterned bias film 31, an MR film 3 is formed. When a spin valve GMR film is used as the MR film 3, a magnetic sense layer, a nonmagnetic conductive layer, a magnetically fixed layer, an antiferromagnetic layer, and a protective layer are sequentially stacked. Under the magnetic sense layer, a nonmagnetic substrate film can be formed.

Then, the portion of the MR film 3, except that existing in a space between a pair of bias film 31 of the MR film 3, is etch backed with the ion-milling method or the like. That is, the MR film 3 is patterned in a manner such that the MR film 3 is disposed only inside the space of a pair of bias film 31.

Figure 23C:
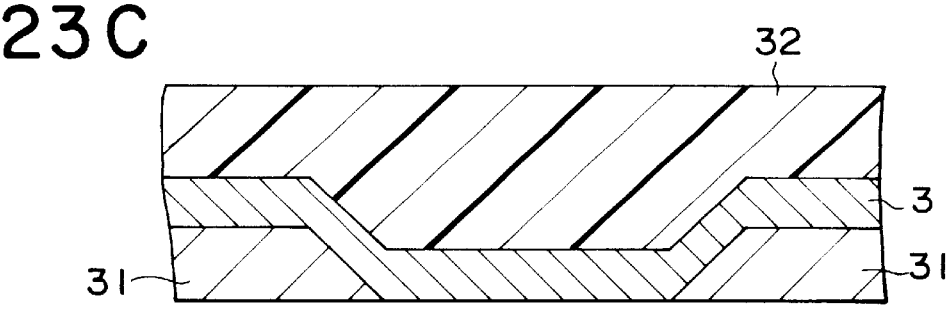
Figure 23D:
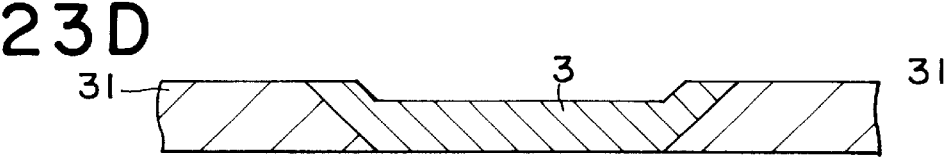

In concrete, so as to flatten a level difference of the MR film 3 due to a pair of bias films 31, as shown in FIG. 23C, a flattening layer 32 is formed on the MR film 3. Then, so as the flattening layer 32 to remain only inside the level difference of the MR film 3, the flattening layer is ion-milled to etch back. After ion-milling the MR film 3 by making use of the flattening layer 32 existing inside the level difference as a mask, remaining flattening layer 32 is removed. As shown in FIG. 23D, a MR film 3 existing only inside the space of a pair of bias films 32 can be obtained.

Figure 23E:
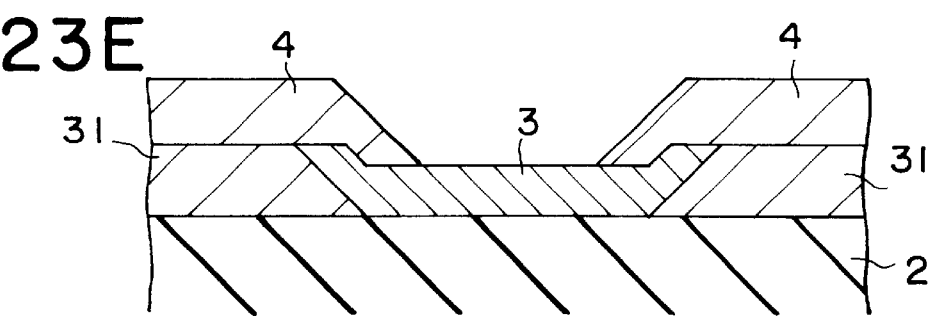

Next, patterning for restricting a width direction (depth direction) of the MR film 3 is executed by ion-milling while otherwise forming resist. In this manner, on the MR film 3 patterned in a track direction and width direction and on a pair of bias films 31, a highly conductive film which serves as a pair of reproducing electrodes 4 is formed. As shown in FIG. 23E, by patterning the highly conductive film with a liftoff method, a pair of reproducing electrodes are formed. A pair of reproducing electrodes 4 are patterned in such a manner that the spacing is made to be narrower than that between a pair of bias films 31 (for example, spacing of 1 $\mu$m).

In this manner, an MR element portion 5 disposed with the MR film 3 only inside the space of a pair of bias films 31 can be obtained. According to such an MR element portion 5, a steep micro-track profile can be obtained. That is, a reproducing head can be made to have a high resolution.

Next, an explanation of a magnetic recording/reproducing combination head manufactured by applying another embodiment of the manufacturing method of the present invention will be given with reference to FIG. 24.

Figure 24:
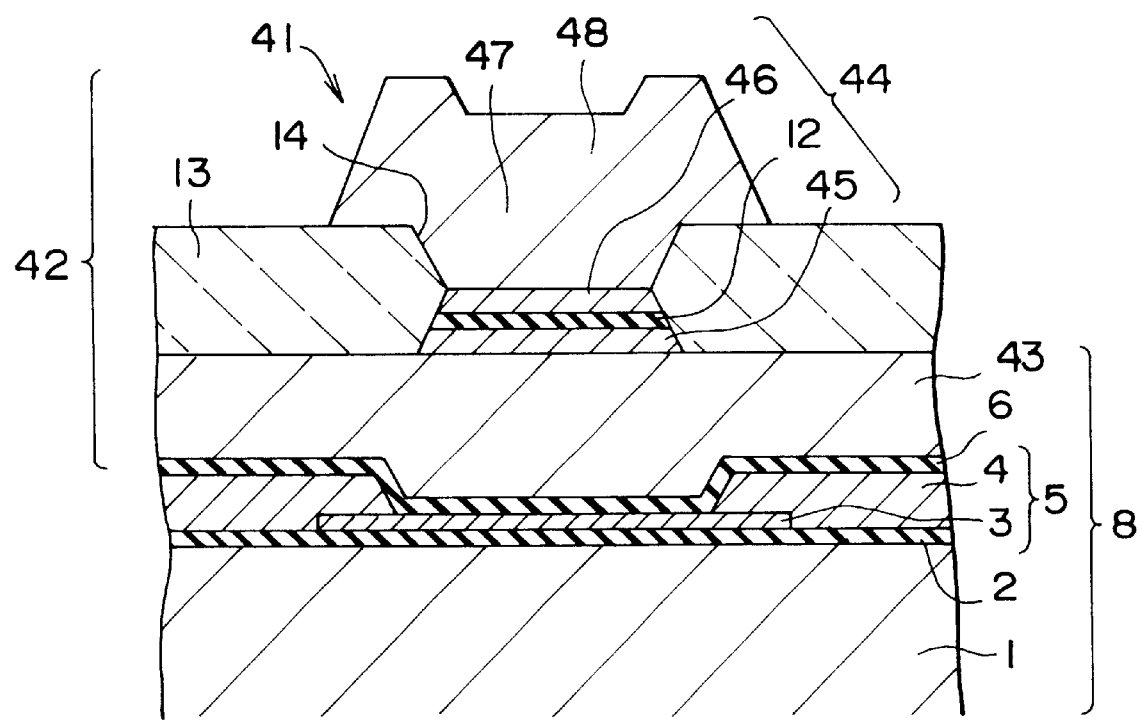
FIG. 24 is across sectional view showing a structure of the magnetic recording/reproducing combination head in accordance with the fourth embodiment of the present invention seen from the air bearing surface.

In a magnetic recording/reproducing combination head 41 shown in FIG. 24, a track portion of a recording head consisting of an induction type thin film magnetic head 42 is formed as a convex portion 44 on a lower magnetic pole body 43 which concurrently serves as an upper side magnetic shield layer and possesses a flattened upper surface. That is, on the lower magnetic pole body 43 possessing a flattened upper surface, a magnetic pole tip 45 of the lower magnetic pole, a recording magnetic gap 12 and a portion opposite to the gap 46 which constitutes a part of a magnetic pole tip of the upper magnetic pole are sequentially formed.

The portion opposite to the gap 46 of the upper magnetic pole is consisted of a first upper magnetic pole layer. For the lower magnetic pole tip 45 and the portion opposite to the gap 46 of the upper magnetic pole, a soft magnetic material large in a saturation flux density, as a nitride base soft magnetic material, such as FeN or FeCo, is preferably employed.

On the lower magnetic pole body 43, non-magnetic material layers 13 composed of such as SiOx and the like are formed so as to hold the convex portion 44 therebetween. The non-magnetic material layers 13 have an concave portion 14 which is aligned to the convex portion 44. The position of the concave portion 14 is formed based on the self-aligning by making use of the flattening layer. A remaining portion 47 of the upper magnetic pole tip composed of above described crystalline soft magnetic material or amorphous soft magnetic material is formed embedded inside the concave portion 14. The remaining portion 47 of the upper magnetic pole tip and the upper magnetic pole body are composed of the second upper magnetic pole layer. Now, other structure than that mentioned above possesses the same structure with the magnetic recording/reproducing combination head 10 shown in FIGS. 1, 2, and 3.

Figure 25A:
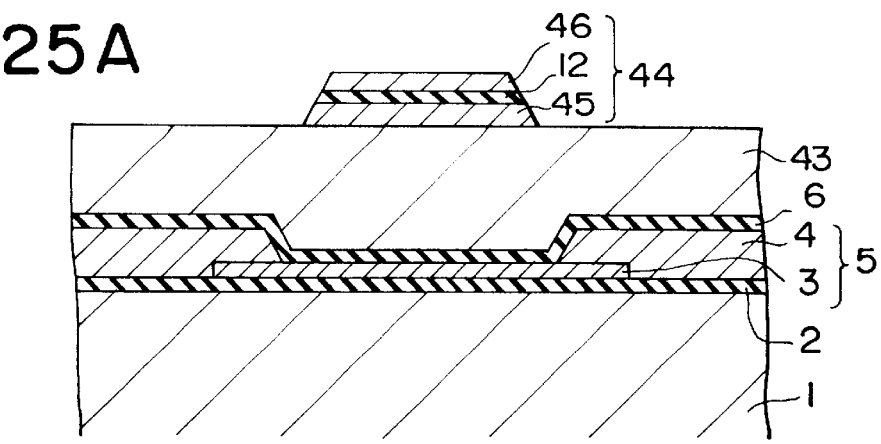
FIG. 25A, FIG. 25B and FIG. 25C are cross sectional views showing the essential manufacturing steps of the magnetic recording/reproducing combination head shown in FIG. 24.
Figure 25B:
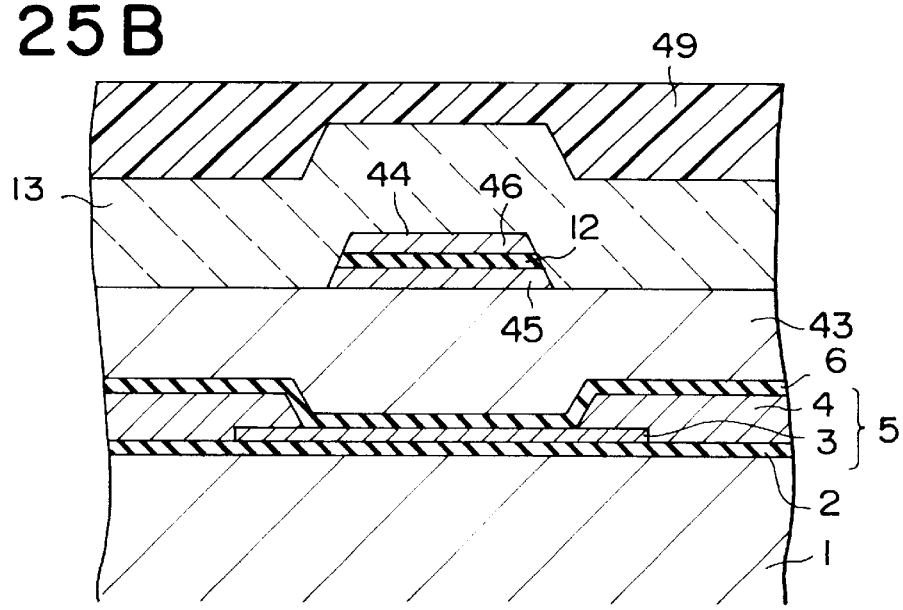
Figure 25C:
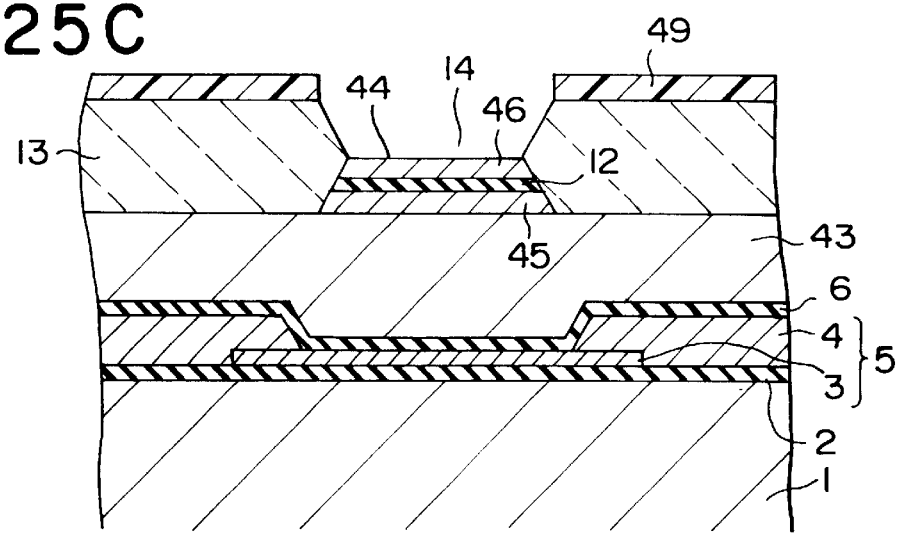

Now, an explanation of a manufacturing process of a magnetic recording/reproducing combination head 41 possessing the magnetic pole tips (portions opposing to the gap) 45, 46 consisting of above mentioned FeN and the like is given with reference to FIGS. 25A to 25C.

Firstly, a shield type MR head 8 is manufactured in an identical manner with the above described embodiment. An upper surface of the lower magnetic pole body 43 which concurrently serves as an upper magnetic shield layer of the shield type MR head 8 is flattened by such a method as etch back or polishing method. On this flattened lower magnetic pole body 43, FeN film of a thickness of such as 0.3 $\mu$m which serves as the lower magnetic pole top 45, $AlO_x$ film of a thickness of such as 0.2 $\mu$m which serves as the recording magnetic gap 12, and FeN film of a thickness of such as 0.3 $\mu$m which serves as the portion opposite to the gap 46 of the upper magnetic pole are sequentially formed. This laminated film is patterned with a conventional PEP technique, as shown in FIG. 25A, the convex portion 44 corresponding to the recording track is formed.

Now, the magnetic material 45, 46 neighboring the recording magnetic gap 12 are preferred to be formed on a flat surface. On a substrate having an uneven surface, uneven stress comes out, and anisotropy of magnetic body disperses. Therewith, soft magnetic property deteriorates, thus, deterioration of recording efficiency results. The magnetic property of the FeN based film is greatly influenced by $N_2$ gas flow during processing. Therefrom also, the magnetic bodies 45, 46 are preferable to be formed on an as much as possible flat substrate. As described above, by forming the lower magnetic pole top 45 and the portion opposite to the gap of the upper magnetic pole 46 as a film on the flattened lower magnetic pole body 43, the recording track portion can be obtained with high performance.

The thickness of the laminate film obtained by laminating the lower magnetic pole top 45, the recording magnetic gap 12, and the portion opposite to the upper magnetic pole 46 is at most about 0.8 $\mu$m. Therefore, it can be processed with thin resist of a thickness of about 1 $\mu$m. As described above, since, when PEP method is employed, the thinner the thickness of the resin, the more improved is the dimensional accuracy, thus even with an i-line stepper, the processing is executed with high precision. Therefore, the convex portion 44 is formed in a state in which the convex portion 44 is aligned with sufficient alignment accuracy to the reproducing track of the MR element portion 5.

Then, on the lower magnetic pole body 43 including on the convex portion 44, as identical with the above described embodiment, the non-magnetic material layer 13 consisting of such as $SiO_x$ layer with a nearly equal thickness is formed along a contour of the convex portion 44. When $SiO_x$ or the like is applied to the recording magnetic gap 12, $SiN_x$ or the like is used for the non-magnetic material layer 13. Then, as shown in FIG. 25B, on the non-magnetic material layer 13 possessing the convex shape which is obtained by transcribing the shape of the convex portion 44, the flattening layer (for example, flattening resin layer) 49 is formed.

Next, by making use of the thicker portion immediate above the convex portion 44 of the flattening resin layer 49 as a substantial mask, as identical with the above described example, the non-magnetic material layer 13 is etched. This etching operation is executed with RIE method and the like under a condition in which the etching rate of the non-magnetic material layer 13 is larger than that of the flattening resin layer 49. As shown in FIG. 25C, the concave portion 14 is obtained self-aligned to the convex portion 44.

By embedding a soft magnetic material which constitutes the remaining portion 47 of the upper magnetic pole tip inside the concave portion 44, further, the upper magnetic pole body 48 is formed. Therewith, the portion 46 opposite to the gap of the upper portion magnetic pole and the remaining portion 47 are formed dimensionally aligned with high accuracy. The lower magnetic pole tip 45 and the portion 46 opposite to the gap of the upper magnetic pole are aligned with high precision by continuously filming on the lower magnetic pole body 43 of which upper surface is flattened. Further, the widths of the surfaces opposite to the recording magnetic gap 12 can be also made almost same.

According to the manufacturing process of the magnetic recording/reproducing combination head 41 of above described embodiment, in particular, according to the manufacturing process of the induction type thin film magnetic head 42, as identical with the above mentioned embodiment, a narrow track head structure, in which the width of the portion opposite to the gap of the lower magnetic pole tip 45 and the width of the portion 46 opposite to the gap of the upper magnetic pole are made nearly equal, can be manufactured with high precision.

Further, a property of the nitride based soft magnetic material such as FeN possessing a high saturation magnetic flux density can be fully drawn out. Prior to formation of an insulating layer embedded with a coil, for the recording track portion to be completed beforehand, heat treatment is executed under a temperature condition decided only taking a heat resistance temperature of such as MR film 3 into consideration. The higher heat treatment temperature results in an enhancement of the magnetic property of an area neighboring the gap. Therewith, an enhancement of magnetic recording characteristics of the magnetic recording/reproducing combination head 41 is made possible. Further, the situation of the manufacturing cost and others are identical with the case of the above mentioned example.

Figure 26:
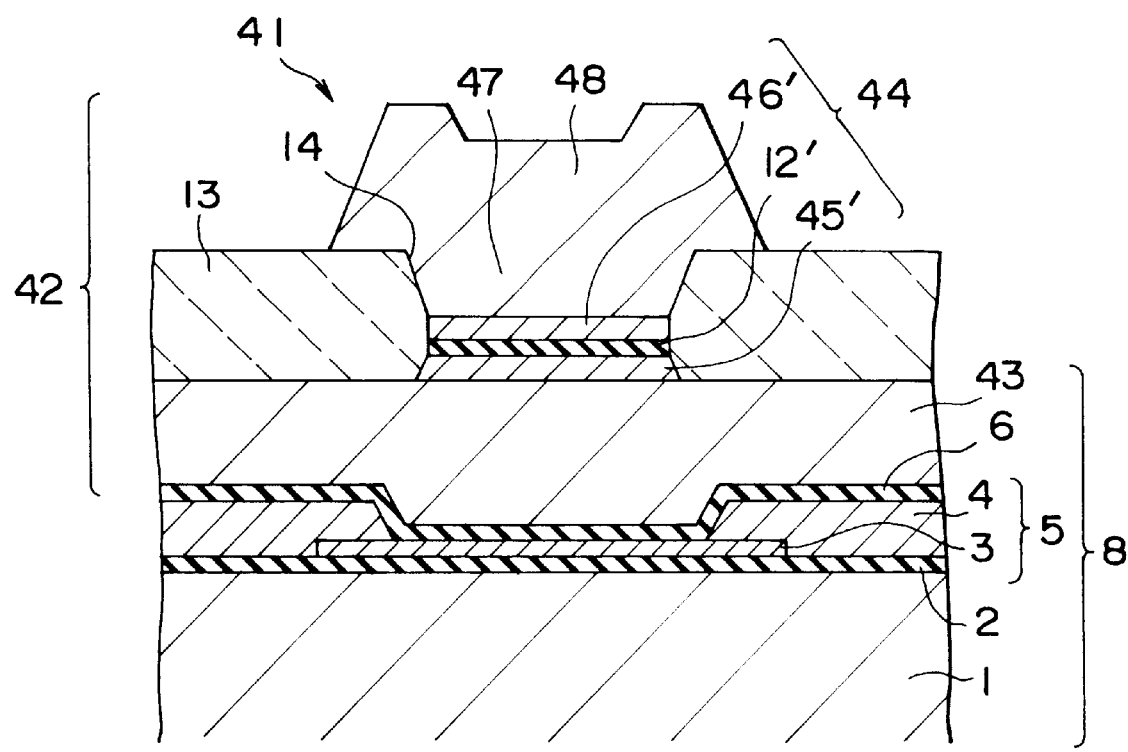
FIG. 26 is a cross sectional view showing an example of modification of the magnetic recording/reproducing combination head shown in FIG. 24.

It is preferable from the view point of effective supply of signal magnetic field that the track portion of the recording head has the minimum width of the surface opposite to the magnetic gap of the magnetic pole at the air bearing surface and becomes more broad as it departs from the magnetic gap. Taking this into consideration, a structure shown in FIG. 24 can be transformed into a structure shown in FIG. 26.

That is, after formation of the first upper magnetic pole layer serving as a portion opposite to the gap 46' of the upper magnetic pole into a film, a resist pattern is formed in an area for the magnetic pole to be formed by PEP process. By using the resist pattern as a mask, the first upper magnetic pole layer 46', the recording magnetic gap 12', and the lower magnetic pole tip 45' are sequentially etched by RIE method and the like. In this case, after being etched up to the first upper magnetic pole layer 46' and the recording magnetic gap 12', the voltage applied to the substrate is lowered. An incident energy of etching species becomes low. Therewith, the lower magnetic pole tip 45' has a fan-shaped taper.

That is, up to the recording magnetic gap 12', by enhancing the anisotropy of the etching, an almost precipitous side wall shape can be obtained. Below the recording magnetic gap 12', isotropy of the etching is to be enhanced. In the air bearing surface of the recording head shown in FIG. 26, the lower magnetic pole tip 45' and the upper magnetic pole tips 46', 47 are the minimum in the width at the surfaces contacting the recording magnetic gap 12'. The lower magnetic pole tip 45' becomes broader toward the lower magnetic pole body 43 from the surface contacting the recording magnetic gap 12'. In the upper magnetic pole tip, the portion opposite to the gap 46' contacting the recording magnetic gap 12' has the width corresponding to the width of the recording track, the remaining portion 47 becomes broad toward the upper magnetic pole body 48.

Further, in the present invention, on the air bearing surface of the magnetic head, a coating layer (coverage) and the like for preventing abrasion due to friction with such as medium can be provided. Even when such a coating layer is formed, according to the present invention, above described effect can be obtained. Further, in any of the above described embodiments, although structures in which the widths at the air bearing surface of the lower magnetic pole and the upper magnetic pole are converged toward the magnetic gap are shown, a structure in which the side walls of the concave portion of the non-magnetic material layer hold them from both sides is also included in a manufacturing method of the present invention.

Figure 27:
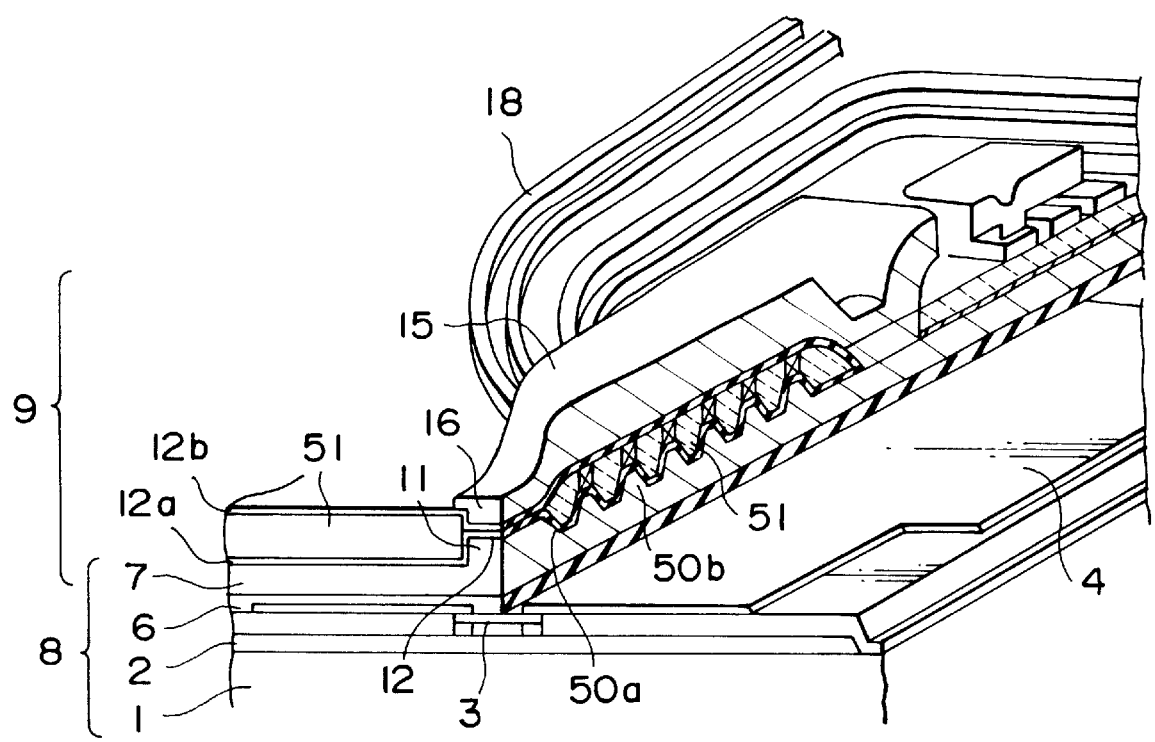
FIG. 27 is a perspective view showing a partially truncated schematic structure of the magnetic recording/reproducing combination head of the fifth embodiment of the present invention.
Figure 28:
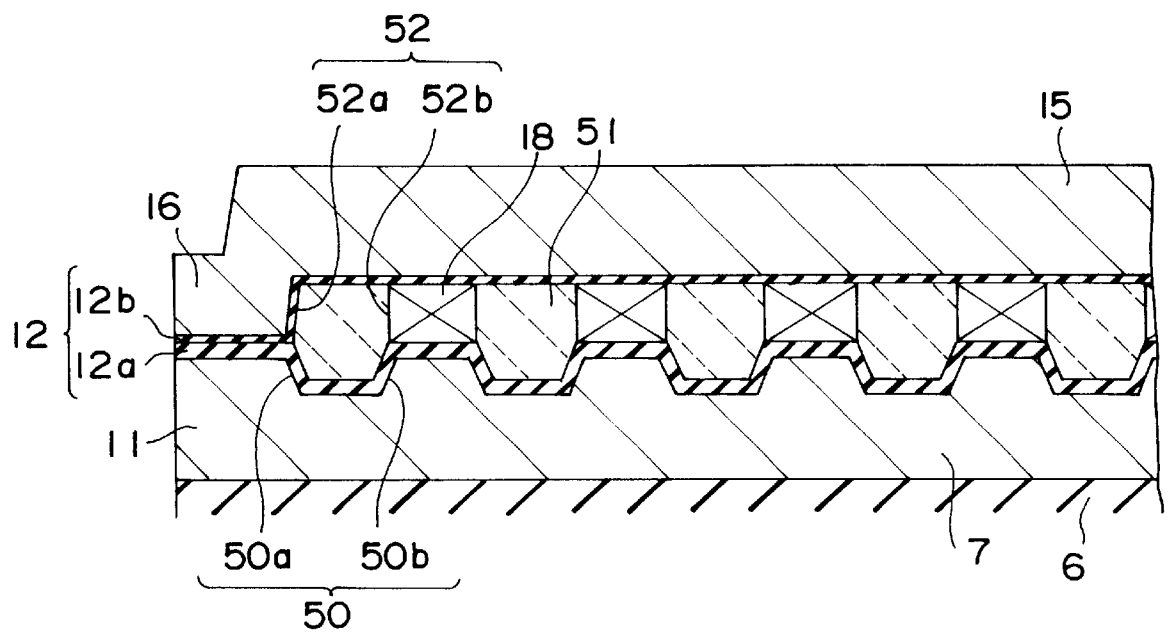
FIG. 28 is a cross sectional view showing a recording head portion of the magnetic recording/reproducing combination head shown in FIG. 27 seen from a direction perpendicular to the air bearing surface.
Figure 29:
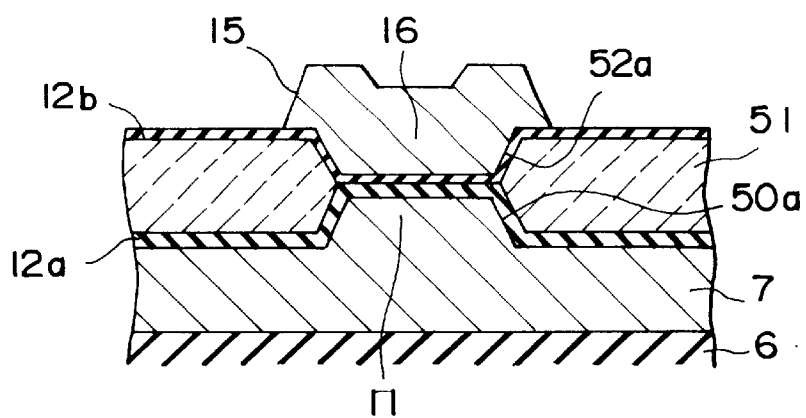
FIG. 29 is a cross sectional view showing a recording head portion of the magnetic recording/reproducing combination head shown in FIG. 27 seen from the air bearing surface.

Next, an explanation of a magnetic recording/reproducing combination head manufactured applying the self-alignment technique specific in the manufacturing method of the present invention for manufacturing a coil will be given with reference to FIGS. 27, 28, and 29. FIG. 27 is a partly truncated view showing a schematic structure of a magnetic recording/reproducing combination head of the embodiment. FIG. 28 is a sectional view showing an essential portion of a thin film magnetic head 9. FIG. 29 is a sectional view seen from an air bearing surface.

A magnetic recording/reproducing combination head shown in these figures, as identical with the above described examples, has a shield type MR head 8 which serves as a reproducing head and a thin film magnetic head 9 which serves as a recording head. The structure of the shield type MR head 8 is identical with that of the above described embodiment.

A lower magnetic pole of the thin film magnetic head 9 is formed of the magnetic layer identical with an upper magnetic shield layer 7. For a lower magnetic pole 7 serving concurrently as the upper magnetic shield layer, a crystalline soft magnetic material such as NiFe alloy, FeSiAl alloy, a micro-crystalline soft magnetic material such as (Fe, Co)N type, (Fe,Co)O type, an amorphous soft magnetic material such as CoZrNb alloy can be used. The lower magnetic pole 7 can be composed by laminating a plurality of layers of these soft magnetic material.

In the lower magnetic pole 7, as shown in FIGS. 28 and 29, a magnetic pole tip 11 and a coil forming position both facing the air bearing surface are formed in a convex shape. The lower magnetic pole 7, on the surface opposed to the upper magnetic pole tip 16 and the coil 18, is provided with a plurality of convex portions 50 aligned to these formation positions. The convex portion 50*a* aligned to a position to be provided with the upper magnetic pole tip 16 corresponds to the lower magnetic pole tip 11 which possesses a width corresponding to the recording track width. The numeral 50*b* shown in the figure shows the convex portion aligned to the position to be provided with the coil 18 and is formed along the contour of the position to be provided with the coil 18. The lower magnetic pole 7 possessing the convex portion 50 functions as a substrate layer for the coil 18.

On the lower portion magnetic pole 7 possessing the convex portion 50, along the contour of the convex portion 50, the first non-magnetic material layer 12*a* consisting of for example amorphous Si(a-Si), $AlO_x$, $SiN_x$, and the like is formed as a part of the recording magnetic gap 12. On the first non-magnetic material layer 12*a*, a layer to be provided with a concave portion 51, which is formed of a non-magnetic material such as $SiO_x$ different from that of the recording magnetic gap 12, is formed. The layer 51 destined to be formed into the concave portion serves concurrently as an insulating layer for the area adjacent the coil 18. Therefore, the non-magnetic material is used for the layer 51 destined to be formed into the concave shape.

The layer destined to be provided with the concave portion 51 is dimensionally aligned to a position destined to be provided with the upper magnetic pole tip 16 and the convex portion 50 which corresponds to a position destined to be provided with the coil, and has a concave portion 52 in which the first non-magnetic material layer 12*a* forms a bottom layer. The layer 51 destined to be provided with the concave portion has the first concave portion 52*a* aligned to the convex portion 50*a*, which corresponds to a position destined to be provided with the upper magnetic pole tip 16, and the trench shaped second concave portion 52*b* aligned to the convex portion 50*b*, which corresponds to a position destined to be provided with the coil 18. The alignment of these concave portions 52 is executed based on the self-alignment making use of the flattening layer.

Inside the second concave portion 52*b* aligned dimensionally to the convex portion 50*b*, the coil 18 is embedded formed of Cu or Cu alloy. The coil 18 is separated electrically by a layer 51 destined to be the concave portion which is formed between the adjacent convex portions 50*b*. On the layer 51 destined to be the concave portion including on the coil 18 embedded inside the second concave portion 52*b*, the second non-magnetic material layer 12*b* is formed to be a part of the recording magnetic gap 12. The second non-magnetic material layer 12*b* is consisted of the material identical with the first non-magnetic material layer 12*a*. That is, the coil 18 is embedded inside the second concave portion 52*b*, the surrounding area thereof is insulated by the first non-magnetic material layer 12*a*, the portion 51 destined to be the concave portion and the second non-magnetic material layer 12*b*.

Since the second non-magnetic layer 12*b* functions as a part of the recording magnetic gap 12, the air bearing surface side is formed along an inner wall surface of the first concave portion 52*a* which corresponds to a position destined to be the upper magnetic pole tip 16. In the air bearing surface, a portion functioning in reality as the recording magnetic gap 12 is formed depositing the first and the second non-magnetic material layer 12*a*, 12*b*, respectively.

Inside the first concave portion 52a, a soft magnetic material forming the upper magnetic pole 15 is formed embedding. The upper magnetic pole tip 16 is formed of a soft magnetic material embedded inside the first concave portion 53a.

Here, the convex portion 50a and the concave portion 52a are dimensionally aligned. Therefore, the lower magnetic pole tip 11 and the upper magnetic pole tip 16 are positioned oppositely at the air bearing surface through the recording magnetic gap 12 and are formed dimensionally aligned with high accuracy in such a manner that the respective center positions of them overlap. The widths of surfaces opposite to the recording magnetic gap 12 are also almost same. Further, the upper magnetic pole tip 16 is aligned with the coil 18 based on the positions destined to be the respective convex portions 50a, 50b.

The upper magnetic pole 15 is formed continuously from the magnetic pole tip 16 toward behind side portion of the air bearing surface. The edge portion of the rear portion side of the upper magnetic pole 15 is magnetically connected to the lower magnetic pole 7. The lower magnetic pole 7 and the upper magnetic pole 15 form a magnetic circuit through the recording magnetic gap 12, and therein the coil 18 is positioned insulated from the lower magnetic pole 7 and the upper magnetic pole 15. Therewith, an essential portion of a thin film magnetic head 9 serving as a recording magnetic head is formed.

Further, the FIG. 28 shows a state of the upper magnetic pole 15 obtained by depositing collectively. The upper magnetic pole of the present invention is not limited to those, and, for example, can be a separated type magnetic pole composed of a magnetic pole tip half body formed by embedding inside the first concave portion 52a and a magnetic pole rear portion half body which extends to the rear portion by making surface contact therewith. This structure is shown in FIG. 4.

In the above described thin film magnetic head 9, since the positions to be the magnetic pole tip 16 and the coil 18 respectively are restricted by the convex portion 50 formed on the lower magnetic pole 7, the accuracy in positioning these can be enhanced. In particular, through formation of the upper magnetic pole top 16 and the coil 18 by embedding respectively inside the concave portion 52, the positioning accuracy of the coil 18 with respect to the upper magnetic pole tip 16 can be greatly enhanced. Further, the narrowing of the recording track and accuracy enhancement of the track width are identical with the previously described embodiments.

As the positioning accuracy of the coil 18 improves, the coil 18 can be formed with high accuracy at an sufficiently close position to the upper magnetic pole tip 16. Further, by enhancing the positioning accuracy of the coil 18, an upper surface of the coil 18 and the upper magnetic pole 15 can be insulated with the sufficiently thin layer of the second non-magnetic material layer 12b which forms a part of the recording magnetic gap 12. Therefore, the distance between the upper surface of the coil 18 and the upper magnetic pole 15 can be sufficiently made small.

Figure 30:
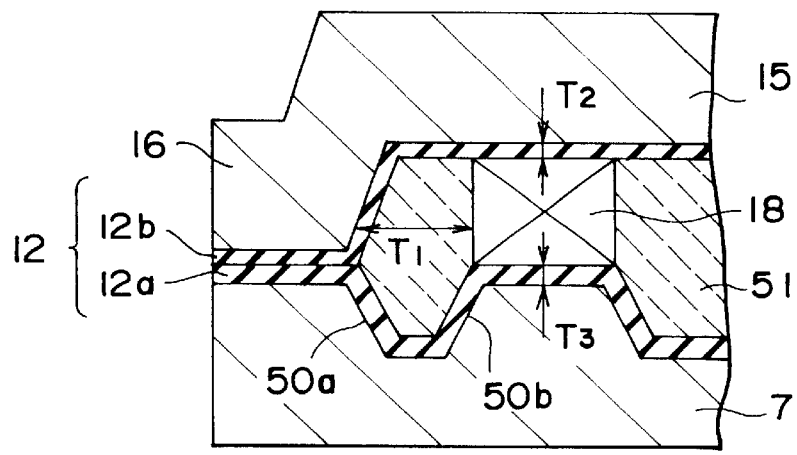
FIG. 30 is a diagram to explain a distance between a coil and a magnetic pole of the thin film magnetic head of the present invention.

In concrete, as shown in FIG. 30, the distance $T_1$ from the upper magnetic pole tip 16 to the adjacent coil 18 can be set at 10 $\mu$m or less. The distance $T_2$ between the upper surface of the coil 18 and the upper magnetic pole 15, that is, the film thickness of the second non-magnetic material layer 12b can be set at *0.5 $\mu$m or less*. The distance $T_3$ between the lower surface of the coil 18 and the lower magnetic pole 7 can be also set the same way.

Figure 31:
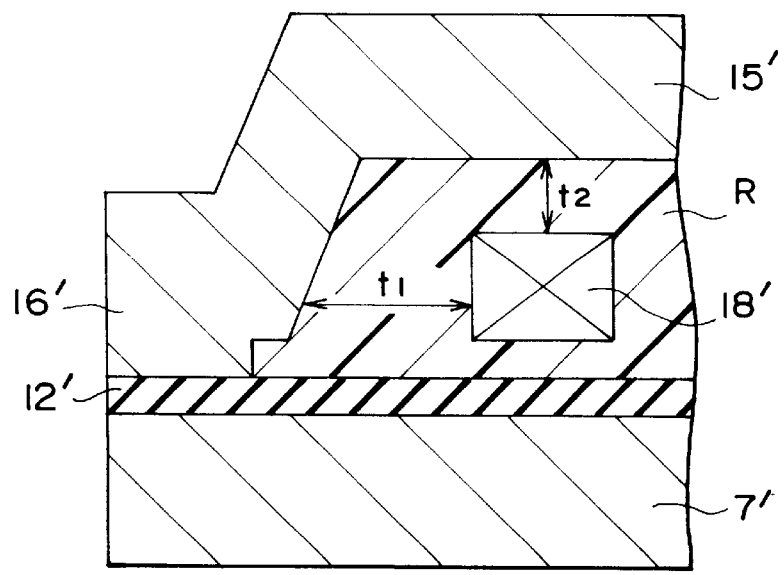
FIG. 31 is a diagram for explaining a distance between a coil and a magnetic pole in a conventional thin film magnetic head.

Regarding to the present invention above described, as shown in FIG. 31, in the conventional thin film magnetic head in which the coil 18' is insulated by resist R and the like, the distance $t_1$ from the upper magnetic pole tip portion 16' to the adjacent coil 18' is 10 $\mu$m or more, the distance $t_2$ between the upper surface of the coil 18' and the upper magnetic pole 15' becomes about 3 $\mu$m.

By making short the distance from the upper magnetic pole tip 16 to the adjacent coil 18, and the distance from the upper surface of the coil 18 to the upper magnetic pole 15, while the electric current to be inputted into the coil 14 is kept low, magnetic field necessary and sufficient for recording operation can be inputted into a magnetic circuit due to the lower magnetic pole 7 and the upper magnetic pole 15. This responds to the present situation in which reduction of the recording current is demanded according to a shift of the recording frequency to the higher side.

When the distance from the upper magnetic pole tip 16 to the adjacent coil 18 exceeds 10 $\mu$m, to generate a magnetic field necessary for the recording operation, a large electric current is required to be inputted into the coil. In this case, it is required to make larger the diameter of the coil. However, if the distance from the upper magnetic pole tip 16 to the coil 18 is less than 0.1 $\mu$m, there is a possibility that insulation between them can not be stably secured. The distance from the upper magnetic pole tip 16 to the adjacent coil 18 is preferred to be set between 0.1 to 10 $\mu$m. It is more preferable to set the distance between 0.1 to 7 $\mu$m.

Even as to the distance from the upper surface of the coil 18 to the upper magnetic pole 15, that is, the film thickness of the second non-magnetic material layer 12b, from the same reasons, it is preferable to be set between from 0.05 to 0.5 $\mu$m. The thickness of the second non-magnetic material layer 12b is preferable to be set 0.5 $\mu$m or less from the view point of preventing surface ruggedness from occurring.

Further, by forming the second non-magnetic layer 12b between the upper surface of the coil 18 and the upper magnetic pole 15, the ruggedness of the substrate surface of the upper magnetic pole 15 becomes small. It is effective for reducing the number of the pinning site on the magnetic domain wall. During head operation, the upper magnetic pole 15 can be easily isolated into a single domain, and recording noise accompanying domain wall shift can be reduced drastically. From the above argument, surface roughness of the substrate surface of the upper magnetic pole 15, that is, surface roughness of the second non-magnetic material layer 12b is preferable to be 0.5 $\mu$m or less. More preferable is 0.3 $\mu$m or less. In addition, since the surrounding area of the coil 18 is insulated by an inorganic material, such as a-Si, $AlO_x$, $SiN_x$, $SiO_x$, and the like, the temperature resistance can be greatly improved compared with the case where an organic material, such as resist, is used.

Inside the concave portion 52a for embedding the upper magnetic pole tip 16, the second non-magnetic material layer 12b is formed. Thus, even if the surface of the bottom or the side wall is a little bit rugged during formation process of the concave portion, surface property can be improved due to the second non-magnetic material layer 12b. Improvement of the surface property results in an improvement of magnetic property. In addition, by controlling the thickness of the second non-magnetic material layer 12b, the track width and the magnetic gap width can be easily controlled.

Next, among the magnetic recording/reproducing combination heads of the above described embodiments, a manufacturing process of a thin film magnetic head 9 as a recording head, will be explained with reference to FIGS. 32A to 32C and FIGS. 33A to 33C.

Figure 32A:
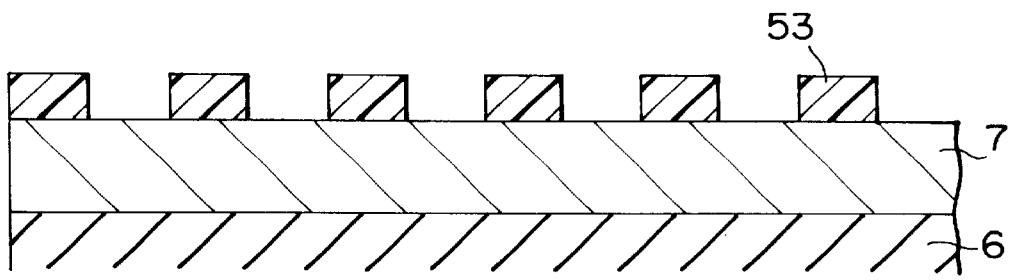
FIG. 32A, FIG. 32B and FIG. 32C are cross sectional views showing the essential steps for manufacturing the thin film magnetic head by applying self-alignment step of the present invention to manufacturing of a coil.

Firstly, on a substrate on which up to an upper reproducing magnetic gap 6 of a shield type MR head 8 is formed, a soft magnetic film of a thickness of about 2 μm is formed as a lower portion magnetic pole 7 with an RF (Radio Frequency) sputtering method and the like. As shown in FIG. 32A, on a lower magnetic pole 7 flattened with an etch back or polishing method, a photo-resist film is coated and a resist pattern 53 is formed through a PEP process. The resist pattern 53 is corresponded to correspond to the respective positions where the upper magnetic pole tip 16 and the coil 18 are to be formed.

With the resist pattern 53 as a mask, the lower magnetic pole 7 is etched with an ion-milling method and the like. For a portion corresponding to a position destined to be the upper magnetic pole tip 16 is formed, a convex portion 50a of for example 1 μm wide, 5 μm long, and 0.5 μm high is formed. For a portion corresponding to a position destined to be the coil 18, a convex portion 50a possessing a continuous shape of for example 5 μm wide and 0.5 μm high is formed. Thereafter, the resist pattern 53 is removed and the rugged pattern as shown in FIG. 32B is formed on the surface of the lower magnetic pole 7.

Figure 32B:
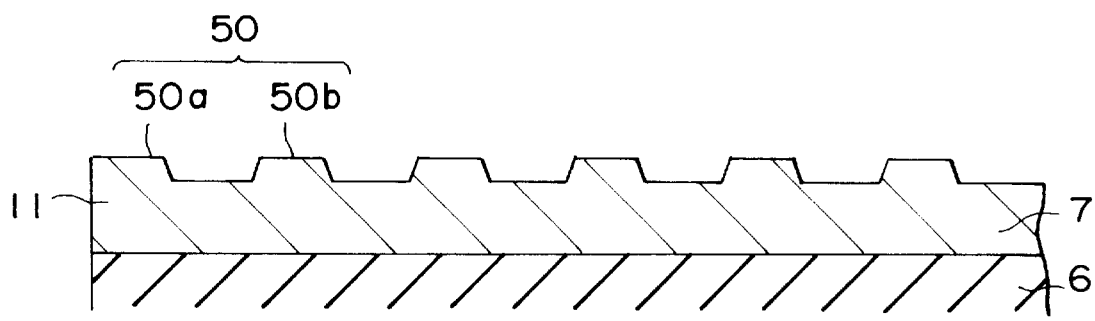

Next, as shown in FIG. 32B, on the surface of the lower magnetic pole 7 possessing a rugged surface, the first non-magnetic material layer 12a composed of a-Si film of a thickness of about 0.1 μm is formed with the RF sputtering method and the like. The non-magnetic material layer 12a of such a thickness can be formed even with the conventional sputtering method while reflecting the shape of the convex portion 50. Then, a layer 51, which is composed of the non-magnetic material layer, such as $SiO_x$ film, of a thickness of about 1.5 μm and destined to be the concave portion, is formed with a biased RF sputtering method or the like.

When the portion 51 destined to be the concave portion is formed is formed, the shape of the convex portion 50 is reflected. The condition for forming the film is controlled in such a manner that the layer 51 destined to be the concave portion is formed with an almost even thickness along the contour of the convex portion 50. The layer 51 destined to be the concave portion, which possesses the convex shape obtained by transcribing the shape of the convex portion 50, is obtained. In addition, in a boundary area between the layer 51 destined to be the concave portion and the lower magnetic pole 7, with an aim to enhance the tight junction, a non-magnetic film, such as Ti film, can be interposed.

Figure 32C:
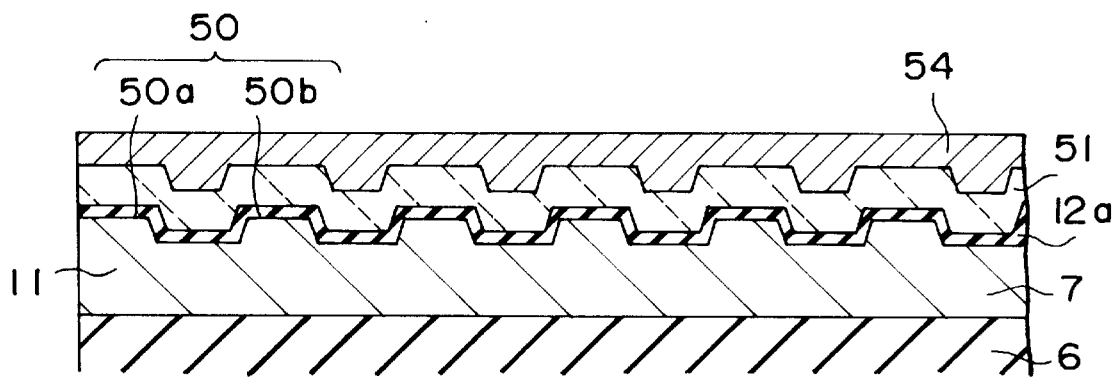

As shown in FIG. 32C, on the layer 51 destined to be the concave portion formed along the contour of the convex portion 50, a flattening layer (flattening resin layer) 54 is formed. For the flattening resin layer 54, a low molecular weight resin, such as novolak resin, can be used. Since the low molecular weight resin can be fluidized under such a low temperature as 473° C., by heat treating after coating, the surface can be flattened.

The flattening resin layer 54 is thin immediately above the convex portion 50 and thick on other area than that. With such a flattening resin layer 54 as a mask, an anisotropic etching is executed with a RIE method or the like. The thick portion of the flattening resin layer 54 functions as a substantial mask. That is, a mask layer commonly possessing the plane identical with the upper surface of the convex portion 50 is formed. The portion of the insulating layer 51 not covered by such a mask is removed by etching.

Figure 33A:
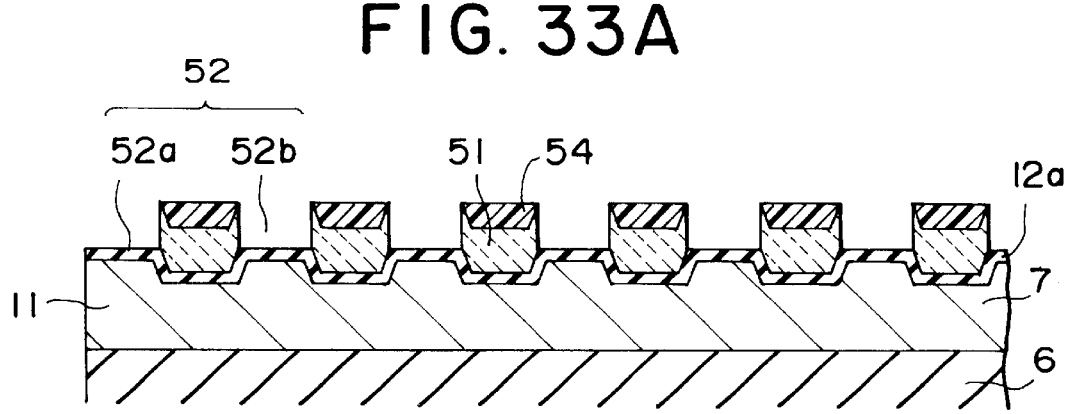
FIG. 33A, FIG. 33B and FIG. 33C are cross sectional views showing the manufacturing steps of the thin film magnetic head following the step shown in FIG. 32C.

As shown in FIG. 33A, by selectively etching to remove the insulating layer 51 on the convex portion 50, the concave portion 52 is formed. In concrete, on the portion dimensionally aligned to the convex portion 50a, the first concave portion 52a destined to be a position for forming the upper magnetic pole tip 16 is formed. The shape of the first concave portion 52a is, for example, 5 μm long, 1 μm deep, and 1 μm wide. On a portion aligned to the convex portion 50b, the trench shaped second concave portion 52b destined to be the coil 18 is formed. The shape of the second concave portion 52b is 1 μm deep, 5 μm wide. The tapered surface of the concave portion 52 can be a little bit rugged.

The concave portion (the first concave portion) 52a for embedding the upper magnetic pole tip 16 and the concave portion (the second concave portion) 52b for embedding the coil 18, based on the convex shape transcribed on the layer 51 destined to be concave portion and the flattening layer 54, are simultaneously formed aligned dimensionally to the convex portion 20a, 20b. Therefore, accuracy in alignment of these respective concave portions 52a, 52b is largely enhanced. Further, the PEP process can be removed. The situation in the self-alignment process based on the flattening layer 54 is identical with the previous examples.

Figure 33B:
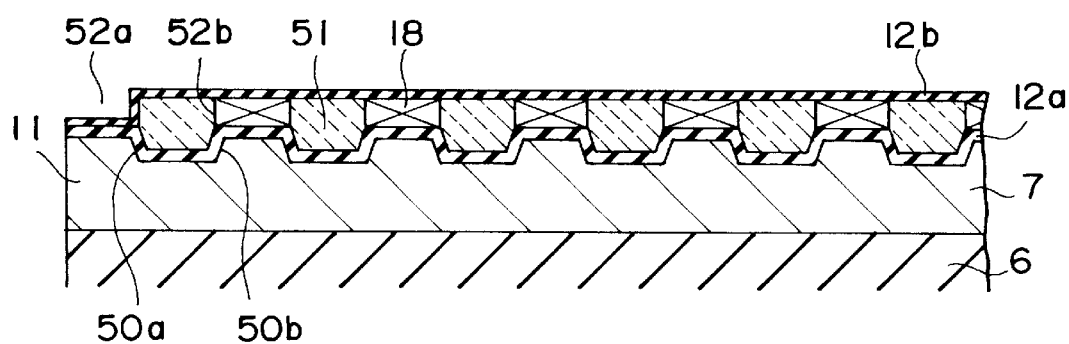

Next, as shown in FIG. 33B, the coil 18 is formed by embedding into the second concave portion 52b. No particular material is required for formation of the coil 18 if it is a conductor. In addition, various forming methods, such as conventional plating method, RF sputtering method, and MOCVD (Metal Organic CVD) and the like for forming a film can be applied. Further, the second non-magnetic material layer 12b consisting of for example a-Si film with a thickness of about 0.1 μm is formed in such a manner that covers the upper surfaces of the coil 18 and the layer 51 destined to be the concave portion forming layer 51, and the inner wall surface of the first concave portion 52a. The second non-magnetic material layer 12b is formed with for example CVD method. On the bottom surface of the first concave portion 52a, the recording magnetic gap 12 is formed by stacking the first and the second non-magnetic material layer 12a, 12b.

Figure 33C:
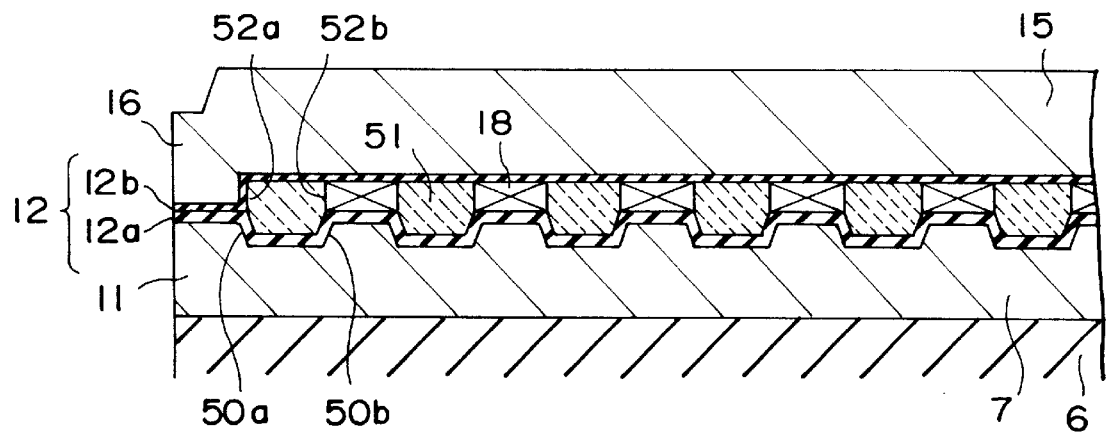

As shown in FIG. 33C, inside the concave portion 52a inside which the second non-magnetic material layer 12b is formed and on the coil 18, the upper magnetic pole 15 composed of an amorphous soft magnetic film, such as $Co_{90}Zr_4Nb_6$ (atomic %) film of a thickness of about 2 μm, is formed by directional sputtering method. In this case, for a constitutional material of the upper magnetic pole 15, a soft magnetic film high in saturation magnetic flux density, such as a micro-crystalline film of oxide.nitride such as (Fe, Co) system, a crystalline film of such as $Ni_{80}Fe_{20}$ (atomic %) or FeAlSi (Sendust), can be used. The upper magnetic pole top 16 formed inside the concave portion 52a has a height of 2 μm, a width of 0.9 μm. Therefore, the track width is 0.9 μm. Thereafter, an insulating protective film is formed with CVD method and the like. Further, the thin film magnetic heads formed in a multiple number on a substrate are processed into multiple single units. Thus, a thin film magnetic head is completed.

In FIG. 34, a relationship between magnetic field strength, which is induced in the upper magnetic pole when a constant electric current is inputted into the coil closest to the magnetic pole tip, and the distance between the magnetic pole tip and the coil is shown. In this thin film magnetic head of the present embodiment, the distance $T_1$ from the upper magnetic pole tip 16 to the adjacent coil 18 is 3 μm, the distance $T_2$ from the upper surface of the coil 18 to the upper magnetic pole 15 is 0.3 μm. Besides, in a thin film magnetic head produced based on the conventional technique, the distance $t_1$ from the upper magnetic pole tip 16' to the closest coil 18' is 10 μm, the distance $t_2$ from the upper surface of the coil 18' to the upper magnetic pole 15' is 3 μm. As apparent also from FIG. 34, when compared with a thin film magnetic head of the present invention, a conventional thin film magnetic head induces only ¹/₁₀ of the magnetic field strength of the present invention. To induce the same level of the magnetic field strength in the conventional thin film magnetic head, an input electric current must be increased up to 10 times.

In a manufacturing method of a thin film magnetic head in which a self-alignment process is applied for manufacturing of a coil, the convex portion that is aligned to a coil forming position can be formed of a material different from that of the lower magnetic pole. For example, on the lower magnetic pole, only the convex portion can be formed of other material than that of the other portion. The convex portion can be formed of for example a non-magnetic material. The material constituting the convex portion can be a conductive material. As to an embodiment in this case, an explanation will be given with reference to FIGS. 35A through 35D.

Figure 35A:
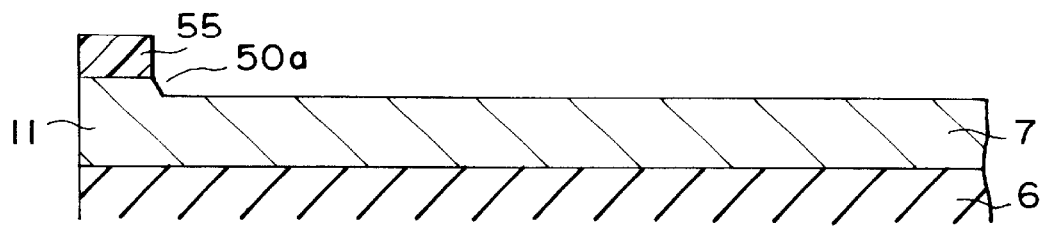
FIG. 35A, FIG. 35B, FIG. 35C and FIG. 35D are cross sectional views showing the essential steps of the other manufacturing method of the thin film magnetic head manufactured by applying self-alignment step of the present invention to manufacturing of the coil.

Firstly, as shown in FIG. 35A, on a substrate processed up to the upper reproducing magnetic gap 6 of a shield type MR magnetic head 8, a film composed of $Ni_{80}Fe_{20}$ (atomic %) or the like of a thickness of about 2 μm can be formed as a lower portion magnetic pole 7 with for example the RF sputtering method. On the lower magnetic pole 7, a photoresist film is coated. Only on a portion for the upper magnetic pole tip 16 to be formed, a resist pattern 55 is formed with PEP process. With this resist pattern 55 as a mask, a lower magnetic pole 7 is etched with ion-milling method or the like. Only on a portion corresponding to a portion for an upper magnetic pole tip portion 16 to be formed, a convex portion 50a possessing for example a thickness of 1 μm, a length of 5 μm, a height of 0.4 μm is formed. Thereafter, the resist pattern 55 is removed to form a lower magnetic pole 7 with a convex shape magnetic pole tip 11.

Figure 35B:
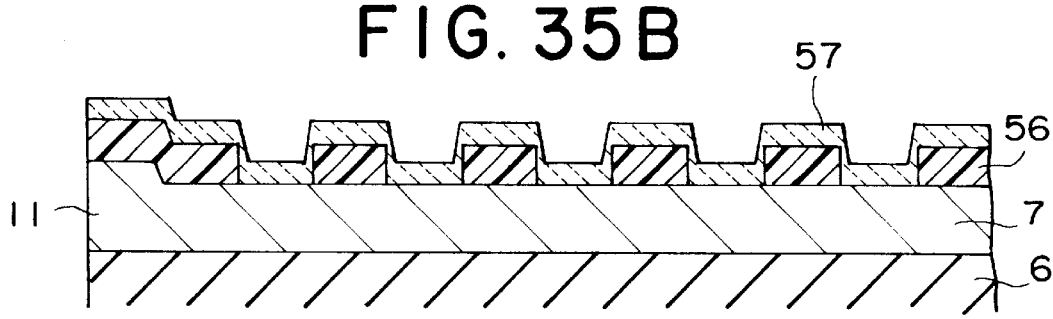
Figure 35C:
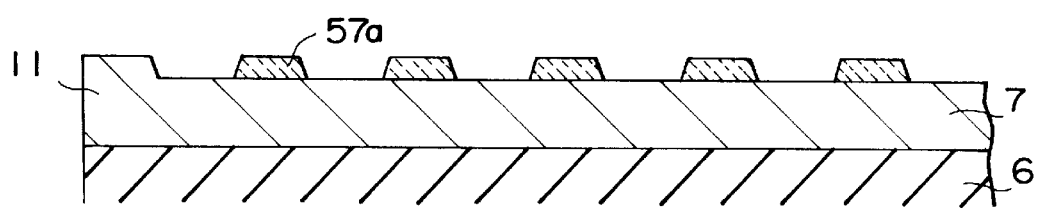

Next, as shown in FIG. 35B, resist pattern 56 is formed on positions for a lower magnetic pole tip 11 and a coil to be formed. Thereon, a non-magnetic film 57 is formed with RF sputtering method and the like. Although the non-magnetic film 57 is not limited in a particular material, in this embodiment, $AlO_x$ of a thickness of 0.4 μm is used. Thereafter, the resist pattern 56 is removed. As shown in FIG. 35C, the lower magnetic pole 7 is obtained in which the convex portion 57a consisting of a non-magnetic material is formed on a position for the coil to be formed. Further, when the non-magnetic film 53 is a conductor, it is preferable to cover it with an insulating film of a thickness of about 0.1 μm.

Figure 35D:
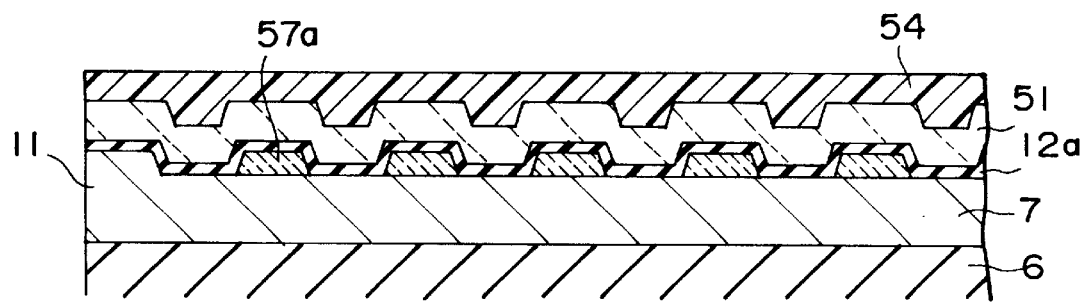

Then, as shown in FIG. 35D, on the lower magnetic pole 7 possessing the convex shape magnetic pole tip 11 and a convex portion 57a consisting of non-magnetic material, the first non-magnetic material layer 12a consisting of a-Si film of a thickness of about 0.1 μm, a layer 51 (insulating layer) destined to be the concave portion of $SiO_x$ film and the like of a thickness of about 1.5 μm, and the flattening resin layer 54 are sequentially formed.

Figure 36A:
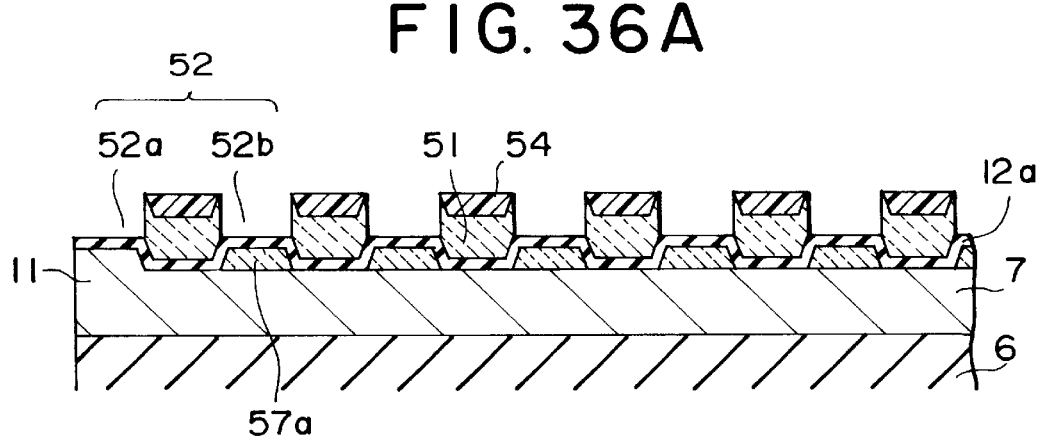
FIG. 36A, FIG. 36B and FIG. 36C are cross sectional views showing the manufacturing steps of the thin film magnetic head following the step shown in FIG. 35D.

As shown in FIG. 36A, as identical with the above described embodiment, an insulating layer 51 is selectively etched to form concave portion 52. On a portion aligned to the lower magnetic pole tip 11 possessing a convex shape, the first concave portion (length of 5 μm, depth of 1 μm, width of 1 μm) 52a destined to be the upper magnetic pole tip 16 is formed. On a portion aligned to the convex portion 57 composed of a non-magnetic material, the trench-shaped second convex portion (depth of 1 μm, width of 5 μm) 52b destined to be the coil 18 is formed.

Figure 36B:
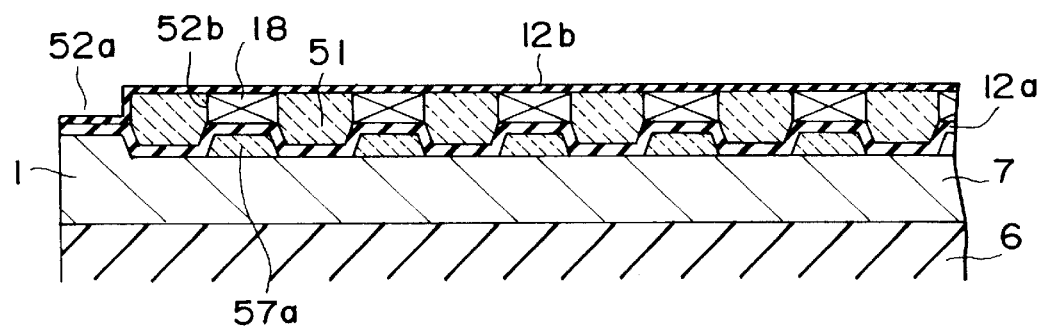
Figure 36C:
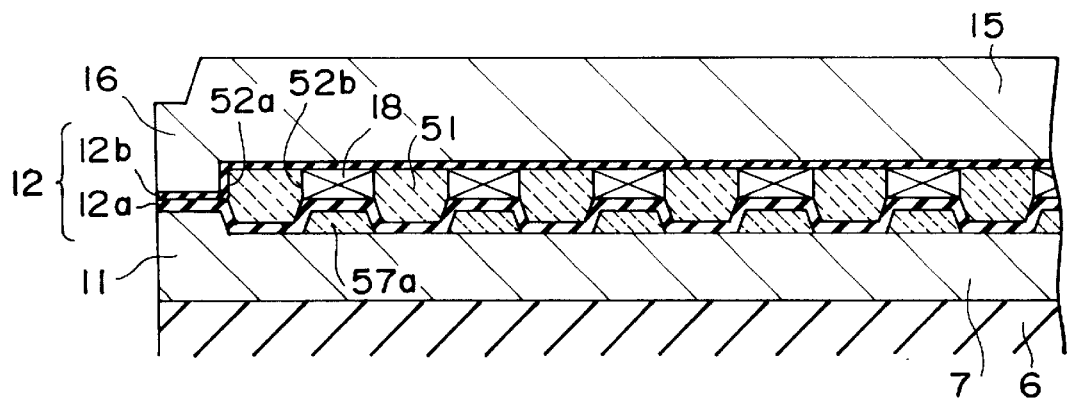

Thereafter, as shown in FIGS. 36B and 36C, the coil 18 is formed in the identical way. with the above described embodiment, further, the second non-magnetic material layer 12a consisting of such as a-Si of a thickness of about 0.15 μm is formed. In addition, the upper magnetic pole 15 consisting of such as $(Fe_{0.9}Zr_{0.1})_{90}N_{10}$ (atomic %) film of a thickness of about 2 μm is formed with for example directional sputtering method. As a result, the upper magnetic pole tip 16 formed inside the concave portion 52a has a height of 2 μm, a width of 0.9 μm. Therefore, the width of a track is 0.9 μm. Thereafter, an insulating protective film is formed with CVD method or the like. Further, thin film magnetic heads formed in a multiple number on a substrate are processed into multiple single units. Thus, a thin film magnetic head is completed.

In a thin film magnetic head of the present embodiment, since the identical effect with the above described embodiments can be obtained and, moreover, since the lower magnetic pole 7 has a flattened structure, the lower magnetic pole 7 can be isolated easily into a single domain during head operation identical with the upper magnetic pole 15. Recording noise level accompanying magnetic wall shift is drastically reduced.

A coil of a thin film magnetic head is formed with plating method by making use of a similar self-alignment process. A manufacturing process of a coil wherein a plating method is employed will be explained with reference to FIGS. 37A through 37E.

Figure 37A:
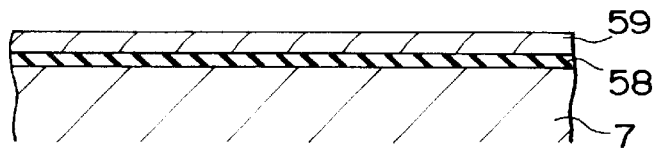
FIG. 37A, FIG. 37B, FIG. 37C, FIG. 37D and FIG. 37E are cross sectional views showing the essential steps of the still other manufacturing process of the thin film magnetic head manufactured by applying the self-alignment step of the present invention to manufacturing of the coil.
Figure 37B:
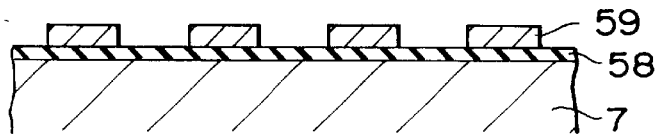

Firstly, as shown in FIG. 37A, a plating substrate film 59 is formed on the lower magnetic pole 7 through a non-magnetic layer 58. For the plating substrate film 59, a laminated film of for example Ti film of a thickness of 20 nm and Cu film of a thickness of 200 nm can be used. As shown in FIG. 37B, the plating substrate film 59 is patterned according to the coil forming position. The plating substrate film 59 forms the convex portion on the position destined to the coil.

Figure 37C:
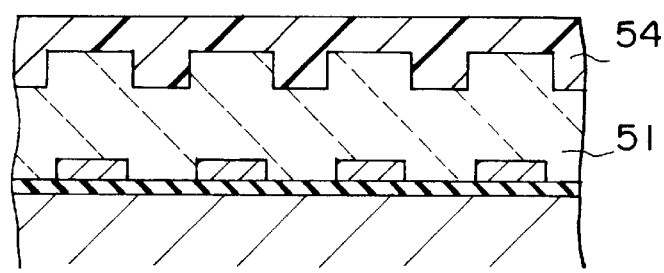
Figure 37D:
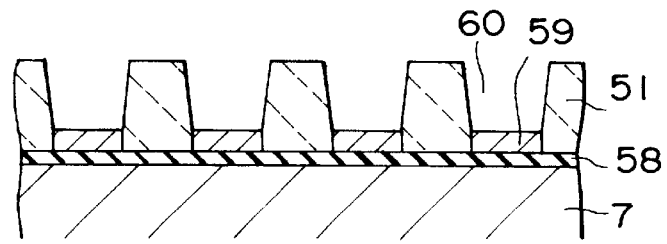
Figure 37E:
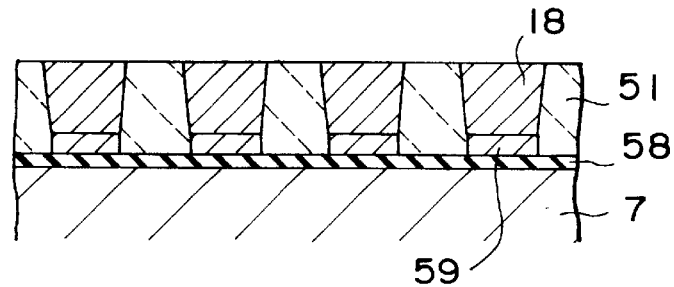

Then, as shown in FIG. 37C, on the patterned plating substrate film 59, an concave portion forming layer (insulating layer) 51 consisting of SiOx film or the like and a flattening resin layer 54 are sequentially formed. As shown in FIG. 37D, as identical with the above described embodiment, with thicker part of the flattening resin layer 54 as a mask, the insulating layer 51 is selectively etched to form a concave portion 60. The concave portion 60 is aligned to the convex shape plating substrate film 59.

Figure 38:
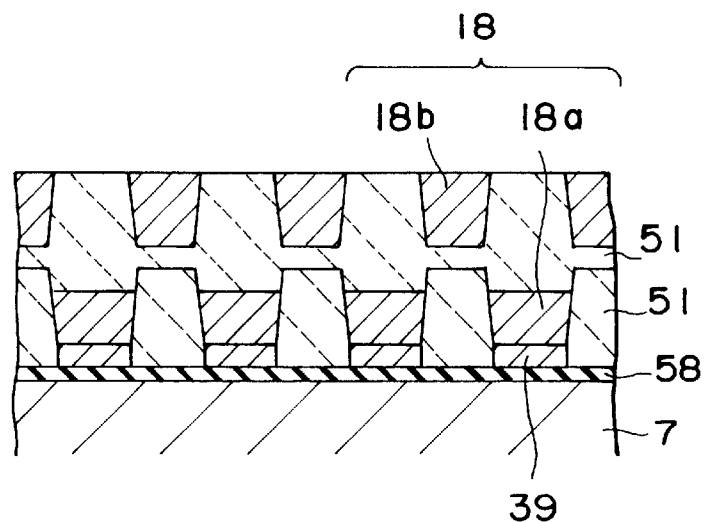
FIG. 38 is a cross sectional view showing a construction of still other embodiment of the thin film magnetic head manufactured applying the self-alignment step of the present invention to manufacturing of the coil.

Thereafter, by making use of the plating substrate film 59 of the bottom surface of the concave portion 60, the coil 18 is formed inside the concave portion 60 with plating method. According to such a manufacturing method, since the level difference of the plating substrate can be made small and even the thin resist layer can be processed, a thick coil possessing a narrow width can be processed with a narrow pitch. In addition, as shown in FIG. 38, a structure having multiple steps of coil 18a, 18b can be formed with high accuracy. In this case, by controlling the quantity of the coil material to be embedded inside the concave portion 60, the convex portion 61 for forming the second step of the coil 18b according to the self-alignment process is obtained.

According to the above described manufacturing method, since the coil 18 is embedded inside the concave portion 52b of the insulating layer 51, the difference of levels can be almost eliminated. Therefore, the pinning of the magnetic wall of the upper recording magnetic pole 15 can be made small, and the write-in characteristics can be enhanced in a high frequency signal region. In addition, when integration with a spin valve element, which uses an anti-ferromagnetic material, is executed, since the annealing temperature can be raised to more than 350° C., the anti-ferromagnetic material possessing a high blocking temperature such as PtMn or the like can be exposed to an orthogonal annealing.

Figure 39:
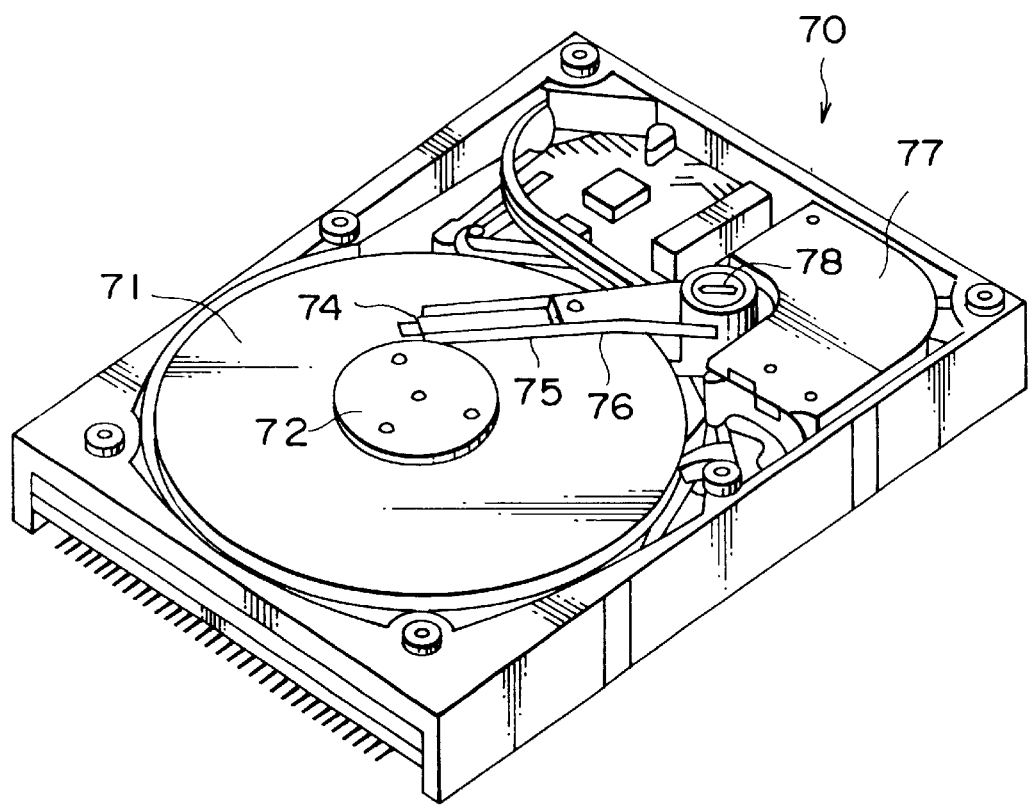
FIG. 39 is a perspective view showing an example of configuration of a magnetic disc drive apparatus destined to be mounted with the magnetic recording/reproducing combination head of the present invention.

The magnetic recording/reproducing combination head according to respective embodiments described above is mounted on a magnetic recording apparatus such as a magnetic disc drive apparatus shown in FIG. 39. FIG. 39 shows a schematic structure of a magnetic disc drive apparatus 70 using a rotary actuator.

A magnetic disc 71 is attached to a spindle 72 and made to rotate by a motor 73 responding to control signal from a drive control source (not shown). A head slider 74 is attached to a tip end of a suspension 75 having a thin film shape. When the magnetic disc 71 rotates, an air bearing surface (ABS) of the head slider 74 is held with a predetermined levitation height (from more than 0 to less than 100 nm, for example) from the surface of the magnetic disc 71. In the head slider 74, a magnetic recording/reproducing combination head of the present invention (not shown in FIG. 39) is mounted as an electromagnetic transducer. The head slider 74 writes and reads information while levitating above the magnetic disc 71.

The suspension 75 is connected to an edge of an actuator arm 76 which possesses a bobbin portion supporting a drive coil not shown. At the other edge of the actuator arm 76, a voice coil motor 77, which is a kind of a linear motor, is disposed. The voice coil motor 77 is formed of a not shown drive coil rolled up to the bobbin portion of the actuator arm 76 and a magnetic circuit consisting of permanent magnets positioned oppositely so as to hold therebetween the drive coil and opposing yoke. The actuator arm 76 is supported by not shown ball bearings disposed at two points above and below a fixed axis 78 and is capable of slidable rotation freely by the voice coil motor 77.

Next, an embodiment of the manufacturing method of the other electronic device than a magnetic head will be explained. That is, an embodiment in which the manufacturing method of the present invention, which is featured by the self-alignment process, is applied to manufacturing of the other electronic device will be described.

FIGS. 40A to 40D are diagrams showing the essential steps of the manufacturing method of an electronic device of the present invention applied for forming a contact layer of a semiconductor.

Figure 40A:
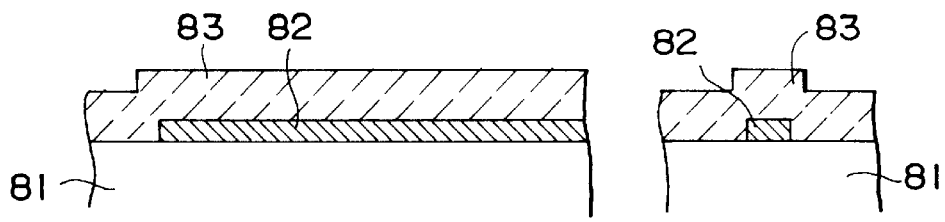
FIG. 40A, FIG. 40B, FIG. 40C and FIG. 40D are cross sectional views showing steps for forming a contact hole of a semiconductor device manufactured according to the manufacturing method of an electronic part of the present invention.

Firstly, as shown in FIG. 40A, on a wiring 82 positioned on a semiconductor substrate 81, an insulating layer 83 comprising of $SiO_x$, $AlO_x$, or the like is formed. The insulating layer 83 is formed on a wiring 82 having a convex shape. Thus, the insulating layer 83 in which the wiring shape is transcribed is obtained.

Figure 40B:
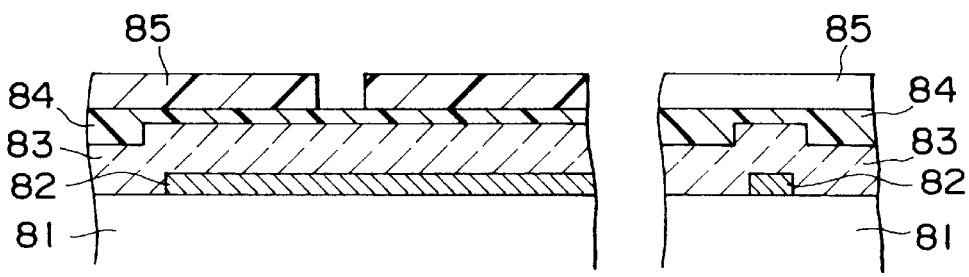

Then, as shown in FIG. 40B, on the insulating layer, as the first mask, a flattening layer 84 is formed. For the flattening layer 84, a flattening resin can be used. The flattening resin layer 84 is thin immediately above the wiring 82, and thick in the other part than that. Thereon, as the second mask, resist 85 or the like is formed. For the resist 85 serving as the second mask, a larger pattern than a size of a contact hole is formed conforming to the position for the contact hole to be formed. The resist 85 defines the position of the contact hole with respect to a direction of length of the wiring 82.

Figure 40C:
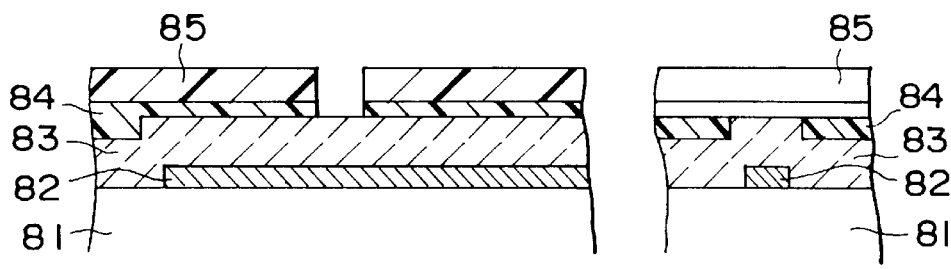

With the resist 85 as a mask, the flattening resin layer 84 is etched by RIE method or the like. As shown in FIG. 40C, when the insulating layer 83 is exposed, the etching operation is executed under a condition in that an etching rate of the insulating layer 83 is larger than that of the flattening layer 84. The thicker portion of the flattening resin layer 84 serves substantially as a mask.

Figure 40D:
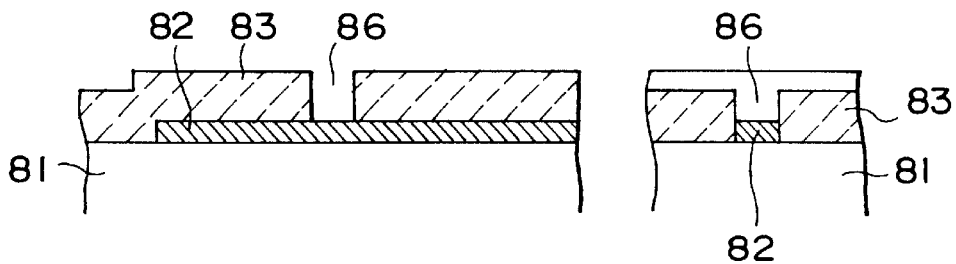

As shown in FIG. 40D, the insulating layer 83 on the wiring 82 is selectively etched. The contact hole (via hole) 86 is formed on the wiring 82. The contact hole 86 is aligned to the wiring 82 based on self-alignment.

Inside the contact hole 86, with a manner identical that of a conventional manufacturing process of a semiconductor device, a contact layer to the wiring 82 is formed. The contact hole can be, except for patterning operation of the resist 85 serving as the second mask, formed without being exposed to the alignment process employed during the conventional contact hole formation. Therefore, without being influenced by alignment accuracy, the contact hole 86 is aligned with high accuracy to a miniaturized wiring 82 based on self-alignment. Therefore, the contact layer is aligned to the miniaturized wiring 82 with accuracy.

Then, an embodiment in which a manufacturing method of the electronic device of the present invention is applied to a manufacturing method of a liquid crystal display device will be explained.

Figure 41:
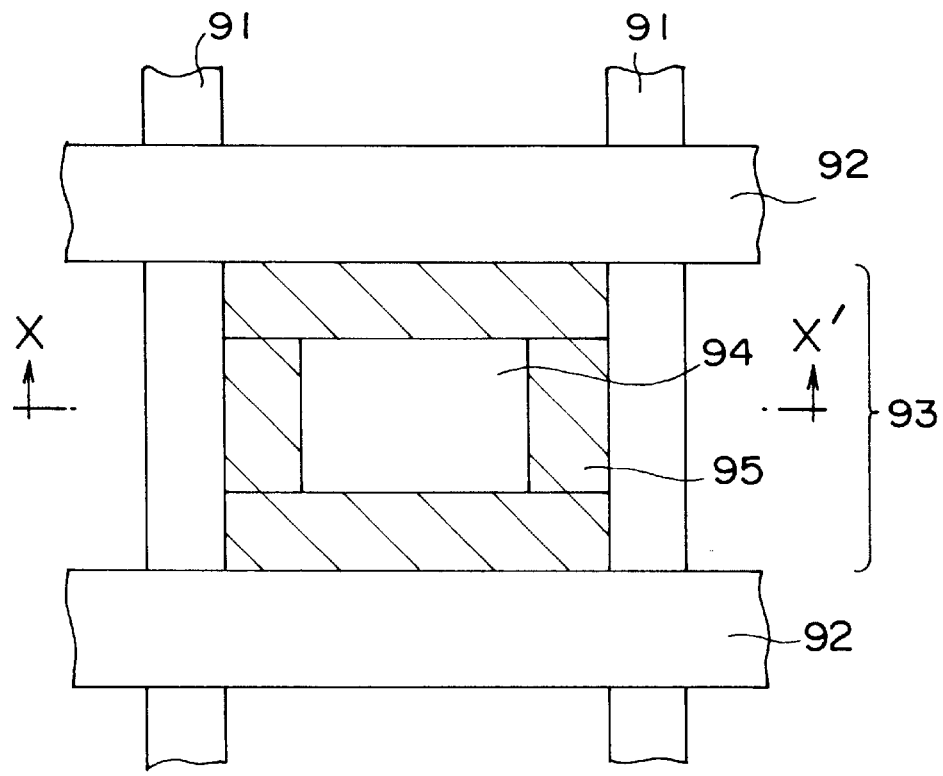
FIG. 41 is a plan view showing the essential structure of a liquid crystal display device manufactured according to the manufacturing method of the electronic parts of the present invention.
Figure 42:
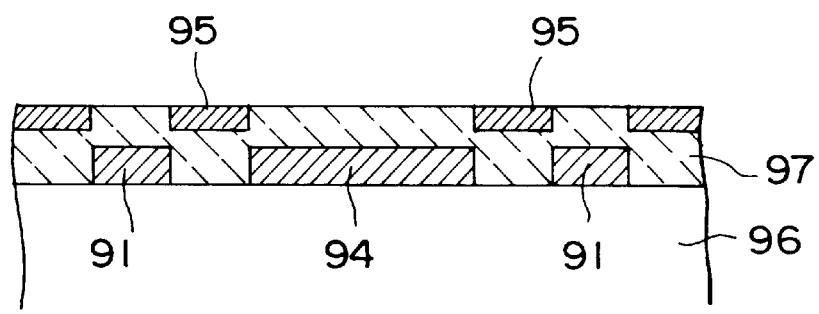
FIG. 42 is a cross sectional view taken along X–X' line of the liquid crystal display device shown in FIG. 41.

FIGS. 41 and 42 show the essential structure of a liquid crystal display device manufactured by applying the manufacturing method of the present invention. FIG. 42 is a cross sectional view taken along X–X' line of FIG. 41. A liquid crystal display devices shown in these figures have a pixel area 93 defined by a signal line 91 and a gate line 92. Inside the pixel area 93, a pixel electrode 94 is disposed. On an area of the pixel area 93 other than that of the pixel electrode 94, black matrix 95 is formed. In the figure, numeral 96 designate a substrate, and 97 an insulating layer.

For the black matrix, a conducting material can be used. Therefore, if the black matrix 95 and such as the signal line 91 overlap exceedingly, a switching speed is lowered due to a parasite capacity emerged between them. By applying a manufacturing method of the present invention for forming the black matrix 95, overlap degree between the black matrix 95 and the signal line 91 can be controlled.

Figure 43A:
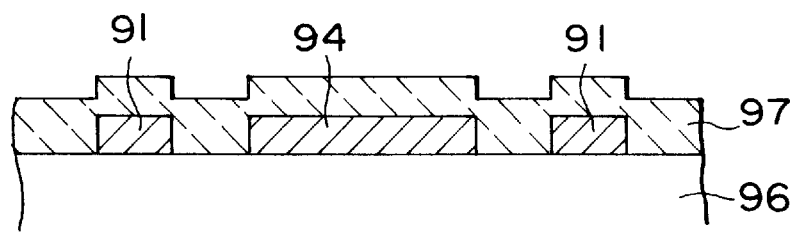
FIG. 43A, FIG. 43B and FIG. 43C are cross sectional views showing the essential steps of the manufacturing process of the liquid crystal display device shown in FIG. 41.

That is, as shown in FIG. 43, on a signal line 91 and a pixel electrode 94 positioned on a substrate 96, an insulating layer 97 consisting of such as $SiO_x$, $AlO_x$, or the like is formed. The insulating layer 97 is formed conforming to a convex shape contour of the signal line 91 and the pixel electrode 94. The insulating layer 97 is, by controlling a film forming condition, formed in various shapes. For example, a convex shape of the insulating layer 97 can be made smaller than that of the signal line 91 or the pixel electrode 94.

Figure 43B:
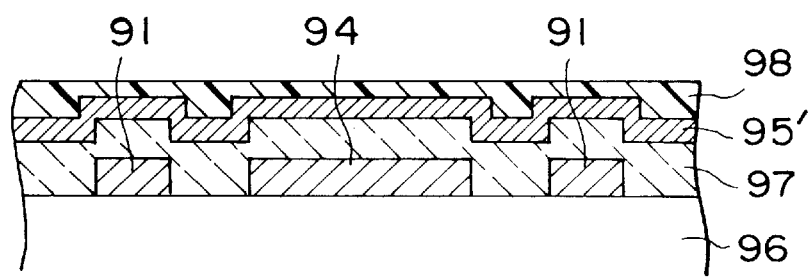

Then, as shown in FIG. 43B, the black matrix layer 95' is formed on the insulating layer 97, further, thereon the flattening layer 98 is formed. For the flattening layer 98, a flattening resin can be used. The flattening layer 98 is etched by such as the RIE method. When the black matrix layer 95' is exposed, an etching operation is executed under a condition in which the etching rate of the black matrix layer 95' is larger than that of the flattening resin layer 98.

Figure 43C:
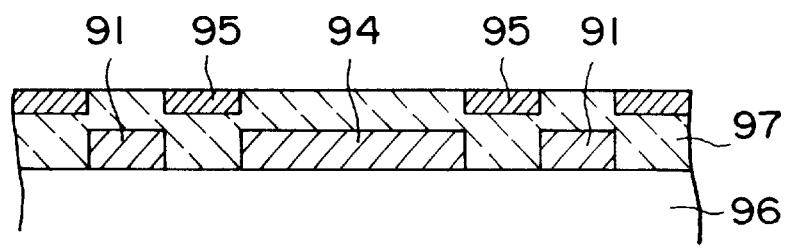

Since the thick portion of the flattening resin layer 98 serves substantially as a mask, the black matrix layer 95' on the signal line 91 and the pixel electrode 94 is removed. The black matrix layer 95 is formed with accuracy, as shown in FIG. 43C, between the signal line 91 and the pixel electrode 94. Thus, overlapping between the black matrix 95 and the signal line 91 or the pixel electrode 94 can be controlled.

Further, the black matrix 95 can be overlapped appropriately to the pixel electrode 94. An adequate capacity emerged between the black matrix 95 and the pixel electrode 94 contributes for securing a display duration between signals. Such a liquid crystal display device can be manufactured in a manner, for example, that will be described below.

Figure 44A:
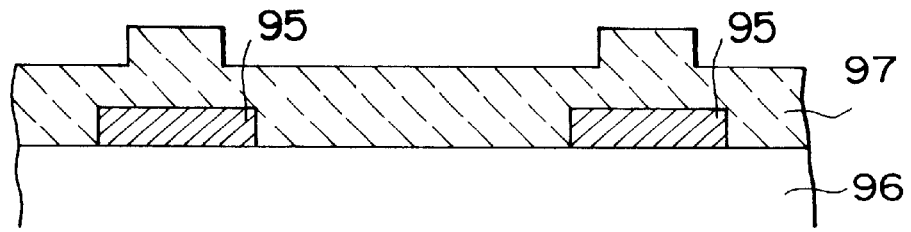
FIG. 44A, FIG. 44B and FIG. 44C are cross sectional views showing other example of the manufacturing process of the liquid crystal display device manufactured by applying the manufacturing method of the electronic device of the present invention.

That is, as shown in FIG. 44A, black matrix 95 possessing a predetermined pattern is formed on the substrate 96. Then, on the black matrix 95, an insulating layer 97 composed of such as $SiO_x$, $AlO_x$ is formed. The insulating layer 97 is formed conforming to a convex shape contour of the black matrix 95. The insulating layer 97 is formed in various shapes by controlling the film forming condition. The insulating layer 97 is made smaller than, for example, the black matrix 95 in its convex shape.

Figure 44B:
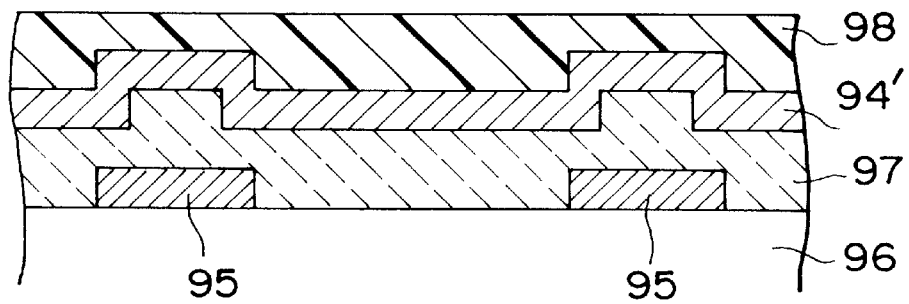

Then, as shown in FIG. 44B, the pixel electrode layer 94' is formed on the insulating layer 97, thereon, further, the flattening resin layer 98 is formed. The flattening resin layer 98 is etched by such as RIE method. When the pixel electrode 94' is exposed, the etching condition is controlled such that the etching rate of the pixel electrode 94' is larger than that of the flattening resin layer 98.

Figure 44C:
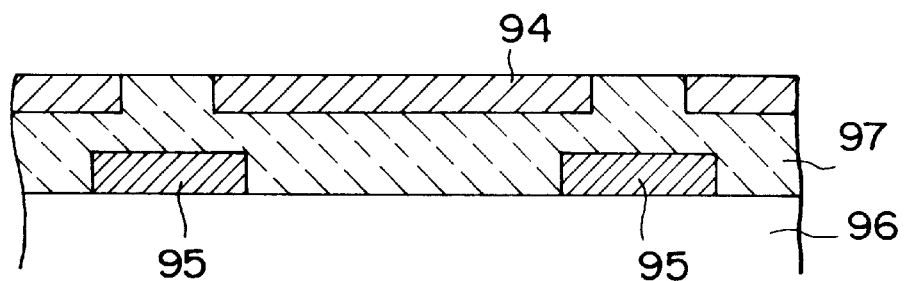
Figure 45:
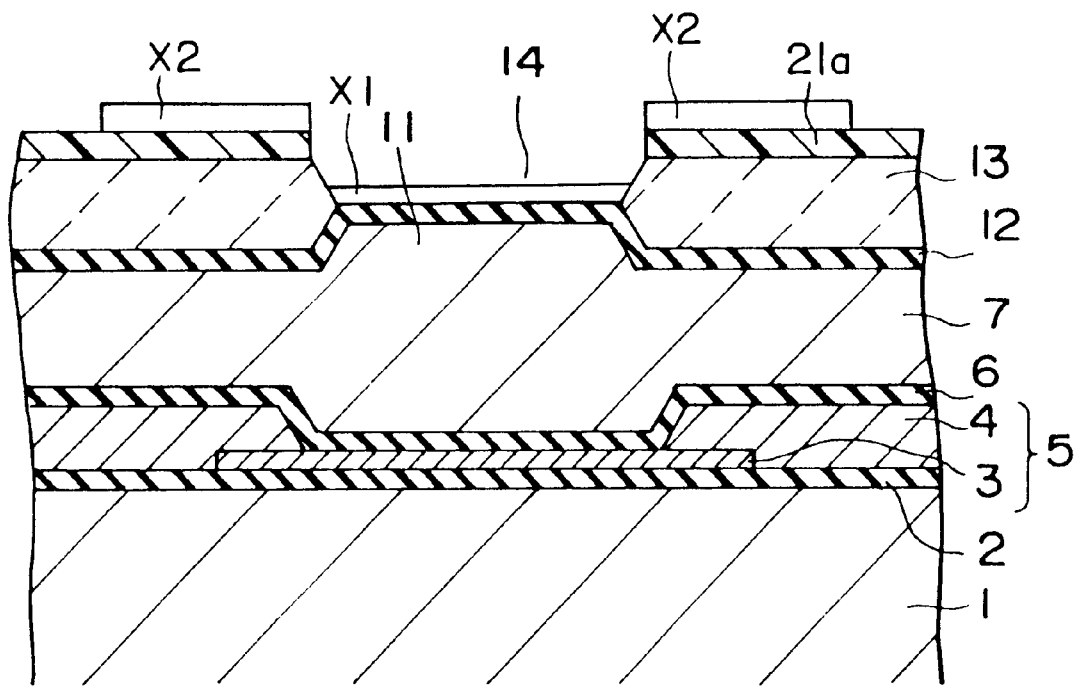
FIG. 45 is a cross sectional view showing another example of forming an upper magnetic pole utilizing a seed layer $X_1$, $X_2$ obtained by a plating method on the bottom surface of the convex portion and on the top surface of the insulating layer or the mask layer.

As shown in FIG. 44C, the pixel electrode 94 is patterned with a partial overlapping with the black matrix 95. Thus, by controlling the shape of the insulating layer 97, the overlapping between the black matrix 95 and the pixel electrode 94 can be controlled.

Another example of forming the upper magnetic pole can be obtained by a plating method with providing a seed layer $X_1$, $X_2$ on the bottom of the convex portion 14 and on a top surface of the insulating layer 13 or the mask layer 21a, each of them locates adjacent to the convex portion 14. In this example, the upper magnetic pole tip is firstly formed to fill the trench (convex portion). Filling the convex with the upper magnetic pole tip, a portion of the upper magnetic pole on the top surface is connected to upper magnetic pole tip and forms the upper magnetic pole with the upper magnetic pole tip.

A manufacturing method of an electronic device of the present invention can be applied to a manufacturing process of various electronic devices in which dimensional alignment is required between the first and the second functional material layer both serving as a fine structural element. In any case, without being influenced by mechanical alignment accuracy, accurate alignment can be realized.

What is claimed is:

1. A manufacturing method of a magnetic head comprising a pair of magnetic poles comprising a lower magnetic pole and an upper magnetic pole, formed on the lower magnetic pole, and opposed to each other with a magnetic gap therebetween, the method comprising:

forming, as part of the lower magnetic pole, a first convex portion corresponding to a recording track;

forming a non-magnetic material layer possessing a second convex portion conformed to the first convex portion over the lower magnetic pole;

forming a planarization layer surrounding the second convex portion;

forming, by etching the non-magnetic material layer above the first convex portion by making use of the planarization layer as a mask, a concave portion, the concave portion being self-aligned to the first convex portion; and forming, inside the concave portion of the non-magnetic material layer, the upper magnetic pole.

2. The manufacturing method of a magnetic head as set forth in claim 1, further comprising;

forming the magnetic gap on the first convex portion of the lower magnetic pole.

3. The manufacturing method of a magnetic head as set forth in claim 1;

wherein the first convex portion is formed of the lower magnetic pole and the magnetic gap.

4. The manufacturing method of a magnetic head as set forth in claim 1;

wherein the concave portion of the non-magnetic material layer is formed by etching the non-magnetic material layer with the planarization layer existing in the surrounding area of the second convex portion as a mask.

5. The manufacturing method of a magnetic head as set forth in claim 1;

wherein the non-magnetic material layer is formed in such a manner that satisfies a relation, $W_1 \geq W_2$, when $W_1$ denotes the width of an upper surface of the first convex portion and $W_2$ denotes the width of an upper surface of the second convex portion.

6. The manufacturing method of a magnetic head as set forth in claim 1;

wherein the concave portion is formed on the non-magnetic material layer in such a manner that satisfies a relation, $H_1 > D_1$, when $H_1$ denotes the height from an upper surface of the magnetic gap when the width $W_1$ of an upper surface of the first convex portion is equal with the width $W_2$ of an upper surface of the second convex portion, and $D_1$ denotes the depth of the concave portion.

7. The manufacturing method of a magnetic head as set forth in claim 1;

wherein the first convex portion is formed of the lower magnetic pole top, the magnetic gap, and a magnetic pole layer destined to be a part of the upper magnetic pole top.

8. The manufacturing method of a magnetic head as set forth in claim 1;

wherein the non-magnetic material layer is etched in such a manner that a bottom surface of the concave portion become broader in width than that of a top surface of the first convex portion.

9. The manufacturing method of a magnetic head as set forth in claim 1;

wherein the planarization layer comprises a planarization resin.

10. The manufacturing method of a magnetic head as set forth in claim 1;

wherein the planarization layer is heated after coating to flatten its surface.

11. The manufacturing method of a magnetic head as set forth in claim 1;

wherein the planarization layer has a first thickness above the second convex portion and a second thickness above the area which surrounds laterally the second convex portion, wherein the first thickness is thinner than the second thickness.

12. A manufacturing method of a magnetic head as set forth in claim 1, wherein the planarization layer surrounding the first convex portion has a first thickness and the non-magnetic material layer left beside the first convex portion has a second thickness, and a total thickness of the first thickness and the second thickness is larger than a thickness of the first convex portion.

13. The method of claim 1, wherein the forming, as part of the lower magnetic pole, a first convex portion corresponding to a recording track comprises forming, as part of the lower magnetic pole, the first convex portion having a height of 0.3 to 0.5 µm.

14. A manufacturing method of a magnetic head possessing a coil positioned between a lower magnetic pole and an upper magnetic pole, the method comprising:

forming a coil substrate possessing a plurality of first convex portions on a surface of the lower magnetic pole;

forming a first insulating layer on the coil substrate, the insulating layer possessing a plurality of second convex portions along the contour of the first convex portions;

forming a planarization layer surrounding the plurality of second convex portions;

forming a plurality of concave portions aligned to the first convex portions by etching the first insulating layer by making use of the planarization layer as a mask, the plurality of concave portions being self-aligned to the first convex portions;

forming a coil inside the concave portions;

forming a second insulating layer covering the coil; and forming the upper magnetic pole on the second insulating layer.

15. The manufacturing method of a magnetic head as set forth in claim 14;

wherein the coil substrate is formed as a part of the lower magnetic pole.

16. The manufacturing method of a magnetic head as set forth in claim 14;

wherein, as the coil substrate, a non-magnetic layer possessing a plurality of the first convex portion is formed.

17. The manufacturing method of a magnetic head as set forth in claim 14;

wherein the planarization layer comprises a planarization resin.

18. The manufacturing method of a magnetic head as set forth in claim 14;

wherein the planarization layer is heated after coating to flatten its surface.

19. The manufacturing method of a magnetic head as set forth in claim 14;

wherein the planarization layer has a first thickness above the second convex portion and a second thickness above the area which surrounds laterally the second convex portion, wherein the first thickness is thinner than the second thickness.

20. A manufacturing method of a magnetic head as set forth in claim 14, wherein the planarization layer surrounding the first convex portions has a first thickness and the remaining insulating layer left beside the first convex portion after etching has a second thickness, and a total thickness of the first thickness and the second thickness is larger than a thickness of the first convex portion.

21. A manufacturing method of a magnetic head including a reproducing head possessing a magneto-resistance effect element which possesses a first concave portion on an upper surface and is interposed between a pair of an upper and a lower magnetic shield layer through a reproducing magnetic gap, and a recording head possessing a pair of an upper and a lower magnetic pole disposed through a recording magnetic gap, the method comprising:

forming, on a upper side reproducing magnetic gap, a lower magnetic pole concurrently serving as at least an upper side magnetic shield layer possessing a second concave portion, the second concave portion conforming to the first concave portion;

forming a first planarization layer in the second concave portion; and forming, by etching the lower magnetic pole making use of the first planarization layer as a mask, a convex portion self-aligned dimensionally to the first concave portion.

22. The manufacturing method of a magnetic head as set forth in claim 12, further comprising;

forming, conforming to the shape of the convex portion, a non-magnetic material layer on the lower portion magnetic pole;

forming the second planarization layer surrounding the convex portion;

forming, by etching the non-magnetic material layer by making use of the second planarization layer, the third concave portion dimensionally aligned to the convex portion; and forming, at least inside the second concave portion of the non-magnetic material layer, the upper magnetic pole.

23. The manufacturing method of a magnetic head as set forth in claim 21;

wherein the planarization layer comprises a planarization resin.

24. The manufacturing method of a magnetic head as set forth in claim 21;

wherein the planarization layer is heated after coating to flatten its surface.

25. The manufacturing method of a magnetic head as set forth in claim 21;

wherein the planarization layer has a first thickness above the second concave portion and a second thickness in areas laterally surrounding the second concave portion, wherein the first thickness is thicker than the second thickness.

26. A manufacturing method of a magnetic head as set forth in claim 22, wherein the second planarization layer surrounding the convex portion has a first thickness and the non-magnetic material layer left beside the first convex portion has a second thickness, and a total thickness of the first thickness and the second thickness is larger than a thickness of the convex portion.

27. A method of manufacturing a magnetic head, the magnetic head comprising lower and upper magnetic poles, and a magnetic gap disposed between the upper and lower magnetic poles, the method comprising:

forming the lower magnetic pole, the lower magnetic pole having a first convex surface;

forming a layer of non-magnetic material over the first convex surface, the layer of non-magnetic material having a convex portion, the convex portion being conformed to the first convex surface and having a top surface;

forming a planarization layer laterally surrounding the convex portion;

selectively removing, using the planarization layer as a mask, a portion including the top surface of the convex portion from the layer of non-magnetic material and leaving a portion of the layer of non-magnetic material under the planarization layer to form a concave portion of the layer of non-magnetic material, the concave portion being self-aligned with the first convex surface; and forming the upper magnetic pole in the concave portion.

28. The method of manufacturing the magnetic head of claim 27, wherein the step of removing the portion including the top surface of the convex portion includes etching the portion including the top surface of the convex portion, wherein the planarization layer comprises material having a first etching rate, the non-magnetic material has a second etching rate faster than the first etching rate.

29. The method of manufacturing the magnetic head of claim 27, wherein the step of forming the planarization layer comprises:

forming a layer of resin over the convex portion, the layer of resin substantially having a flat surface; and removing an upper film portion of the layer of resin to form the planarization layer.

30. The method of manufacturing the magnetic head of claim 27, further comprising forming the magnetic gap on a bottom surface of the concave portion.

31. The method of manufacturing the magnetic head of claim 27, further comprising step of forming the magnetic gap on a top surface of the first convex surface.

32. The method of manufacturing the magnetic head of claim 27, wherein the portion including the top surface of the convex portion extends to a lower surface of the layer of non-magnetic material, the lower surface is in contact with the magnetic gap, and the non-magnetic material has an etching rate faster than that of the magnetic gap.

33. The method of manufacturing the magnetic head of claim 27, wherein the first convex surface has a top surface of a first width and the convex portion has a top surface of a second width, and the first width is equal to or larger than the second width.

34. The method of manufacturing the magnetic head of claim 27, wherein each of the upper and lower magnetic poles has a magnetic tip portion respectively, and the convex surface covers the magnetic portions of the upper and lower magnetic poles and the magnetic gap interposed between the magnetic tip portions.

35. The method of manufacturing the magnetic head of claim 27, wherein the concave portion has a bottom surface of a first width, the first convex surface has a top surface of a second width, and the first width is wider than the second width.

36. The method of manufacturing the magnetic head of claim 27, further comprising forming an air bearing surface, wherein the lower magnetic pole has a top surface and a side surface being substantially vertical to the top surface, the upper magnetic pole has a bottom surface facing the top surface of the lower magnetic pole via the magnetic gap with a width of a magnetic recording track and a side surface being substantially vertical to the bottom surface, and the air bearing surface is substantially a plane surface and spans the magnetic recording track, the side surfaces of the lower and upper magnetic poles, and the magnetic gap.

37. The manufacturing method of a magnetic head as set forth in claim 27;

wherein the planarization layer comprises a planarization resin.

38. The manufacturing method of a magnetic head as set forth in claim 27;

wherein the planarization layer is heated after coating to flatten its surface.

39. The manufacturing method of a magnetic head as set forth in claim 27;

wherein the planarization layer has a first thickness above the second convex portion and a second thickness above the area which surrounds laterally the second convex portion, where in the first thickness is thinner than the second thickness.

40. A manufacturing method of a magnetic head as set forth in claim 27, wherein the planarization layer surrounding the first convex surface has a first thickness and the non-magnetic material layer left beside the first convex surface has a second thickness, and a total thickness of the first thickness and the second thickness is larger than a thickness of the first convex surface.

41. The method of claim 27, wherein forming the lower magnetic pole comprises forming, as part of the lower magnetic pole, the first convex surface having a height of 0.3 to 0.5 $\mu$m.

\* \* \* \* \*

UNITED STATES PATENT AND TRADEMARK OFFICE
CERTIFICATE OF CORRECTION

PATENT NO.    : 6,305,072 B1
DATED         : October 23, 2001
INVENTOR(S)   : Yoda et al.

It is certified that error appears in the above-identified patent and that said Letters Patent is hereby corrected as shown below:

Column 38,
Line 8, change "12" to -- 21 --.

Column 40,
Line 26, change "where in" to -- wherein --.

Signed and Sealed this

Twenty-fifth Day of June, 2002

Attest:

Attesting Officer

JAMES E. ROGAN
Director of the United States Patent and Trademark Office